(12) United States Patent
Park et al.

(10) Patent No.: US 12,022,221 B2
(45) Date of Patent: Jun. 25, 2024

(54) IMAGE SENSOR

(71) Applicant: Samsung Electronics Co., Ltd., Suwon-si (KR)

(72) Inventors: Changhyun Park, Suwon-si (KR); Eun Sub Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/991,097

(22) Filed: Nov. 21, 2022

(65) Prior Publication Data

US 2023/0164460 A1  May 25, 2023

(30) Foreign Application Priority Data

Nov. 25, 2021 (KR) .................. 10-2021-0164972
Aug. 24, 2022 (KR) .................. 10-2022-0106204

(51) Int. Cl.
  *H04N 25/77* (2023.01)
  *H04N 25/46* (2023.01)
  *H04N 25/59* (2023.01)
  *H04N 25/771* (2023.01)
  *H04N 25/773* (2023.01)
  *H04N 25/78* (2023.01)

(52) U.S. Cl.
  CPC ........... *H04N 25/77* (2023.01); *H04N 25/771* (2023.01); *H04N 25/773* (2023.01)

(58) Field of Classification Search
  CPC .... H04N 25/77; H04N 25/771; H04N 25/773; H04N 25/46; H04N 25/59; H04N 25/78
  See application file for complete search history.

(56) References Cited

U.S. PATENT DOCUMENTS

| | | |
|---|---|---|
| 7,821,560 B2 | 10/2010 | Sugawa et al. |
| 9,100,606 B2 | 8/2015 | Sato et al. |
| 9,560,296 B2 | 1/2017 | Hseih et al. |
| 10,171,760 B2 | 1/2019 | Otaka |
| 10,277,848 B2 | 4/2019 | Sakakibara et al. |
| 10,720,467 B2 | 7/2020 | Sugawa et al. |
| 11,025,844 B2 | 6/2021 | Seo et al. |
| 11,089,253 B2 | 8/2021 | Shim et al. |

(Continued)

OTHER PUBLICATIONS

Extended European Search Report dated Mar. 15, 2023 for the corresponding European Patent Application No. 22209453.4.

*Primary Examiner* — Marly S Camargo
(74) *Attorney, Agent, or Firm* — Muir Patent Law, PLLC

(57) ABSTRACT

An image sensor includes a pixel including a first floating diffusion and a second floating diffusion, generating a first pixel signal based on a quantity of charge of the first floating diffusion, and generating a second pixel signal based on the quantity of charge of the first floating diffusion and a quantity of charge of the second floating diffusion; a column line connected to the pixel and transmitting the first pixel signal or the second pixel signal; and a readout circuit connected to the column line and generating an image signal based on a plurality of comparison results including a first comparison result obtained by comparing the first pixel signal with a first reference signal, a second comparison result obtained by comparing the second pixel signal with a first reference signal, and a third comparison result obtained by comparing the second pixel signal with a second reference signal.

23 Claims, 35 Drawing Sheets

(56) References Cited

U.S. PATENT DOCUMENTS

| | | |
|---|---|---|
| 11,140,352 B1 * | 10/2021 | Dai ..................... H04N 25/75 |
| 11,212,457 B2 | 12/2021 | Dai et al. |
| 11,348,956 B2 * | 5/2022 | Choi .................... H04N 25/75 |
| 11,399,150 B2 * | 7/2022 | Gao ..................... H04N 25/75 |
| 11,736,833 B1 * | 8/2023 | Choi ................... H04N 25/622 |
| 2011/0155892 A1 | 6/2011 | Neter et al. |
| 2015/0146060 A1 | 5/2015 | Suzuki et al. |
| 2019/0246057 A1 | 8/2019 | Ebihara et al. |
| 2020/0068147 A1 | 2/2020 | Hayashi et al. |
| 2020/0204751 A1 | 6/2020 | Lule |
| 2021/0021782 A1 | 1/2021 | Sato et al. |
| 2021/0151485 A1 | 5/2021 | Ma et al. |
| 2021/0183926 A1 | 6/2021 | Choi et al. |
| 2021/0203865 A1 | 7/2021 | Manabe et al. |
| 2021/0250530 A1 | 8/2021 | Paik et al. |
| 2021/0274119 A1 | 9/2021 | Nakamura |
| 2021/0274121 A1 | 9/2021 | Kim et al. |
| 2022/0013551 A1 * | 1/2022 | Mun ................ H01L 21/76283 |
| 2023/0134685 A1 * | 5/2023 | Lim ..................... H04N 25/77 |

\* cited by examiner

IMAGE SENSOR

CROSS-REFERENCE TO RELATED APPLICATION

This application claims priority under 35 U.S.C. § 119 to and the benefit of Korean Patent Application No. 10-2021-0164972 filed in the Korean Intellectual Property Office on Nov. 25, 2021, and Korean Patent Application No. 10-2022-0106204 filed in the Korean Intellectual Property Office on Aug. 24, 2022, the entire contents of which are incorporated herein by reference.

BACKGROUND

The aspects of the present invention relate to an image sensor.

An image sensor is a device for capturing a two-dimensional or three-dimensional image of an object. The image sensor generates an image of an object using a photoelectric transducer that responds to the intensity of light reflected from the object.

Recently, the demand for image sensors with improved performance in various fields is increasing. A complementary metal-oxide semiconductor (CMOS) image sensor is an image pickup device manufactured using a CMOS process. Compared to a charge-coupled device (CCD) image sensor, the CMOS image sensor has advantages of low manufacturing cost, low power consumption, and high integration.

However, there is a problem in that the image acquired through the CMOS image sensor is greatly affected by a signal to noise ratio (SNR) of the CMOS image sensor. In particular, a signal-to-noise ratio dip (SNR dip) phenomenon, in which the signal-to-noise ratio sharply decreases when synthesizing low-illuminance and high-illuminance images, is one of the main factors that deteriorate the image quality.

SUMMARY

Some embodiments of the inventive concept may provide an image sensor having advantages of having a reduced signal-to-noise ratio.

Some embodiments of the inventive concept may provide an image sensor having advantages of having an improved signal-to-noise ratio dip phenomenon.

According to some embodiments of the inventive concept, there may be provided an image sensor, including: a pixel including a first floating diffusion and a second floating diffusion including a lateral overflow integration capacitor (LOFIC), generating a first pixel signal based on a quantity of charge of the first floating diffusion, and generating a second pixel signal based on the quantity of charge of the first floating diffusion and a quantity of charge of the second floating diffusion; a column line connected to the pixel and transmitting the first pixel signal or the second pixel signal; a ramp signal generator generating a first reference signal and a second reference signal; and a readout circuit connected to the column line and generating an image signal based on a plurality of comparison results including a first comparison result obtained by comparing the first pixel signal with the first reference signal, a second comparison result obtained by comparing the second pixel signal with the first reference signal, and a third comparison result obtained by comparing the second pixel signal with the second reference signal.

In some embodiments of the inventive concept, the first reference signal may include a plurality of ramp signals having a first slope, the second reference signal may include a plurality of ramp signals having a second slope different from the first slope, and the plurality of comparison results may further include a fourth comparison result obtained by comparing the first pixel signal and the second reference signal.

In some embodiments of the inventive concept, the pixel may further include a third floating diffusion, the second pixel signal may be generated further based on a quantity of charge of the third floating diffusion, and the pixel may further generate a third pixel signal based on the quantity of charge of the first floating diffusion and the quantity of charge of the third floating diffusion.

In some embodiments of the inventive concept, the first reference signal may include a plurality of ramp signals having a first slope, the second reference signal may include a plurality of ramp signals having a second slope different from the first slope, and the plurality of comparison results may further include a fourth comparison result obtained by comparing the third pixel signal and the second reference signal.

In some embodiments of the inventive concept, the image sensor may further include a first comparator receiving the first pixel signal, the second pixel signal, and the first reference signal and outputting the first comparison result and the second comparison result; and a second comparator receiving the second pixel signal, the third pixel signal, and the second reference signal, and outputting the third comparison result and the fourth comparison result.

In some embodiments of the inventive concept, the first reference signal may include a plurality of ramp signals having a first slope, the second reference signal may include a plurality of ramp signals having a second slope different from the first slope, and the plurality of comparison results may further include a fourth comparison result obtained by comparing the first pixel signal and the second reference signal.

In some embodiments of the inventive concept, the ramp signal generator may further generate a third reference signal having a third slope, and the plurality of comparison results may further include a fifth comparison result obtained by comparing the third pixel signal and the third reference signal.

In some embodiments of the inventive concept, the ramp signal generator may maintain the third slope when an analog gain increases for the image sensor.

In some embodiments of the inventive concept, the readout circuit may include a first comparator receiving the first pixel signal, the second pixel signal, and the first reference signal and outputting the second comparison result and the fourth comparison result, a second comparator receiving the first pixel signal, the second pixel signal, and the second reference signal and outputting the third comparison result and the fourth comparison result, and a third comparator receiving the third pixel signal and the third reference signal, and outputting the fifth comparison result.

In some embodiments of the inventive concept, the ramp signal generator may further generate a fourth reference signal having a fourth slope different from the third slope, and the plurality of comparison results further include a sixth comparison result obtained by comparing the third pixel signal and the fourth reference signal.

In some embodiments of the inventive concept, the ramp signal generator may maintain the fourth slope when an analog gain increases for the image sensor.

In some embodiments, the readout circuit may further include a fourth comparator receiving the third pixel signal and the fourth reference signal and outputting the sixth comparison result.

In some embodiments of the inventive concept, the pixel may include the first floating diffusion, the second floating diffusion, and the third floating diffusion as a first sub-pixel and a fourth floating diffusion having the same capacitance as the first floating diffusion, a fifth floating diffusion having the same capacitance as the second floating diffusion, and a sixth floating diffusion having the same capacitance as the third floating diffusion as second sub-pixels, and generate a fourth pixel signal based on a quantity of charge of the fourth floating diffusion, generate a fifth pixel signal based on the quantity of charge of the fourth floating diffusion and a quantity of charge of the fifth floating diffusion, and generate a sixth pixel signal based on the quantity of charge of the fourth floating diffusion, the quantity of charge of the fifth floating diffusion, and a quantity of charge of the sixth floating diffusion, and the column line may include a first column line connected to the first sub-pixel and a second column line connected to the second sub-pixel, and the readout circuit may generate the first comparison result by comparing an average value of the first pixel signal and the fourth pixel signal with the first reference signal when comparing the first pixel signal with the first reference signal, generate the second comparison result obtained by comparing an average value of the second pixel signal and the fifth pixel signal with the first reference signal when comparing the second pixel signal with the first reference signal, generate the third comparison result obtained by comparing an average value of the second pixel signal and the fifth pixel signal with the second reference signal when comparing the second pixel signal with the second reference signal, and generate the fourth comparison result obtained by comparing an average value of the third pixel signal and the sixth pixel signal with the second reference signal when comparing the second pixel signal with the second reference signal.

According to some embodiments of the inventive concept, there may be provided an image sensor, including: a photoelectric device; a transfer transistor connected between a first node and the photoelectric device; a first floating diffusion connected to the first node; a first switch transistor connected between the first node and the second node; a second floating diffusion connected to the second node; a second switch transistor connected between a power supply voltage line and the second node; a drive transistor generating a pixel signal in response to a voltage of the first node and outputting the pixel signal to a column line; a readout circuit connected to the column line, and comparing the pixel signal with a first reference signal including a ramp signal having a first slope among a plurality of reference signals and comparing the pixel signal with a second reference signal including a ramp signal having a second slope different from the first slope among the plurality of reference signals to generate an image signal; and a ramp signal generator generating a plurality of reference signals including a plurality of ramp signals and transmitting the plurality of reference signals to the readout circuit.

In some embodiments of the inventive concept, the pixel signal may include a first pixel signal generated by a drive transistor while the first switch transistor is turned off and a second pixel signal generated by the drive transistor while the first switch transistor is turned on and the second switch transistor is turned off.

In some embodiments of the inventive concept, the image sensor may further include: a third switch transistor connected between the first node and a third node; and a third floating diffusion connected to the third node, in which the pixel signal may further include a third pixel signal generated by the drive transistor while the first switch transistor and the third switch transistor are turned on.

In some embodiments, the image sensor may further include a third floating diffusion connected in series with the second switch transistor, in which the pixel signal may further include a third pixel signal generated by the drive transistor while the first switch transistor and the second switch transistor are turned on.

In some embodiments of the inventive concept, the readout circuit may compare the first pixel signal and the third pixel signal with the first reference signal and compare the second pixel signal and the third pixel signal with the second reference signal to generate the image signal.

In some embodiments of the inventive concept, the plurality of reference signals may further include a third reference signal including a ramp signal having a third slope generated by the ramp signal generator in synchronization with the third pixel signal, and the readout circuit may compare the first pixel signal and the second pixel signal with the first reference signal, compare the first pixel signal and the second pixel signal with the second reference signal, and compare the third pixel signal with the third reference signal to generate the image signal.

In some embodiments of the inventive concept, the ramp signal generator may maintain a slope of a ramp signal in the third reference signal when an analog gain increases for the image sensor.

In some embodiments of the inventive concept, the plurality of reference signals may further include a fourth reference signal including a ramp signal having a fourth slope generated by the ramp signal generator in synchronization with the third pixel signal, and the readout circuit may further include a fourth comparator comparing the third pixel signal with the fourth reference signal.

In some embodiments of the inventive concept, the ramp signal generator may maintain a slope of a ramp signal in the fourth reference signal when an analog gain increases for the image sensor.

According to some embodiments of the inventive concept, there may be provided a method performed by an image sensor, including: generating a first pixel signal based on the quantity of charge of a first floating diffusion and a second pixel signal based on the quantity of charge of the first floating diffusion and a quantity of charge of the second floating diffusion in a pixel including the first floating diffusion and the second floating diffusion; generating a first reference signal including a ramp signal having a first slope and a second reference signal including a ramp signal having a second slope different from the first slope; and generating an image signal based on a plurality of comparison results including a first comparison result obtained by comparing the first pixel signal with the first reference signal, a second comparison result obtained by comparing the second pixel signal and the first reference signal, and a third comparison result obtained by the second pixel signal with the second reference signal.

DETAILED DESCRIPTION OF THE EMBODIMENTS

Figure 1:
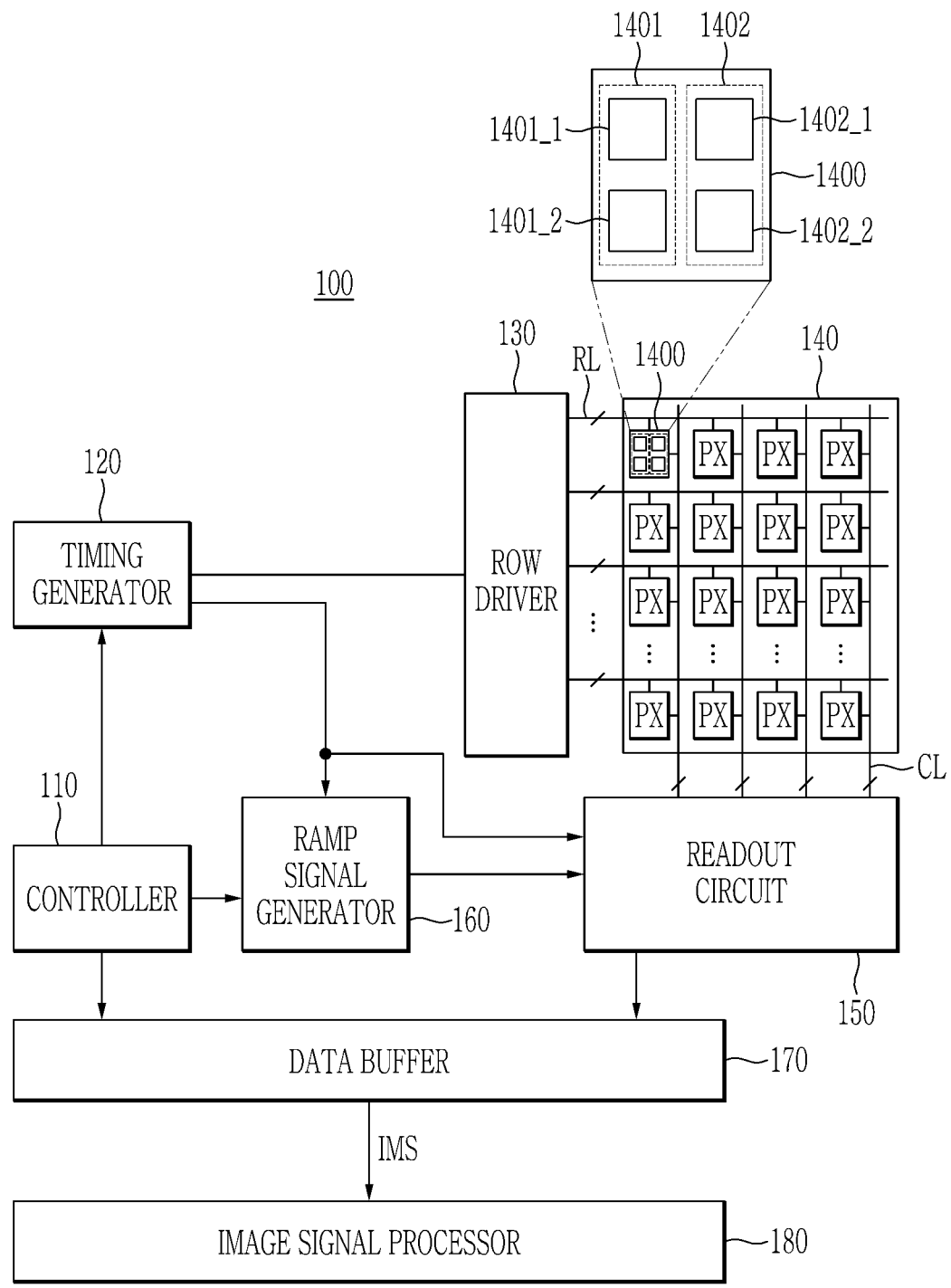
FIG. 1 is an example block diagram of an image sensor according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In flowcharts described with reference to the drawings, an order of operations may be changed, several operations may be merged, some operations may be divided, and specific operations may not be performed.

In addition, an expression written in singular may be construed in singular or plural unless an explicit expression such as "one" or "single" is used. Terms including an ordinal number such as first, second, etc., may be used to describe various components, but the components are not limited to these terms. These terms may be used for the purpose of distinguishing one component from other components.

FIG. 1 is an example block diagram of an image sensor according to an embodiment.

Referring to FIG. 1, an image sensor 100 according to an embodiment of the present invention includes a controller 110, a timing generator 120, a row driver 130, a pixel array 140, a readout circuit 150, a ramp signal generator 160, a data buffer 170, and an image signal processor 180. In some embodiments, the image signal processor 180 may be located outside the image sensor 100.

The image sensor 100 may generate an image signal by converting light received from the outside into an electrical signal. The image signal IMS may be provided to the image signal processor 180.

The image sensor 100 may be mounted in an electronic device having an image or a light sensing function. For example, the image sensor 100 may be mounted in electronic devices such as a camera, a smart phone, a wearable device, an Internet of Things (IoT) device, a home appliance, a tablet personal computer (PC), a personal digital assistant (PDA), or a portable multimedia player (PMP), navigation, a drone, and an advanced drivers assistance system (ADAS). Alternatively, the image sensor 100 may be mounted in an electronic device provided as a component in a vehicle, furniture, manufacturing facility, a door, various measurement devices, and the like.

The controller 110 may control each of the components 120, 130, 150, 160, and 170 included in the image sensor 100 as a whole. The controller 110 may control an operation timing of each of the components 120, 130, 150, 160, and 170 using control signals. According to an embodiment, the controller 110 may control the ramp signal generator 160 to adjust a reference signal RAMP generated by the ramp signal generator 160, and control the timing generator 120 to adjust a capacitance of a floating diffusion (FD) of a pixel circuit in the pixel array 140 through the row decoder 130.

In some embodiments, the controller 110 may receive a mode signal indicating an imaging mode from an application processor, and control the image sensor 100 as a whole based on the received mode signal. For example, the application processor may determine the imaging mode of the image sensor 100 according to various scenarios such as illuminance of an imaging environment, user's resolution setting, a detected or trained state, and the like, and provide the determined result to the controller 110 as a mode signal. The controller 110 may control a plurality of pixels of the pixel array 140 to output the pixel signal according to the imaging mode, the pixel array 140 may output pixel signals for each of the plurality of pixels or pixel signals for a portion of the plurality of pixels, and the readout circuit 150 may sample and process the pixel signals received from the pixel array 140. The timing generator 120 may generate a signal that is a reference for an operation timing of components of the image sensor 100. The timing generator 120 may control the timings of the row driver 130, the readout circuit 150, and the ramp signal generator 160. The timing generator 120 may provide a control signal for controlling the timings of the row driver 130, the readout circuit 150, and the ramp signal generator 160.

The pixel array 140 may include a plurality of pixels PX, and a plurality of row lines RLs and a plurality of column lines CLs respectively connected to the plurality of pixels PXs. In some embodiments, each pixel PX may include at least one photoelectric device (or referred to as a photosensing device). The photoelectric device may detect incident light and convert the incident light into an electrical signal according to the quantity of light, that is, a plurality of analog pixel signals. A level of the analog pixel signal output from the photoelectric device may be proportional to the quantity of charge output from the photoelectric device. That is, the level of the analog pixel signal output from the photoelectric device may be proportional to the quantity of light received into the pixel array 140.

The pixel array 140 may adjust a conversion gain while generating a plurality of analog pixel signals. The conversion gain is a magnitude of the analog pixel signal output from the pixel array 140 for a unit photocharge generated by photoelectric conversion. Here, the conversion gain may be adjusted by changing the capacitance of the floating diffusion (FD) using a plurality of transistors included in one pixel in the pixel array 140.

The row line RL may extend in a first direction and may be connected to the pixels PXs disposed along the first direction. For example, the row line RL may transmit a control signal output from the row driver 130 to a device included in the pixel PX, for example, a transistor. In addition to the row line RL, other signal lines may be arranged in the first direction. The column line CL may extend in a second direction intersecting the first direction and may be connected to the pixels PXs arranged along the second direction. The column line CL may transmit the pixel signals output from the pixels PX to the readout circuit 150.

In some embodiments, one pixel PX may include a plurality of sub-pixel groups. The sub-pixel groups may be arranged in the form of M*N (M and N are an integer greater than or equal to 2). In the M*N form, M sub-pixel groups may be arranged in an arrangement direction of the column lines CLs and N sub-pixel groups may be arranged in an arrangement direction of the row lines RLs.

For example, one pixel 1400 may include a plurality of sub-pixel groups 1401 and 1402 each arranged in a 1*2 form. In FIG. 1, one pixel 1400 is illustrated as including two sub-pixel groups 1401 and 1402, but is not limited thereto. One pixel may include an arbitrary number of sub-pixel groups arranged in an M*N form.

The pixel array 140 may operate in units of sub-pixel groups. One sub-pixel group may include a plurality of sub-pixels. Specifically, the sub-pixel group 1401 may include sub-pixels 1401_1 and 1401_2. The sub-pixel group 1402 may include sub-pixels 1402_1 and 1402_2. Each of the plurality of sub-pixels 1401_1, 1401_2, 1402_1, and 1402_2 may include one or more photoelectric devices (or photo-sensing devices).

Each of the plurality of sub-pixel groups 1401 and 1402 may output one analog pixel signal. In this case, voltage levels of analog pixel signals output from one sub-pixel group 1401 and 1402 may be a total sum of voltage levels output from each of the sub-pixels 1401_1, 1401_2, 1402_1, and 1402_2 in the sub-pixel groups 1401 and 1402. Sub-pixels included in one sub-pixel group 1401 and 1402 may have the same color filter.

In an embodiment, the pixel array 140 may output analog signals from each of the sub-pixels 1401_1, 1401_2, 1402_1, and 1402_2. For example, in a high-illuminance environment, an application processor may provide a mode signal indicating a full mode to the image sensor 100. The high-illuminance environment may be an environment in which the quantity of light is higher than that of a low-illuminance environment. A full mode may refer to performing a readout operation on voltages detected by all sub-pixels constituting the pixel array 140. When receiving the mode signal indicating the full mode, the image sensor 100 may control the pixel array 140 to output pixel signals generated by each of all the sub-pixels of the pixel array 140, and individually process the output pixel signals. Since the number of output analog signals is large, a shape, a contrast, etc., of the external environment of the image sensor 100 may be clearly displayed in the full mode.

In an embodiment, the pixel array 140 may output the pixel signals from the sub-pixel groups 1401 and 1402 instead of outputting the analog signals from each of the sub-pixels 1401_1, 1401_2, 1402_1, and 1402_2. The quantity of light received by the sub-pixel group may be a total sum of the quantity of light received by each sub-pixel in the sub-pixel group. For example, in the low-illuminance environment, the application processor may provide a mode signal indicating a binning mode to the image sensor 100. The low-light environment may be an environment in which the quantity of light is insufficient, such as indoors or at night. The binning mode may refer to a mode in which a sum (or average value) of output values of sub-pixels included in one set is output as one analog pixel signal. When the mode signal indicating the binning mode is received, the image sensor 100 controls the pixel array 140 to output pixel signals generated in units of sub-pixels adjacently located within one sub-pixel group or pixel signals generated in units of the predetermined number of the same color pixels. When the mode signal indicating the binning mode is received, the image sensor 100 may output, as one sub-pixel signal 1401, the summed value of voltages detected by each of the plurality of sub-pixels 1401_1 and 1401_2 in one sub-pixel group 1401. In addition, the image sensor 100 may output, as one pixel signal, the summed value of voltages detected by each of the plurality of sub-pixels 1402_1 and 1402_2 in one sub-pixel group 1402. Accordingly, the pixel signal output in the binning mode may include information of the sufficient quantity of light even in the low-illuminance environment, and thus, colors of the external environment of the image sensor 100 may be displayed abundantly.

In the following descriptions, it is assumed that the image sensor 100 operates in the binning mode.

The row driver 130 may generate a control signal for driving the pixel array 140 in response to the control signal of the timing generator 120, and provide the control signal to the plurality of pixels PXs of the pixel array 140 through the plurality of row lines RLs. In some embodiments, the row driver 130 may control a plurality of pixels PX to detect the incident light in a row line unit. The row line unit may include at least one row line RL. For example, the row driver 130 transmits a transfer signal TG, a reset signal RG, a select signal SEL, a gain control signal DCG, and the like to the pixel array 140 as will be described later.

The readout circuit 150 may convert pixel signals (or electrical signals) from pixels PXs connected to the row line RL selected from a plurality of pixels PX in response to the control signal from the timing generator 120 into pixel values indicating the quantity of light. The readout circuit 150 may convert a pixel signal output through a corresponding column line CL into a pixel value. For example, the readout circuit 150 may convert a pixel signal into a pixel value by comparing the ramp signal with the pixel signal. The pixel value may be image data having a plurality of bits. Specifically, the readout circuit 150 may include a selector, a plurality of comparators, a plurality of counter circuits, and the like.

The ramp signal generator 160 may generate a reference signal and transmit the generated reference signal to the readout circuit 150.

The ramp signal generator 160 may include a current source, a resistor, and a capacitor. The ramp signal generator 160 may adjust a ramp voltage, which is a voltage applied to the ramp resistor, by adjusting a current magnitude of a variable current source or a resistance value of a variable resistor, thereby generating the plurality of ramp signals falling or rising in a slope determined according to the current magnitude of the variable current source or the resistance value of the variable resistor.

Also, the ramp signal generator 160 may adjust the gain of the ramp voltage by adjusting a frequency of a clock. The "gain" of the ramp voltage may refer to a degree to which a signal is amplified, and may also be defined as an analog gain.

Here, the gain of the ramp voltage may be based on a magnitude of an absolute value of the slope of the ramp signal. For example, the ramp signal may have a waveform that maintains a constant voltage, lowers the voltage to the determined slope, and returns back to a constant voltage. As an absolute value of a slope of a portion in which the voltage of the ramp signal is lowered increases, the number of signals that may be detected for the same time may decrease. Accordingly, the steeper the slope of the portion where the voltage of the ramp signal is lowered, the smaller the analog gain. Conversely, the gentler the slope of the portion where the voltage of the ramp signal is lowered, the greater the analog gain.

The data buffer 170 may store the pixel values of the plurality of pixels PXs connected to the selected column line CL transferred from the readout circuit 150, and output the stored pixel values in response to an enable signal from the controller 110.

The image signal processor 180 may perform image signal processing on the image signal received from the data buffer 170. For example, the image signal processor 180 may receive a plurality of image signals from the data buffer 170, and synthesize the received image signals to generate one image.

Figure 2A:
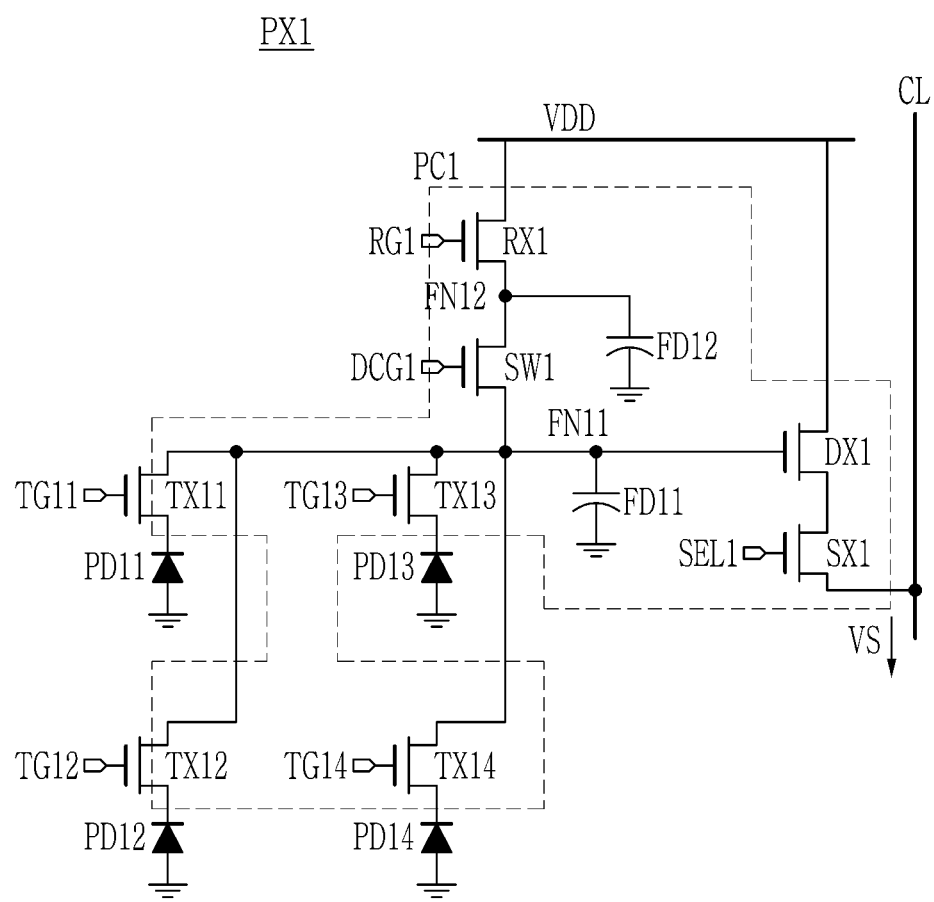
FIGS. 2A and 2B are example circuit diagrams illustrating a pixel according to an embodiment.

FIG. 2A is an example circuit diagram illustrating a pixel according to an embodiment.

A pixel PX1 according to an embodiment may include a pixel circuit PC1 that processes charges generated by photoelectric devices PD11, PD12, PD13, and PD14 responding to light to output an electrical signal. In FIG. 2A, one pixel PX1 is illustrated as including four photoelectric devices PD11, PD12, PD13, and PD14, but aspects of the present invention are not limited thereto, and one pixel PX1 may include less or more photoelectric devices. The photoelectric devices PD11, PD12, PD13, and PD14 may detect external light to generate charges.

Cathodes of the photoelectric devices PD11, PD12, PD13, and PD14 may be connected to a floating node FN11 through the transfer transistors TX11, TX12, TX13, and TX14, and anodes of the photoelectric devices PD11, PD12, PD13, and PD14 may be grounded.

The pixel circuit PC1 may include a plurality of transistors, such as transfer transistors TX11, TX12, TX13, and TX14, a drive transistor DX1, a select transistor SX1, a reset transistor RX1, and a switch transistor SW1. The transistors TX11, TX12, TX13, TX14, SX1, RX1, and SW1 in the pixel circuit PC1 may operate in response to control signals provided from the row driver 130, for example, transfer control signals TG11, TG12, TG13, and TG14, a select signal SEL1, a reset control signal RG1, and a first gain control signal DCG1.

In some embodiments, the pixel circuit PC1 may include a plurality of floating diffusions FD11 and FD12. Each of the plurality of floating diffusions FD11 and FD12 may have a predetermined capacitance and may store charges generated by the photoelectric devices PD11 and PD12. Although two floating diffusions FD11 and FD12 are illustrated in FIG. 2A, the pixel circuit PC1 may have three or more floating diffusions.

The transfer transistor TX11 may be connected between the photoelectric device PD11 and the floating node FN11 and may be controlled by the transfer signal TG11. When the transfer transistor TX11 is turned on, charges generated by the photoelectric device PD11 may be transferred to the floating diffusion FD11.

The transfer transistor TX12 may be connected between the photoelectric device PD12 and the floating node FN11 and may be controlled by the transfer signal TG12. When the transfer transistor TX12 is turned on, charges generated by the photoelectric device PD12 may be transferred to the floating diffusion FD11. The transfer transistor TX11 and the transfer transistor TX12 are connected in parallel.

The transfer transistor TX13 may be connected between the photoelectric device PD13 and the floating node FN11 and may be controlled by the transfer signal TG13. When the transfer transistor TX13 is turned on, charges generated by the photoelectric device PD13 may be transferred to the floating diffusion FD11.

The transfer transistor TX14 may be connected between the photoelectric device PD14 and the floating node FN11 and may be controlled by the transfer signal TG14. When the transfer transistor TX14 is turned on, charges generated by the photoelectric device PD14 may be transferred to the floating diffusion FD11.

The voltage of the floating node FN11 may be determined according to the charges accumulated in the floating diffusion FD11. A conversion gain, which is a ratio at which charges are converted into a voltage, may be inversely proportional to a capacitance of the floating diffusion FD11. For example, when the capacitance of the floating diffusion FD11 increases, the conversion gain decreases, and when the capacitance decreases, the conversion gain increases.

A gate of the drive transistor DX1 is connected to the floating node FN11. The drive transistor DX1 may operate as a source-follower amplifier for the voltage of the floating node FN11. The drive transistor DX1 may output a pixel signal VS to the column line CL through the select transistor SX1 in response to the voltage of the floating node FN11.

The select transistor SX1 may be connected between the drive transistor DX1 and the column line CL and may be controlled by the select signal SEL1. When the select transistor SX1 is turned on, the pixel voltage VS output from the drive transistor DX1 may be output to the readout circuit (150 of FIG. 1) through the column line CL connected to the select transistor SX1.

The reset transistor RX1 may be connected between the power supply voltage line supplying a power supply voltage VDD and the floating node FN12, and may be controlled by the reset control signal RG1. When the reset transistor RX1 is turned on by the reset signal RG1, the power supply voltage VDD may be applied to the floating node FN12 to reset the floating node FN12. When the switch transistor SW1 is turned on while the reset transistor RX1 is turned on, both the floating node FN11 and the floating node FN12 may be reset to the power supply voltage VDD.

The switch transistor SW1 may be connected between the floating node FN11 and the floating node FN12 and may be controlled by the first gain control signal DCG1.

When the switch transistor SW1 is turned off, the floating node FN11 has the capacitance of the floating diffusion FD11. In this case, since the magnitude of the capacitance connected to the floating node FN11 decreases, the image sensor 100 may generate an image signal in a high conversion gain (HCG) mode. Gains of circuits (e.g, the readout circuit 150) for processing the pixel signal VS when operating in the HCG mode may be relatively smaller than that of the readout circuit 150 when operating in a low conversion gain (LCG) mode. Accordingly, the SNR of the image sensor 100 may increase to lower the minimum quantity of light detectable, and the low quantity of light detection performance of the image sensor 100 may be improved.

When the switch transistor SW1 is turned on, the floating diffusion FD12 may be connected to the floating node FN11. Since the floating diffusion FD11 and the floating diffusion FD12 are connected in parallel to the floating node FN11, the capacitance of the floating node FN11 increases by the capacitance of the floating diffusion FD12 before the switch transistor SW1 is turned on. In this case, since the magnitude of the capacitance connected to the floating node FN11 is larger than before the switch transistor SW1 is turned on, the image sensor 100 may operate in the LCG mode in which a larger quantity of charge may be processed in a pixel compared to the HCG mode to generate the image signal. Accordingly, the high quantity of light detection performance of the image sensor 100 may be improved.

In some embodiments, the floating diffusion FD12 may include a lateral overflow integration capacitor (LOFIC). When the floating diffusion FD12 includes the LOFIC, the overflowing charges among charges transferred from the photoelectric devices PD11 and PD12 to the floating node FD11 may be shared by the floating diffusion FD12. In this case, since the magnitude of the capacitance connected to the floating node FN11 increases, the image sensor 100 may generate an image signal in the LOFIC conversion gain mode. Similarly, full well capacity (FWC) may increase even in the LOFIC conversion gain mode. Accordingly, the high quantity of light detection performance of the image sensor 100 may be improved. That is, a large quantity of charge overflowing from the photoelectric devices PD11 and PD12 may be integrated without being wasted by the floating diffusion FD12, so the image sensor 100 may generate an image signal detected under a relatively high quantity of light.

In summary, the pixel PX1 may operate in the LCG mode when the switch transistor SW1 is turned on and in the HCG mode when the switch transistor SW1 is turned off. Alternatively, the pixel PX1 may operate in the LOFIC mode when the switch transistor SW1 is turned on and in the HCG mode when the switch transistor SW1 is turned off. On the other hand, since the floating diffusion FD12 including the LOFIC is often used to store a large amount of signals in one floating diffusion, the floating diffusion FD12 may be mainly used in the binning mode in which charges generated by a plurality of sub-pixels should be stored rather than the full mode in which the charges generated by one sub-pixel should be stored.

In some embodiments, since the pixel array 140 operates in two modes (HCG mode and LCG mode; or HCG mode and LOFIC mode) in one frame period, the image signal processor 180 may generate one synthesized image signal having a high dynamic range by synthesizing image signals according to each mode.

However, when the image signal processor 180 merges image signals generated under different conditions, a signal-to-noise ratio dip (SNR dip) may occur. The SNR dip refers to a phenomenon in which the SNR rapidly decreases at each boundary between the image signals when the image signal processor 180 synthesizes image signals generated in two modes in which pixels operate with different capacitances.

For example, in the case where the pixel array 140 operates in the HCG mode and the LCG mode in one frame period, when synthesizing the image signal according to the HCG mode and the image signal according to the LCG mode, the SNR dip may occur at the boundary between the image signal according to the HCG mode and the image signal according to the LCG mode. Alternatively, in the case where the pixel array 140 operates in the HCG mode and the LCG mode in one frame period, when synthesizing the image signal according to the HCG mode and the image signal according to the LCG mode, the SNR dip may occur at the boundary between the image signal according to the HCG mode and the image signal according to the LOFIC mode. In the LCG mode and the LOFIC mode, the first floating diffusion FD11 and the second floating diffusion FD12 connected in parallel are used, and in the HCG mode, the first floating diffusion FD11 is used, and therefore, as the difference in capacitance between the first floating diffusion FD11 and the second floating diffusion FD12 may increase, the magnitude of the SNR dip occurring in one synthesized image signal may further increase. The SNR dip may sharply appear in a region where illuminance changes in one synthesized image signal, and may deteriorate image quality.

Figure 2B:
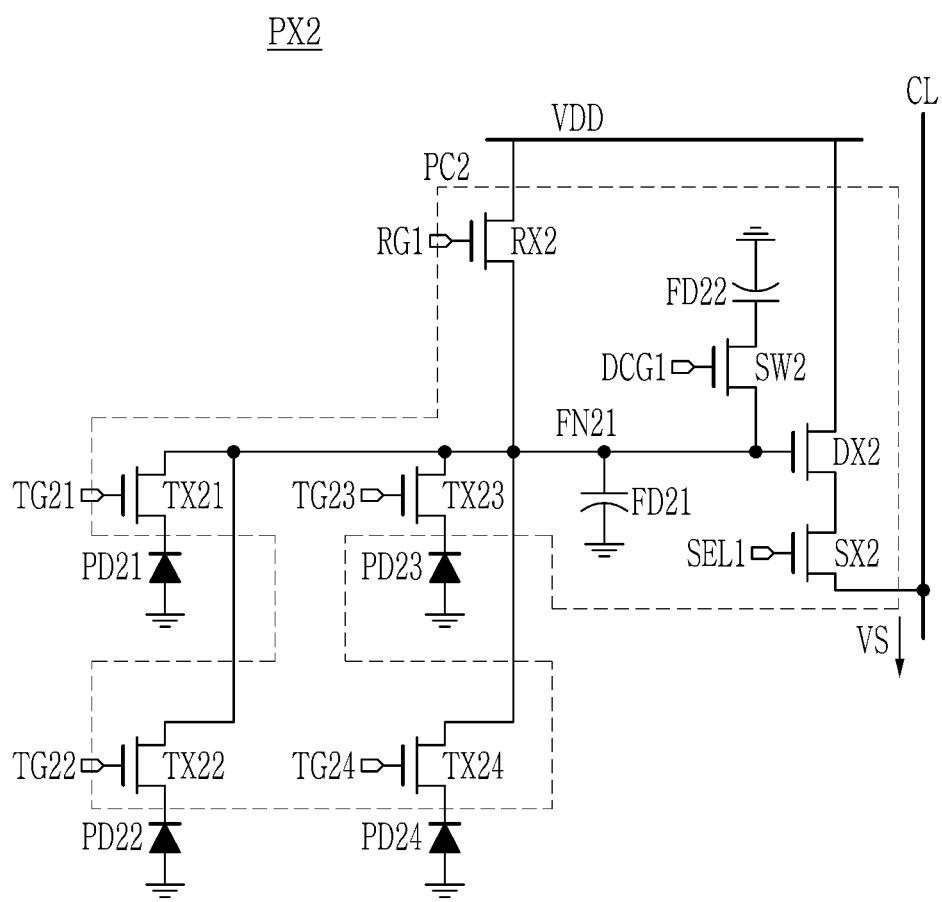

FIG. 2B is an example circuit diagram illustrating a pixel according to another embodiment.

Photoelectric devices PD21, PD22, PD23, and PD24, transfer transistors TX21, TX22, TX23, and TX24, a drive transistor DX2, a select transistor SX2, and a reset transistor RX2 of a pixel PX2 illustrated in FIG. 2B may have the same configuration as the photoelectric devices PD11, PD12, PD13, and PD14, the transfer transistors TX11, TX12, TX13, and TX14, the drive transistor DX1, the select transistor SX1, and the reset transistor RX1 of the pixel PX1 illustrated in FIG. 2A, respectively.

Meanwhile, in some embodiments, a pixel circuit PC2 may include a plurality of floating diffusions FD21 and FD22 in addition to the plurality of transistors listed above. The floating diffusions FD21 and FD22 may have a predetermined capacitance and store charges generated by the photoelectric devices PD21, PD22, PD23, and PD24. Although two floating diffusions FD21 and FD22 are illustrated in FIG. 2B, the pixel circuit PC2 may have three or more floating diffusions.

The switch transistor SW2 may be connected between the floating node FN21 and the floating node FN22 and may be controlled by the first gain control signal DCG1.

When the switch transistor SW2 is turned off, the floating node FN21 has the capacitance of the floating diffusion FD21. In this case, since the magnitude of the capacitance connected to the floating node FN21 decreases, the image sensor 100 may generate an image signal in the HCG mode.

When the switch transistor SW2 is turned on, the floating diffusion FD22 is connected to the floating node FN21, and the capacitance of the floating node FN21 increases by the capacitance of the floating diffusion FD22. In this case, according to the capacitance of the floating diffusion FD22, the image sensor 100 may generate the image signal in the LCG mode or may generate the image signal in the LOFIC conversion gain mode.

In summary, the pixel PX2 may operate in the LCG mode when the switch transistor SW2 is turned on and in the HCG mode when the switch transistor SW2 is turned off. Alternatively, the pixel PX2 may operate in the LOFIC mode when the switch transistor SW2 is turned on and in the HCG mode when the switch transistor SW2 is turned off.

The connection relationship between the plurality of floating diffusions included in the pixel PX according to aspects of the present invention is not limited to the structure of the specific pixel circuit illustrated in FIGS. 2A and 2B, and the pixel circuit has an arbitrary connection relationship and may have a structure including the connected floating diffusion. Hereinafter, for convenience of description, it is assumed that the pixel PX according to aspects of the present invention has the structure illustrated in FIG. 2A.

Figure 3:
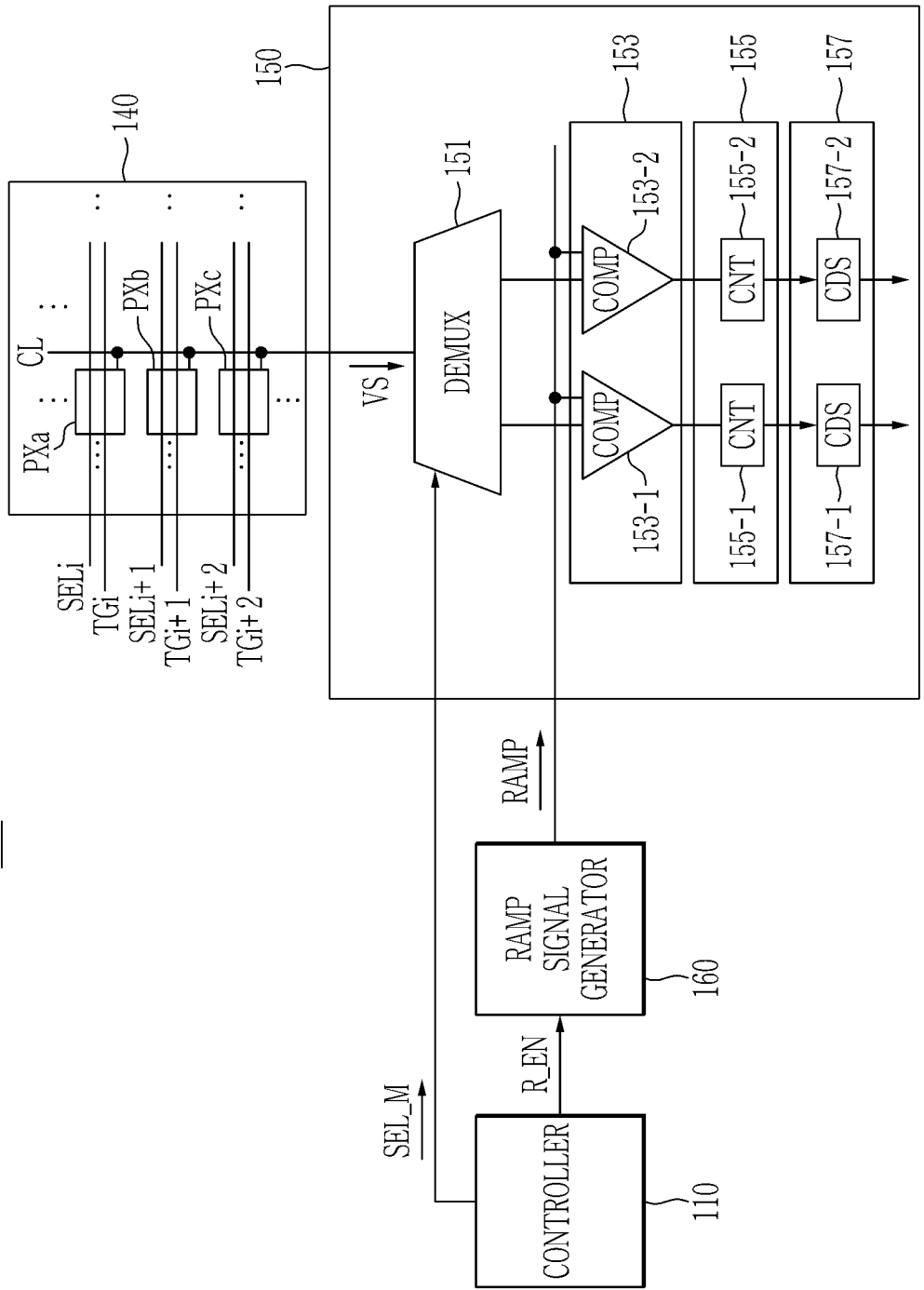
FIG. 3 is an example block diagram illustrating a pixel array and a readout circuit according to an embodiment.

FIG. 3 is an example block diagram illustrating the pixel array and the readout circuit according to the embodiment.

Referring to FIG. 3, the pixel array 140 may include a plurality of pixels PXa, PXb, and PXc. Each of the plurality of pixels PXa, PXb, and PXc may receive a corresponding transfer signal among transfer signals TGi, TGi+1, and TGi+2 and a corresponding select signal among select signals SELi, SELi+1, and SELi+2. Each of the plurality of pixels PXa, PXb, and PXc may receive the corresponding select signal among the select signals SELi, SELi+1, and SELi+2 to output a pixel signal VS. Here, it is assumed that each of the plurality of pixels PXa, PXb, and PXc includes one sub-pixel.

The readout circuit 150 may include a selector 151, a comparator 153, a counter 155, and a CDS circuit 157 connected to each column line CL of the pixel array 140.

The selector 151 may be implemented as, for example, a de-multiplexer, but is not limited thereto. The selector 151 may be connected to one corresponding column line CL, and may receive the pixel signal VS from the connected column line CL. The selector 151 may receive the DEMUX select signal SEL_M from the controller 110 and output the pixel signal VS to the comparator 153 based on the DEMUX select signal SEL_M. In an embodiment, the selector 151 may include two output terminals. The selector 151 may output the pixel signal VS to any one of the two output terminals based on the DEMUX select signal SEL_M.

The comparator 153 may compare the pixel signal VS with a reference signal RAMP and output the result to the counter 155. In an embodiment, the comparator 153 may include a first comparator 153_1 and a second comparator 153_2. Each of the first comparator 153_1 and the second comparator 153_2 may have two input terminals and one output terminal. One of the two input terminals of the first comparator 153_1 may be connected to one of the two output terminals of the selector 151, and the other of the two input terminals may be connected to the ramp signal generator 160. An output terminal of the first comparator 153_1 may be connected to the counter 155_1. One of the two input terminals of the second comparator 153_2 may be connected to the other of the two output terminals of the selector 151, and the other of the two input terminals may be connected to the ramp signal generator 160. An output terminal of the second comparator 153_2 may be connected to the counter 155_2.

The ramp signal generator 160 may generate the reference signal RAMP in response to a ramp enable signal R_EN input from the controller 110. In some embodiments, the reference signal RAMP may include a ramp signal whose voltage level increases or decreases over time. In some embodiments, when the ramp signal included in the reference signal RAMP is a signal having a waveform that decreases with a predetermined slope, a timing when the magnitude of the signal input to the comparator 153_1 through the selector 151 is the same as that of the ramp signal of the reference signal RAMP may occur. In addition, a timing when the magnitude of the signal input to the comparator 153_2 through the selector 151 is the same as that of the ramp signal of the reference signal RAMP may occur. Since the magnitude of the signal input to the comparators 153_1 and 153_2 and the magnitude of the ramp signal of the reference signal RAMP are synchronized at the same timing, the level of the signal output from the comparators 153_1 and 153_2 may be shifted.

The counter 155 may count how long the specific level of the signal output from the comparator 153 is maintained. Specifically, the counter 155 may receive a clock from the timing generator 120. The counter 155 may count how long the specific level of the signal received from the comparator 153 is maintained using a rising edge or a falling edge of the clock signal. In an embodiment, the counter 155 may include the first comparator 155_1 and the second comparator 155_2. The counter 155_1 may be connected to the output terminal of the comparator 153_1. Also, the counter 155_2 may be connected to the output terminal of the comparator 153_2. The counter 155_1 may count the time a high level corresponding to logic level "1" is output from the comparator 153_1. The counter 155_2 may count the time the high level corresponding to the logic level "1" is output from the comparator 153_2. The counters 155_1 and 155_2 may include an up/down counter or a bit-wise counter.

The CDS circuit 157 may generate an image signal by performing a correlated double sampling (CDS) method on the counting signal received from the counter 155. The CDS method is a method of measuring a desired value by removing an unwanted offset based on two inputs, that is, an output amount under a known condition and an output amount under an unknown condition. In an image sensor, the CDS may be performed based on a difference between a reset voltage and a signal voltage. In an embodiment, the CDS circuit 157 may include a CDS circuit 157_1 and a CDS circuit 157_2. The CDS circuit 157_1 may be connected to the output terminal of the counter 1551 to perform the CDS method on a counting signal received from the counter 155_1. In addition, the CDS circuit 157_2 may be connected to the output terminal of the counter 155_2 to perform the CDS method on a counting signal received from the counter 155_2.

Figure 4:
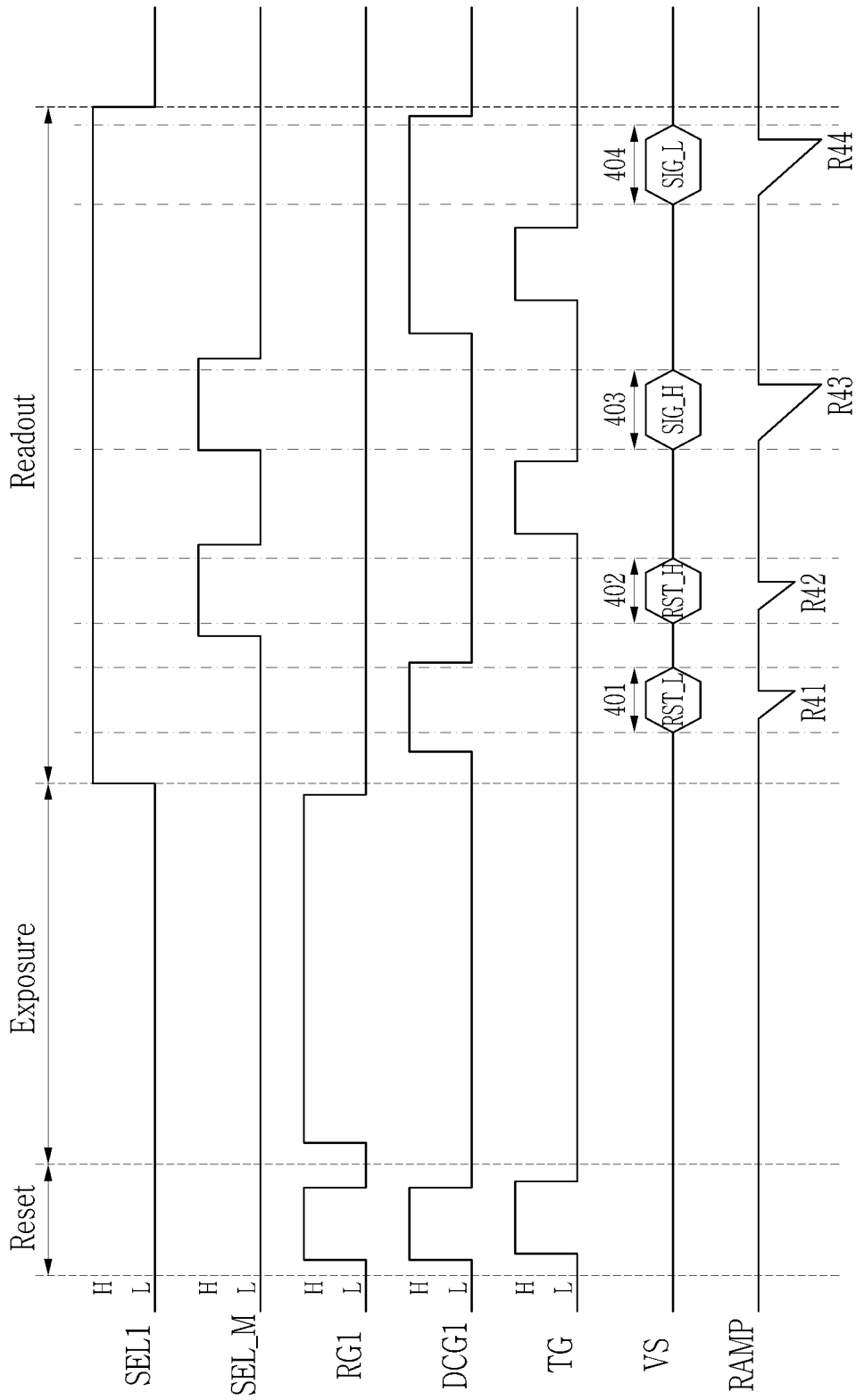
FIG. 4 is an example diagram illustrating an operation timing of an image sensor according to an embodiment.

FIG. 4 is an example diagram illustrating an operation timing of an image sensor according to an embodiment.

FIG. 4 illustrates a scan period for driving a plurality of pixels in a row line unit. One scan period may sequentially include a reset period Reset, an exposure period Exposure, and a readout period Readout.

FIG. 4 is a diagram illustrating a case in which the floating diffusion FD12 of the image sensor 100 operates in a readout method of the RST-RST-SIG-SIG (RRSS) when the floating diffusion FD12 does not include the LOFIC.

An operation of the image sensor will be described with reference to FIGS. 2A, 3, and 4.

In the reset period Reset, charges stored in the first floating diffusion FD11 and the second floating diffusion FD12 are reset.

In detail, a high-level first gain control signal DCG1 is applied to the gate of the first switch transistor SW1 to turn on the first switch transistor SW1. The floating diffusion FD11 and the floating diffusion FD12 are connected to the floating node FN11.

Figure 5:
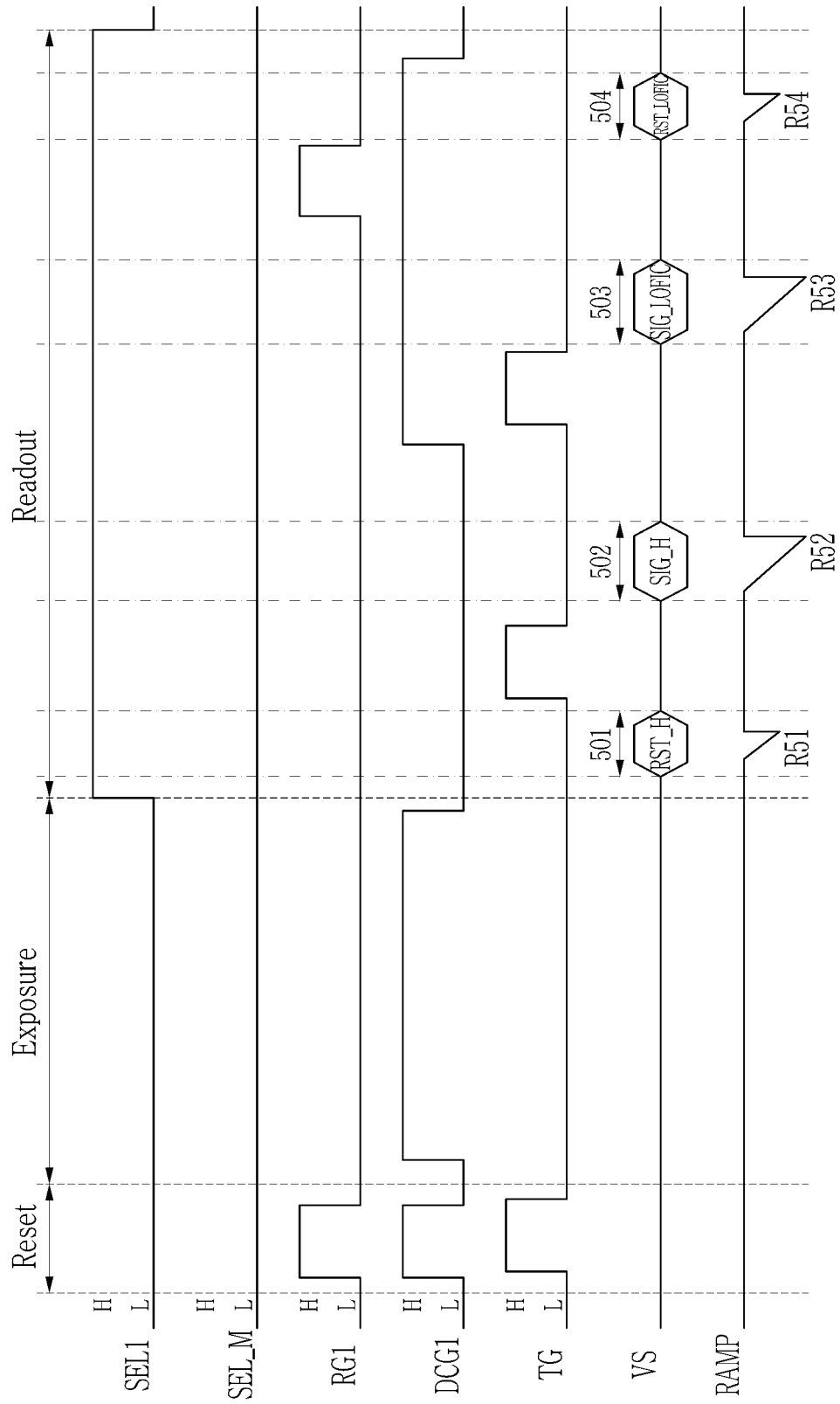
FIG. 5 is an example diagram illustrating an operation timing of an image sensor according to an embodiment.

The transfer signal TG11 applied to the transfer transistor TX11, the transfer signal TG12 applied to the transfer transistor TX12, the transfer signal TG13 applied to the transfer transistor TX13, and the transfer signal TG14 applied to the transfer transistor TX14 may all have the same waveform, which appears as the transfer signal TG in FIGS. 4 and 5. The high-level transfer signal TG is applied to gates of the transfer transistors TX11, TX12, TX13, and TX14, respectively, to turn on the transfer transistors TX11, TX12, TX13, and TX14. Charges generated by the photoelectric devices PD11, PD12, PD13, and PD14 may be provided to the floating diffusion FD11 and the floating diffusion FD12. However, a high-level reset signal RG1 is applied to a gate of the reset transistor RX1 to turn on the reset transistor RX1. Then, the power supply voltage VDD is supplied to the floating node FN11, so the floating diffusion FD11 and the floating diffusion FD12 are reset. In the present embodiment, the reset voltage may be, for example, the power supply voltage VDD. In this case, a low-level select signal SEL1 is applied to the select transistor SX1, so the select transistor SX1 is turned off.

The exposure period Exposure is a period in which the photoelectric devices PD11, PD12, PD13, and PD14 are exposed to light to generate charges. In the exposure period, the transfer signal TG is shifted from the high level to the low level, and the transfer transistors TX11, TX12, TX13, and TX14 are turned off. Also, the reset control signal RG1 is shifted to a low level, and then, becomes a high level again to supply the power supply voltage VDD to the floating node FN12.

The readout period is a period in which the pixel signal VS generated in the pixel PX1 is transferred to the readout circuit 150. Each of the LCG reset signal RST_L, the HCG reset signal RST_H, the HCG signal SIG_H, and the LCG signal SIG_L may be output as the pixel signal VS.

The conversion gain may be adjusted according to whether the switch transistor SW1 is driven according to the first gain control signal DCG1. For example, when the switch transistor SW1 is turned off, the pixel PX may operate in the HCG mode in which the pixel signal VS is generated based on charges stored in the floating diffusion FD11, and when the switch transistor SW1 is turned on, the pixel PX may operate in the LCG mode generating the pixel signal VS based on the charges stored in the floating diffusion FD11 and the floating diffusion FD12.

First, a high-level select signal SEL1 is applied to the gate of the select transistor SX1 to turn on the select transistor SX1. Then, the first gain control signal DCG1 is shifted to a high level, so the floating diffusion FD11 and the floating diffusion FD12 are connected to the floating node FN11. Accordingly, during a period 401, the voltage of the floating node FN11 according to the charges stored in the floating diffusion FD11 and the floating diffusion FD12 may be output to the column line CL through the drive transistor DX1 as the pixel signal VS, that is, the LCG reset signal RST_L.

Next, when the first gain control signal DCG1 is shifted to the low level, the switch transistor SW1 is turned off. During a period 402, the voltage of the floating node FN11 according to the charges stored in the floating diffusion FD11 may be output to the column line CL through the drive transistor DX1 as the pixel signal VS, that is, the HCG reset signal RST_H.

Thereafter, the high-level transfer signal TG may be applied to the gates of the transfer transistors TX11, TX12, TX13, and TX14 so that the charges generated by the photoelectric devices PD11, PD12, PD13, and PD14 may be provided to the floating diffusion FD11. Accordingly, the quantity of charge stored in the floating diffusion FD11 may be changed. During a period 403, the voltage of the floating node FN11 according to the charges stored in the floating diffusion FD11 may be output to the column line CL through the drive transistor DX1 as the pixel signal VS, that is, the HCG signal SIG_H.

In addition, the high-level first gain control signal DCG1 is applied to the switch transistor SW1 so that the floating diffusion FD11 and the floating diffusion FD12 are connected to the floating node FN11. In addition, the high-level transfer signal TG may be applied to the gates of the transfer transistors TX11, TX12, TX13, and TX14 so that the charges generated by the photoelectric devices PD11, PD12, PD13, and PD14 may be provided to the floating diffusion FD11 and the floating diffusion FD12 and the charges stored in the floating diffusion FD11 and the floating diffusion FD12 may be changed. Accordingly, during a period 404, the voltage of the floating node FN11 according to the charges stored in the floating diffusion FD11 and the floating diffusion FD12 may be output to the column line CL through the drive transistor DX1 as the pixel signal VS, that is, the LCG signal SIG_L.

During the period 401, the DEMUX select signal SEL_M may be at a low level, and thus, the LCG reset signal RST_L may be output to the first comparator 153_1. During the period 402, the DEMUX select signal SEL_M may be at a high level, and thus, the HCG reset signal RST_H may be output to the second comparator 153_2. During the period 403, the DEMUX select signal SEL_M may be at a high level, and thus, the HCG signal SIG_H may be output to the second comparator 153_2. During the period 404, the DEMUX select signal SEL_M may be at a low level, and thus, the LCG signal SIG_L may be output to the first comparator 153_1. However, the selector 151 may output the input pixel signal VS to the second comparator 153_2 when the DEMUX select signal SEL_M is at a low level, and may output the input pixel signal VS to the first comparator 153_1 when the DEMUX select signal SEL_M is at a high level.

Meanwhile, the reference signal RAMP illustrated in FIG. 4 is a signal provided to the comparator 153 in the readout circuit 150 during a readout period Readout.

The waveform of the reference signal RAMP illustrated in FIG. 4 may be determined according to the type of the pixel signal VS generated during the period illustrated in FIG. 4.

A first ramp signal R41 having a first cycle and a fourth ramp signal R44 having a second cycle greater than the first cycle may be provided to the first comparator 153_1 in synchronization with a comparison target signal (e.g., a pixel signal VS). Specifically, the first ramp signal R41 may be provided to the first comparator 153_1 within the period 401, and the fourth ramp signal R44 may be provided to the first comparator 153_1 within the period 404.

In addition, the second ramp signal R42 having the first cycle and the third ramp signal R43 having the second cycle may be provided to the second comparator 153_2 in synchronization with the comparison target signal (e.g., pixel signal VS). Specifically, the second ramp signal R42 may be provided to the second comparator 153_2 within the period 402, and the third ramp signal R43 may be provided to the second comparator 153_2 within the period 403. Hereinafter, in the present specification, the cycle of the ramp signal means a period during which the ramp signal decreases with a predetermined slope. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The comparator 153 may compare the pixel signal VS output from the pixel PX1 with a reference signal. Specifically, the first comparator 1531 may output a result of comparing the LCG reset signal RST_L input through the selector 151 with the first ramp signal R41 having the first cycle. In addition, the first comparator 153_1 may output a result of comparing the LCG signal SIG_L input through the selector 151 with the fourth ramp signal R44 having the second cycle greater than the first cycle. The second comparator 153_2 may output a result of comparing the HCG reset signal RST_H input through the selector 151 with the second ramp signal R42 having the first cycle. In addition, the second comparator 153_2 may output a result of comparing the HCG signal SIG_H input through the selector 151 with the third ramp signal R43 having the second cycle. However, the embodiments are not limited thereto, and the ramp signal generator 160 may also generate a reference signal of another waveform including the first ramp signal R41 to the fourth ramp signal R44.

Since the degree of change of the LCG reset signal RST_L and the HCG reset signal RST_H is relatively small and the degree of change of the HCG signal SIG_H and the LCG signal SIG_L is relatively large, the first cycle may be shorter than the second cycle.

In general, since the analog gain is adjusted to be the same in each mode, both the first ramp signal R41 to the fourth ramp signal R44 may have the same slope. When the analog gain is adjusted, the slopes of the first ramp signal R41 to the fourth ramp signal R44 may be changed.

Meanwhile, as described above, the CDS circuit 157_1 may generate the image signal IMS by performing the correlated double sampling (CDS) method on the counting signal for the pixel signal VS received from the counter 155_1, and the CDS circuit 157_2 may generate the image signal IMS by performing the correlated double sampling (CDS) method on the counting signal of the pixel signal VS received from the counter 155_2. For example, the CDS circuit 157_1 may generate one image signal by performing the CDS method on the LCG reset signal RST_L and the LCG signal SIG_L. In addition, the CDS circuit 157_2 may generate one image signal by performing the CDS method on the HCG reset signal RST_H and the HCG signal SIG_H. Since the pixel signal VS reading method is RRSS, the LCG reset signal RST_L, the LCG signal SIG_L, the HCG reset signal RST_H, and the HCG signal SIG_H should be input to separate comparators to remove reset noise (kTC noise).

FIG. 5 is an example diagram illustrating the operation timing of the image sensor according to the embodiment.

FIG. 5 illustrates a scan period for driving a plurality of pixels in a row line unit. One scan period may sequentially include a reset period Reset, an exposure period Exposure, and a readout period Readout.

FIG. 5 is a diagram illustrating a case in which the floating diffusion FD12 of the image sensor 100 operates in a readout method of the RST-SIG-SIG-RST (RRSS) when the floating diffusion FD12 of the image sensor 100 includes the LOFIC.

The operation of the image sensor will be described with reference to FIGS. 2A, 3, and 5.

The operation of the reset period of FIG. 5 may be the same as the operation of the reset period of FIG. 4.

The exposure period Exposure is a period in which the photoelectric devices PD11, PD12, PD13, and PD14 are exposed to light to generate charges. In the exposure period, the reset control signal RG1 and the transfer signal TG are shifted to a low level, so the reset transistor RX1 and the transfer transistors TX11, TX12, TX13, and TX14 are turned off. In addition, the first gain control signal DCG1 is shifted to a low level and then a high level, so the floating diffusion FD11 and the floating diffusion FD12 are connected to the floating node FN11.

The readout period Readout is a period in which the pixel signal VS generated in the pixel PX1 is transferred to the readout circuit 150. Each of the HCG reset signal RST_H, the HCG reset signal SIG_H, the LOFIC signal SIG_LOFIC, and the LOFIC reset signal RST_LOFIC may be output as the pixel signal VS.

The conversion gain may be adjusted according to whether the switch transistor SW1 is driven according to the first gain control signal DCG1. For example, when the switch transistor SW1 is turned off, the pixel PX1 may operate in the HCG mode in which the pixel signal VS is generated based on the charges stored in the floating diffusion FD11, and when the switch transistor SW1 is turned on, the pixel PX may operate in the LOFIC mode generating the pixel signal VS based on the charges stored in the floating diffusion FD12 including the LOFIC.

First, the high-level select signal SEL1 is applied to the gate of the select transistor SX1 to turn on the select transistor SX1. In addition, the first gain control signal DCG1 is shifted to a low level. Accordingly, during a period 501, the voltage of the floating node FN11 according to the charges stored in the floating diffusion FD11 may be output to the column line CL through the drive transistor DX1 as the pixel signal VS, that is, the HCG reset signal RST_H.

Thereafter, the high-level transfer signal TG may be applied to the gates of the transfer transistors TX11, TX12, TX13, and TX14 so that the charges generated by the photoelectric devices PD11, PD12, PD13, and PD14 may be provided to the floating diffusion FD11. Accordingly, the quantity of charge stored in the floating diffusion FD11 may be changed. During a period 502, the voltage of the floating node FN11 according to the charges stored in the floating diffusion FD11 may be output to the column line CL through the drive transistor DX1 as the pixel signal VS, that is, the HCG signal SIG_H.

Then, the high-level first gain control signal DCG1 is applied to the switch transistor SW1 so that the floating diffusion FD11 and the floating diffusion FD12 are connected to the floating node FN11. In addition, the high-level transfer signal TG may be applied to the gates of the transfer transistors TX11, TX12, TX13, and TX14 so that the charges generated by the photoelectric devices PD11, PD12, PD13, and PD14 may be provided to the floating diffusion FD11 and the floating diffusion FD12. During a period 503, the voltage of the floating node FN11 according to the charges stored in the floating diffusion FD11 and the floating diffusion FD12 may be output to the column line CL through the drive transistor DX1 as the pixel signal, that is, the LOFIC signal SIG_LOFIC.

Next, the high-level reset signal RG1 is applied to the reset transistor RX1 so that the floating diffusion FD11 and the floating diffusion FD12 are reset by the power supply voltage VDD. Accordingly, during a period 504, the voltage of the floating node FN11 according to the charges stored in the reset floating diffusion FD11 and floating diffusion FD12 may be output to the column line CL through the drive transistor DX1 as the pixel signal VS, that is, the LOFIC reset signal RST_LOFIC.

During periods 501, 502, 503, and 504, the DEMUX select signal SEL_M is at a low level, and thus, the HCG reset signal RST_H, the HCG signal SIG_H, the LOFIC signal SIG_LOFIC, and the LOFIC reset signal RST_LOFIC may all be output to the first comparator 153_1.

The reference signal RAMP illustrated in FIG. 5 is a signal provided to the comparator 153 in the readout circuit 150 during a readout period Readout. The waveform of the reference signal RAMP illustrated in FIG. 5 may be determined according to the type of the pixel signal VS generated during the period illustrated in FIG. 5. For example, in the case of the RSSR readout method, the pixel PX may sequentially output the HCG reset signal RST_H, the HCG signal SIG_H, the LOFIC signal SIG_LOFIC, and the LOFIC reset signal RST_LOFIC.

Meanwhile, as described above, the CDS circuit 157 may generate the image signal IMS by performing the correlated double sampling (CDS) method on the counting signal for the pixel signal VS received from the corresponding counter 155. However, when the floating diffusion FD12 includes the LOFIC, the overflowing charges among the charges transferred to the floating node FN12 are stored in the floating diffusion FD12. Accordingly, the LOFIC signal SIG_LOFIC is not output after the LOFIC reset signal RST_LOFIC, but the LOFIC reset signal RST_LOFIC may be output as the pixel signal VS after the LOFIC signal SIG_LOFIC. Accordingly, it may be possible to readout all the pixel signals VS even by using one comparator.

Considering this, a first ramp signal R51 having a first cycle, a second ramp signal R52 having a second cycle greater than the first cycle, a third ramp signal R53 having a second cycle, and a fourth ramp signal R54 having a first cycle may be provided to the first comparator 153_1 or the second comparator 153_2 in synchronization with the comparison target signal (e.g., the pixel signal VS). Hereinafter, it is assumed that the pixel signal VS is provided to the first comparator 153_1. Specifically, the first ramp signal R51 may be provided to the first comparator 153_1 within the period 501, and the second ramp signal R52 may be provided to the first comparator 153_1 within the period 502. In addition, the third ramp signal R53 may be provided to the first comparator 153_1 within the period 503, and the fourth ramp signal R54 may be provided to the first comparator 1531 within the period 504.

The first comparator 153_1 may output a result of comparing the HCG reset signal RST_H input through the selector 151 with the first ramp signal R51 having the first cycle, and output a result of comparing the HCG signal SIG_H input through the selector 151 with the second ramp signal R52 having the second cycle greater than the first cycle. Next, the first comparator 153_1 may output a result of comparing the LOFIC signal SIG_LOFIC input through the selector 151 with the third ramp signal R53 having the second cycle, and output a result of comparing the LOFIC reset signal RST_LOFIC input through the selector 151 with the fourth ramp signal R54 having the first cycle.

Since the degree of change of the HCG reset signal RST_H and the LOFIC reset signal RST_LOFIC is relatively small and the degree of change of the HCG signal SIG_H and the LOFIC signal SIG_LOFIC is relatively large, the first cycle may be shorter than the second cycle.

In general, since the analog gain is adjusted to be the same in each mode, both the first ramp signal R51 to the fourth ramp signal R54 may have the same slope. When the analog gain is adjusted, the slopes of the first ramp signal R51 to the fourth ramp signal R54 may be changed.

Figure 6:
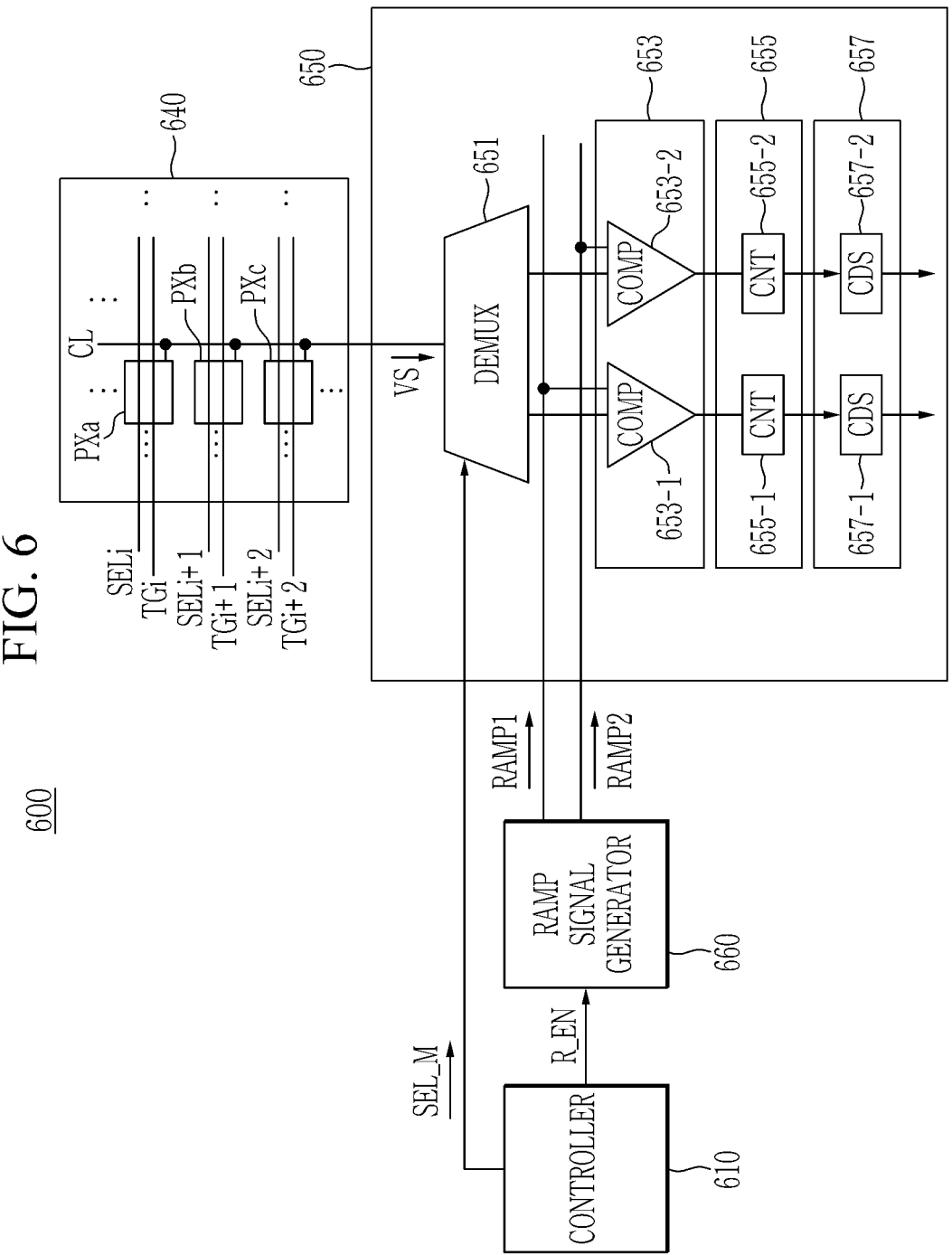
FIG. 6 is an example block diagram illustrating a pixel array and a readout circuit according to another embodiment.

FIG. 6 is an example block diagram illustrating a pixel array and a readout circuit according to another embodiment.

Referring to FIG. 6, a pixel array 640 may include a plurality of pixels PXa, PXb, and PXc. Each of the plurality of pixels PXa, PXb, and PXc may receive a corresponding transfer signal among transfer signals TGi, TGi+1, and TGi+2 and a corresponding select signal among select signals SELi, SELi+1, and SELi+2. Each of the plurality of pixels PXa, PXb, and PXc may receive the corresponding select signal among the select signals SELi, SELi+1, and SELi+2 to output the pixel signal VS. Here, it is assumed that each of the plurality of pixels PXa, PXb, and PXc includes one sub-pixel.

Referring to FIG. 6, an image sensor 600 according to another embodiment may include the pixel array 640 and a readout circuit 650.

The readout circuit 650 may include a selector 651, a comparator 653, a counter 655, and a CDS circuit 657 connected to each column line CL of the pixel array 640. The selector 651 may be implemented as, for example, a de-multiplexer, but is not limited thereto.

The selector 651 may receive the pixel signal VS from the corresponding column line CL. The selector 651 may receive a DEMUX select signal SEL_M from a controller 610 and output the pixel signal VS to the comparator 653 based on the DEMUX select signal SEL_M.

The comparator 653 includes a first comparator 653_1 and a second comparator 653_2. One of two input terminals of each of the first comparator 653_1 and the second comparator 6532 may be connected to an output terminal of the selector 651, and the other of the two input terminals may be connected to the ramp signal generator 660. The first comparator 653_1 may compare the pixel signal VS with a first reference signal RAMP1 synchronously input with the timing when the pixel signal VS is input to the first comparator 6531, and output the result to a counter 655_1. The second comparator 6532 may compare the pixel signal VS with a second reference signal RAMP2 synchronously input with the timing when the pixel signal VS is input to the second comparator 653_2, and output the result to a counter 655_2.

The ramp signal generator 660 may generate the reference signals RAMP1 and RAMP2 in response to a ramp enable signal R_EN input from the controller 610. Each of the reference signals RAMP1 and RAMP2 may include a plurality of ramp signals. The plurality of ramp signals may be signals whose voltage level increases or decreases over time. In some embodiments, when the ramp signal included in the reference signal RAMP1 is a signal having a waveform that decreases with a predetermined slope, a timing when the magnitude of the signal input to the comparator 653_1 through the selector 651 is the same as that of the ramp signal of the reference signal RAMP1 may occur. In addition, when the ramp signal included in the reference signal RAMP2 has a waveform that decreases with a predetermined slope, a timing when the magnitude of the signal input to the comparator 6531 through the selector 653 is the same as that of the ramp signal of the reference signal RAMP2 may occur. Levels of signals output from the comparators 653_1 and 653_2 may be shifted in synchronization with the timing when the magnitude of the signal input to the comparator 653_1 and the magnitude of the reference signal RAMP1 are the same, and the timing when the magnitude of the signal input to the comparator 653_2 and the magnitude of the reference signal RAMP2 are the same.

The counter 655 includes a first counter 655_1 and a second counter 655_2. The counter 655_1 may be connected to an output terminal of the comparator 653_1, and the counter 655_2 may be connected to an output terminal of the comparator 653_2. Each of the counters 655_1 and 655_2 may include an up/down counter or a bit-wise counter.

For example, the counter 655 may receive a clock from the timing generator (120 in FIG. 1). The counter 655 may count how long the specific level of the signal output from the comparator 153 is maintained using the rising edge or a falling edge of the clock signal. For example, the counter 655_1 may count the time a high level corresponding to logic level "1" is output from the comparator 653_1.

The CDS circuit 657 includes a first CDS circuit 657_1 and a second CDS circuit 657_2. The CDS circuit 657_1 may be connected to the output terminal of the counter 655_1 and may perform the correlated double sampling (CDS) method on the output of the pixel signal VS received from the counter 655_1 to generate the image signal IMS. The CDS circuit 657_2 may be connected to the output terminal of the counter 655_2 and may perform the correlated double sampling (CDS) method on the output of the pixel signal VS received from the counter 655_2 to generate the image signal IMS.

Figure 7:
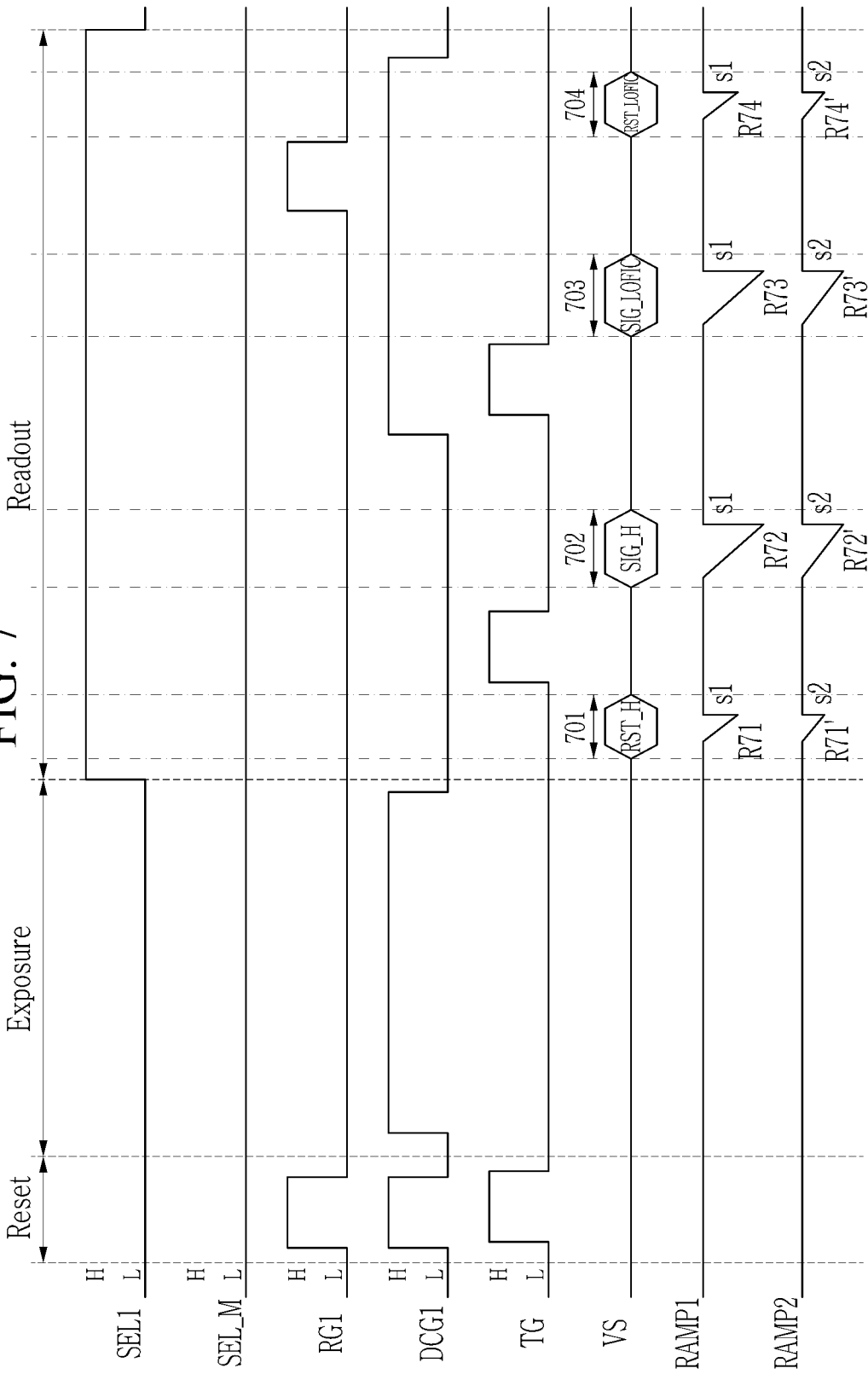
FIG. 7 is an example diagram illustrating an operation timing of the image sensor illustrated in FIG. 6.

FIG. 7 is an example diagram illustrating the operation timing of the image sensor illustrated in FIG. 6.

FIG. 7 illustrates a scan period for driving a plurality of pixels in a row line unit. One scan period may sequentially include a reset period Reset, an exposure period Exposure, and a readout period Readout.

FIG. 7 is a diagram illustrating a case in which the image sensor 600 operates in a readout method of RST-SIG-SIG-RST (RSSR). First, the waveforms of the select signal SEL1, the DEMUX select signal SEL_M, the DEMUX select signal SEL_M, the reset signal RG1, the first gain control signal DCG1, and the transfer signal TG in the reset period Reset, the exposure period Exposure, and the readout period Readout are similar to the waveforms of the select signal SEL1, the DEMUX select signal SEL_M, the reset signal RG1, the first gain control signal DCG1, and the transfer signal TG of FIG. 5, and therefore, the description of FIG. 5 may be applied to FIG. 7.

Similarly to FIG. 5, the pixel PX may sequentially output the HCG reset signal RST_H, the HCG signal SIG_H, the LOFIC signal SIG_LOFIC, and the LOFIC reset signal RST_LOFIC. During a period 701, the HCG reset signal RST_H may be output to the column line CL. During a period 702, the HCG reset signal SIG_H may be output to the column line CL. During a period 703, the LOFIC signal SIG_LOFIC may be output to the column line CL. During a period 704, the LOFIC reset signal RST_LOFIC may be output to the column line CL.

Meanwhile, the reference signals RAMP1 and RAMP2 illustrated in FIG. 7 are signals provided to the comparator 653 in the readout circuit 650 during the readout period Readout. The shapes of the reference signals RAMP1 and RAMP2 may be due to the shape of the pixel signal VS.

The ramp signal generator 660 may generate the first and second reference signals RAMP1 and RAMP2 in response to the ramp enable signal R_EN during the readout period Readout.

The ramp signal generator 660 may generate a reference signal including a plurality of ramp signals having different slopes. For example, the slope of the ramp signal in the first reference signal RAMP1 may be different from the slope of the ramp signal in the second reference signal RAMP2. The ramp signal generator 660 may generate a first reference signal RAMP1 including a plurality of ramp signals having a first slope s1 and a second reference signal RAMP2 including a plurality of ramp signals having a second slope s2. For example, as illustrated in FIG. 7, an absolute value of the first slope s1 may be twice that of the second slope s2, but the embodiments are not limited thereto. As described above, a method of reading one image with two analog gains for one pixel signal VS through two reference signals RAMPs including ramp signals having different slopes is referred to as a dual slope gain (DSG) method. By applying the DSG method, by reducing quantization noise (QN) for an image signal, the SNR dip may be reduced and the dynamic range may increase.

Meanwhile, the first reference signal RAMP1 is a signal provided to the first comparator 6531 during the readout period Readout, and the second reference signal RAMP2 is a signal provided to the second comparator 653_2 during the readout period Readout.

The first reference signal RAMP1 may include a first ramp signal R71 output within a period 701, a second ramp signal R72 output within a period 702, a third ramp signal 703 output within a period 703, and a fourth ramp signal R74 output within a period 704.

In addition, the second reference signal RAMP2 may include a first' ramp signal R71 output within the period 701, a second' ramp signal R72 output within the period 702, a third' ramp signal 703 output within the period 703, and a fourth' ramp signal R73 output within the period 704.

The first comparator 653_1 may compare the pixel signal VS output from the pixel PX with the first reference signal RAMP1 synchronously input with the timing when the pixel signal VS is input to the first comparator 653_1 and generate the output according to the comparison result. In addition, the second comparator 653_2 may compare the pixel signal VS output from the pixel PX with the second reference signal RAMP2 synchronously input with the timing when the pixel signal VS is input to the comparator 653_2 and generate the output according to the comparison result.

The embodiments are not limited thereto, and each of the LOFIC reset signal RST_LOFIC, the LOFIC signal SIG_LOFIC, the HCG reset signal RST_H, and the HCG signal SIG_H can be readout with different analog gains through ramp signals having different slopes.

Figure 8:
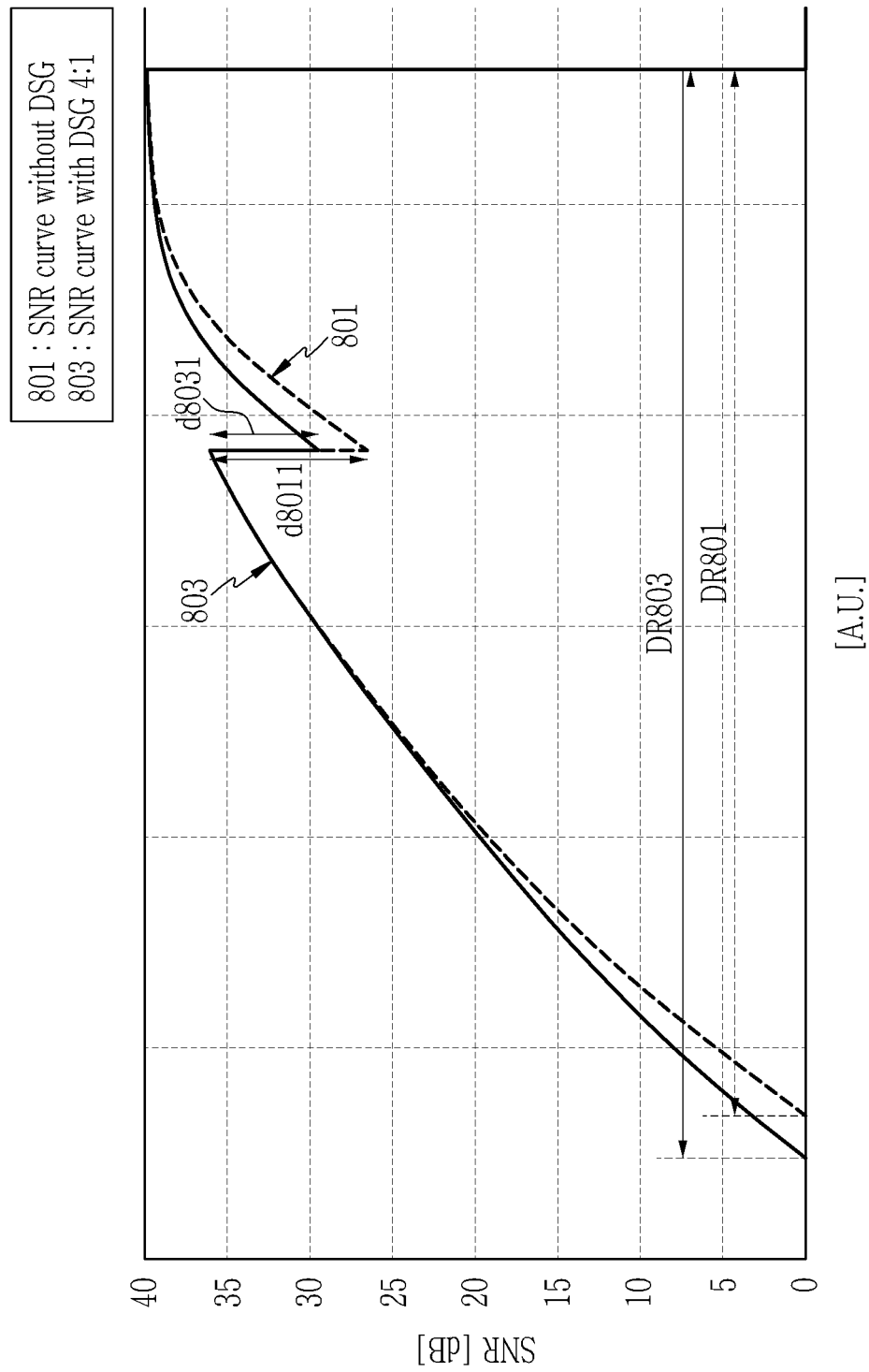
FIG. 8 is an example graph illustrating a signal-to-noise ratio according to an embodiment.

FIG. 8 is an example graph illustrating a signal-to-noise ratio according to an embodiment.

Specifically, a first graph 801 and a second graph 803 are illustrated in FIG. 8. The first graph 801 is a graph illustrating, in units of dB, a signal-to-noise ratio of the signal obtained by synthesizing the HCG image signal and the LOFIC image signal readout according to the timing diagram illustrated in FIG. 5. The second graph 803 is a graph illustrating, in units of dB, a signal-to-noise ratio of the signal obtained by synthesizing the HCG image signal and the LOFIC image signal readout according to the timing diagram illustrated in FIG. 7. In this case, it is assumed that the ratio of the absolute value of the slope s1 of the ramp signals in the first reference signal RAMP1 of FIG. 7 and the absolute value of the slope s2 of the ramp signals in the second reference signal RAMP2 is set to 4:1.

That is, the first graph 801 is an SNR graph when the pixel signal VS is readout with the first analog gain without applying the DSG method, and the second graph 803 is an SNR graph when the pixel signal VS is readout while applying the DSG method. That is, the second graph 803 is a graph illustrating the SNR of the synthesized image signal when the pixel signal VS is readout by applying the DSG method with two analog gains, that is, a first analog gain and a second analog gain four times the first analog gain.

A magnitude of an SNR dip d8011 between the HCG image signal and the LOFIC image signal in the first graph 801 is greater than that of an SNR dip d8031 between the HCG image signal and the LOFIC image signal in the second graph 803. Also, a dynamic range DR803 in the second graph 803 is wider than a dynamic range DR801 in the first graph 801.

Figure 9:
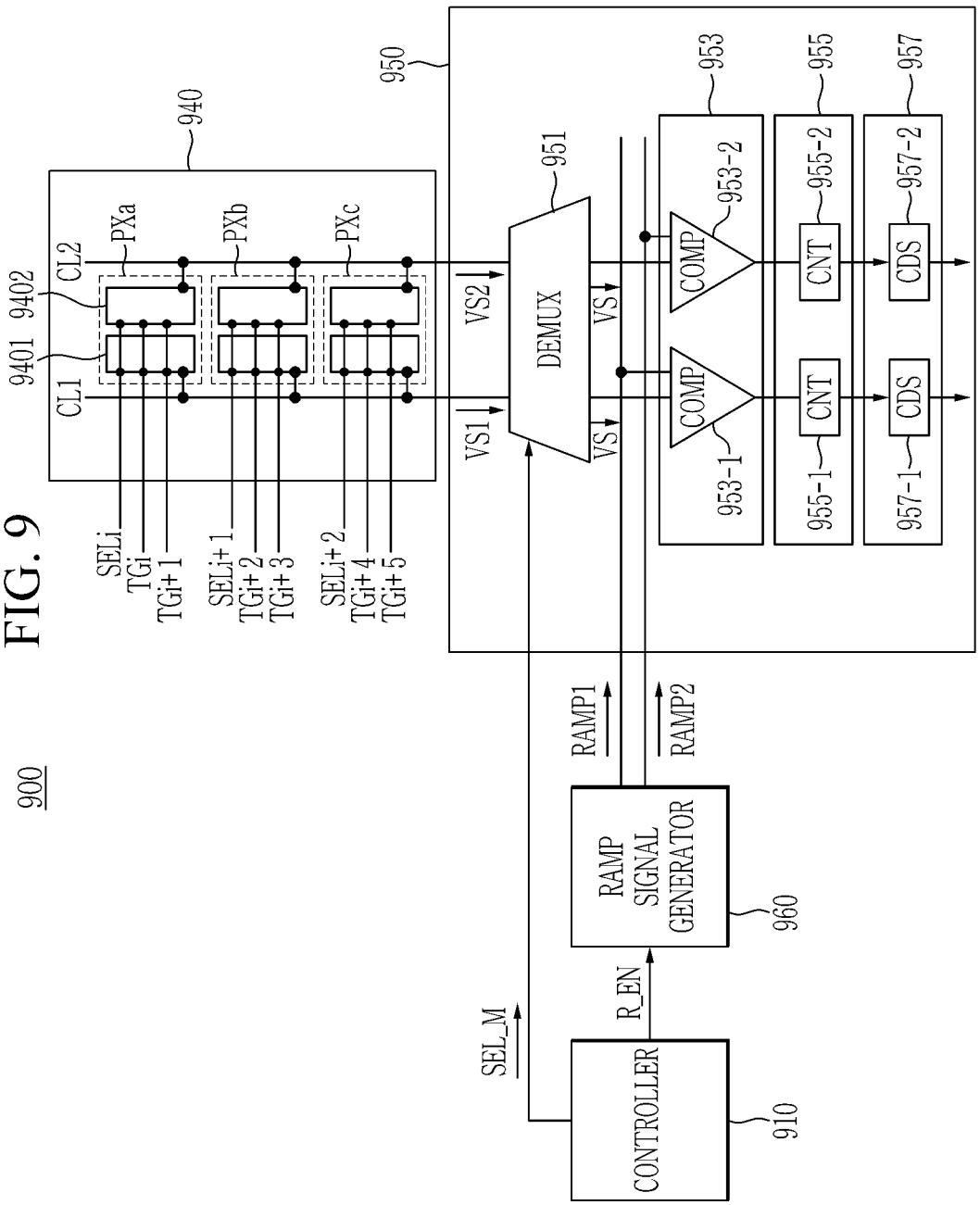
FIG. 9 is an example block diagram illustrating a pixel array and a readout circuit according to another embodiment.

FIG. 9 is an example block diagram illustrating a pixel array and a readout circuit according to another embodiment.

Referring to FIG. 9, an image sensor 900 according to another embodiment may include a pixel array 940 and a readout circuit 950.

The pixel array 940 may include a plurality of pixels PXa, PXb, and PXc. Each of the plurality of pixels PXa, PXb, and PXc may receive a corresponding transfer signal among transfer signals TGi, TGi+1, TGi+2, TGi+3, TGi+4, and TGi+5 and a corresponding select signal among select signals SELi, SELi+1, and SELi+2. Each of the plurality of pixels PXa, PXb, and PXc may receive the corresponding select signal among the select signals SELi, SELi+1, and SELi+2 to output pixel signals VS1 and VS2.

It is assumed that each of the plurality of pixels PXa, PXb, and PXc includes two sub-pixels. For example, one pixel PXa may include a plurality of sub-pixels 9401 and 9402. Each of the plurality of sub-pixels 9401 and 9402 may be selected by the transfer signals TGi and TGi+1 and the select signal SELi to output the pixel signals VS1 and VS2.

As the number of photoelectric devices included in one pixel PXa increases, the total quantity of charges generated by the photoelectric devices may increase. Accordingly, the magnitude of the pixel signal generated by processing charges generated by all the photoelectric devices may also increase. When a large quantity of charge is stored in one floating diffusion (that is, readout through one column line), the conversion gain decreases when operating in the HCG mode, and thus, random noise (RN) may increase. Accordingly, it is possible to use a method of storing pixel signals generated by photoelectric devices included in one pixel in a plurality of floating diffusions and reading the pixel signals through column lines corresponding to each floating diffusion.

Figure 10:
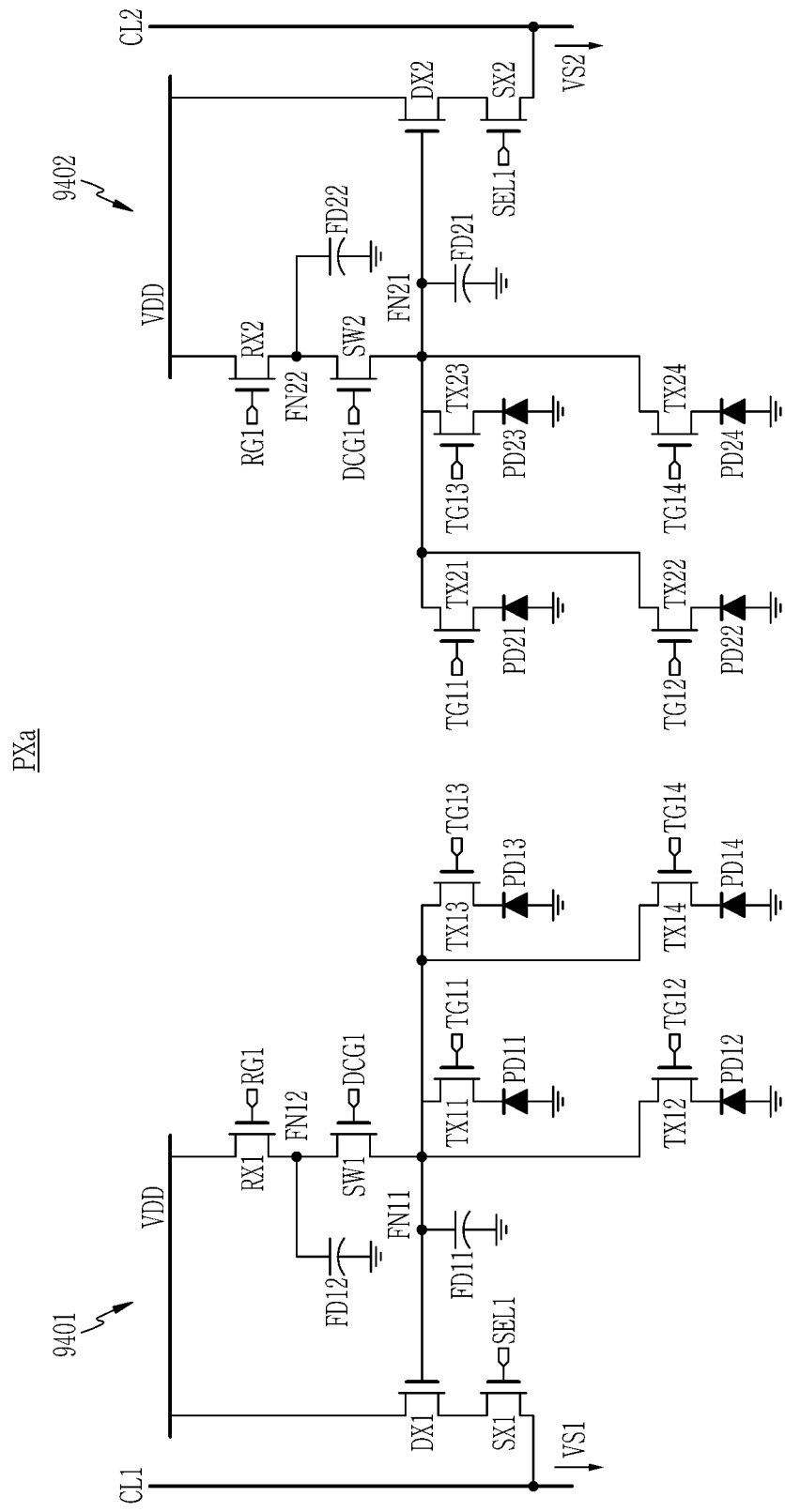
FIG. 10 is an example circuit diagram illustrating one pixel according to an embodiment.

The pixel array 940 will be described in detail with reference to FIG. 10. FIG. 10 is an example circuit diagram illustrating one pixel according to the present embodiment.

The sub-pixel 9401 may include photoelectric devices PD11, PD12, PD13, and PD14 that generate charges in response to light and a pixel circuit that processes charges generated by the photoelectric devices PD11, PD12, PD13, and PD14 to output an electrical signal. The sub-pixel 9402 may include the photoelectric devices PD21, PD22, PD23, and PD24 and a pixel circuit that processes charges generated by the photoelectric devices PD21, PD22, PD23, and PD24 to output an electrical signal. FIG. 10 illustrates that each of the plurality of sub-pixels 9401 and 9402 includes four photoelectric devices, but aspects of the present invention are not limited thereto, and each of the plurality of sub-pixels 9401 and 9402 may include less or more photoelectric devices.

In some embodiments, the charges generated by the photoelectric devices PD11, PD12, PD13, and PD14 in the sub-pixel 9401 may be output to the readout circuit 950 by the column line CL1, and the charges generated by the photoelectric devices PD21, PD22, PD23, and PD24 in the sub-pixel 9402 may be output to the readout circuit 950 by the column line CL2.

Cathodes of the photoelectric devices PD11, PD12, PD13, and PD14 may be connected to the floating node FN11 through the transfer transistors TX11, TX12, TX13, and TX14, and anodes of the photoelectric devices PD11, PD12, PD13, and PD14 may be grounded. Similarly, cathodes of the photoelectric devices PD21, PD22, PD23, and PD24 may be connected to the floating node FN21 through the transfer transistors TX21, TX22, TX23, and TX24, and anodes of the photoelectric devices PD21, PD22, PD23, and PD24 may be grounded.

The pixel circuit may include the transfer transistors TX11, TX12, TX13, TX14, TX21, TX22, TX23, and TX24, the drive transistors DX1 and DX2, the select transistors SX1 and SX2, the reset transistors RX1 and RX2, and the switch transistors SW1 and SW2. The transistors TX11, TX12, TX13, TX14, TX21, TX22, TX23, TX24, DX1, DX2, SX1, SX2, RX1, RX2, SW1, and SW2 in the pixel circuit may operate in response to the control signals provided from the row driver 130, for example, the transfer control signals TG11, TG12, TG13, and TG14, the select signal SEL1, the reset control signal RG1, and the first gain control signal DCG1.

In some embodiments, the sub-pixel 9401 may include the plurality of floating diffusions FD11 and FD12. The floating diffusions FD11 and FD12 may have a predetermined capacitance and store charges generated by the photoelectric devices PD21, PD22, PD23, and PD24. The sub-pixel 9402 may include the plurality of floating diffusions FD21 and FD22. The floating diffusions FD21 and FD22 may have a predetermined capacitance and store the charges generated by the photoelectric devices PD21, PD22, PD23, and PD24. The floating diffusion FD11 and the floating diffusion FD21 may have the same capacitance, and the floating diffusion FD12 and the floating diffusion FD22 may have the same capacitance.

The transfer transistor TX11 may be connected between the photoelectric device PD11 and the floating node FN11, and the transfer transistor TX21 may be connected between the photoelectric device PD21 and the floating node FN21 and controlled by the transfer signal TG11. When the transfer transistor TX11 is turned on, the charges generated by the photoelectric device PD11 may be transferred to the floating diffusion FD11. When the transfer transistor TX21 is turned on, the charges generated by the photoelectric device PD21 may be transferred to the floating diffusion FD21.

In addition, the transfer transistor TX12 may be connected between the photoelectric device PD12 and the floating node FN11, and the transfer transistor TX22 may be connected between the photoelectric device PD22 and the floating node FN21 and controlled by the transfer signal TG12. When the transfer transistor TX12 is turned on, the charges generated by the photoelectric device PD12 may be transferred to the floating diffusion FD11. When the transfer transistor TX22 is turned on, the charges generated by the photoelectric device PD22 may be transferred to the floating diffusion FD21.

In addition, the transfer transistor TX13 may be connected between the photoelectric device PD12 and the floating node FN11, and the transfer transistor TX23 may be connected between the photoelectric device PD23 and the floating node FN21 and controlled by the transfer signal TG13. When the transfer transistor TX13 is turned on, the charges generated by the photoelectric device PD13 may be transferred to the floating diffusion FD11. When the transfer transistor TX23 is turned on, the charges generated by the photoelectric device PD23 may be transferred to the floating diffusion FD21.

The transfer transistor TX14 may be connected between the photoelectric device PD14 and the floating node FN11, and the transfer transistor TX24 may be connected between the photoelectric device PD24 and the floating node FN21 and controlled by the transfer signal TG14. When the transfer transistor TX14 is turned on, the charges generated by the photoelectric device PD14 may be transferred to the floating diffusion FD11. When the transfer transistor TX24 is turned on, the charges generated by the photoelectric device PD24 may be transferred to the floating diffusion FD21.

The voltage of the floating node FN11 may be determined according to the charges accumulated in the floating diffusion FD11. The gate of the drive transistor DX1 is connected to the floating node FN11. The drive transistor DX1 may operate as a source-follower amplifier for the voltage of the floating node FN11. The drive transistor DX1 may output the pixel signal VS1 to the column line CL1 through the select transistor SX1 in response to the voltage of the floating node FN11.

In addition, the voltage of the floating node FN21 may be determined according to the charges accumulated in the floating diffusion FD11. The gate of the drive transistor DX2 is connected to the floating node FN21. The drive transistor DX2 may operate as a source-follower amplifier for the voltage of the floating node FN21. The drive transistor DX2 may output the pixel signal VS2 to the column line CL2 through the select transistor SX2 in response to the voltage of the floating node FN21.

The select transistor SX1 may be connected between the drive transistor DX1 and the corresponding column line CL1, and the select transistor SX2 may be connected between the drive transistor DX2 and the corresponding column line CL2, so both the select transistor SX1 and the select transistor SX2 may be controlled by the select signal SEL1. For example, the sub-pixel 9401 and the sub-pixel 9402 may be selected simultaneously. When the select transistor SX1 is turned on, the pixel voltage VS1 output from the drive transistor DX1 may be output to the readout circuit 950 through the column line CL1 connected to the select transistor SX1. In addition, when the select transistor SX2 is turned on, the pixel voltage VS2 output from the drive transistor DX2 may be output to the readout circuit 950 through the column line CL2 connected to the select transistor SX2.

The reset transistors RX1 and RX2 may be connected between a power supply voltage line supplying a power supply voltage VDD and each of the floating nodes FN12 and FN22, and may be controlled by the reset control signal RG1. When the reset transistors RX1 and RX2 are turned on by the reset signal RG1, the power supply voltage VDD may be applied to the floating nodes FN12 and FN22 to reset the floating nodes FN12 and FN22. When the switch transistors SW1 and SW2 are turned on while the reset transistors RX1 and RX2 are turned on, the floating node FN11 and the floating node FN12, and the floating node FN21 and the floating node FN22 may all be reset to the power supply voltage VDD.

The switch transistor SW1 may be connected between the floating node FN11 and the floating node FN12, and the switch transistor SW2 may be connected between the floating node FN21 and the floating node FN22 and controlled by the first gain control signal DCG1.

Each of the sub-pixels 9401 and 9402 may operate in the same manner as the pixel PX1 described with reference to FIGS. 2A, 4, and 5.

Referring back to FIG. 9, the readout circuit 950 may include a selector 951, a comparator 953, a counter 955, and a CDS circuit 957 that are connected to the pixel array 940.

The selector 951 may be implemented as, for example, a de-multiplexer, but is not limited thereto. The selector 951 may generate one average value by averaging the two pixel signals VS1 and VS2 received from the pixel array 940. The selector 951 may receive the DEMUX select signal SEL_M from the controller 910 and output the generated average value to one selected based on the DEMUX select signal SEL_M among the comparators 953_1 and 953_2.

The comparator 953 includes a first comparator 953_1 and a second comparator 953_2. One of two input terminals of each of the first comparator 953_1 and the second comparator 9532 may be connected to an output terminal of the selector 951, and the other of the two input terminals may be connected to the ramp signal generator 960. The first comparator 953_1 compares the pixel signal VS corresponding to the average value of the two pixel signals VS1 and VS2 with the first reference signal RAMP1 synchronously input with the timing when the pixel signal VS is input to the first comparator 953_1 and output the result to the counter 955_1. The second comparator 953_2 compares the pixel signal VS corresponding to the average value of the two pixel signals VS1 and VS2 with the second reference signal RAMP2 synchronously input with the timing when the pixel signal VS is input to the second comparator 953_2, and output the result to the counter 955_2.

The ramp signal generator 960 may generate the reference signals RAMP1 and RAMP2 in response to the ramp enable signal R_EN input from the controller 910. The ramp signals in each of the reference signals RAMP1 and RAMP2 may be signals whose voltage level increases or decreases over time. In some embodiments, when the ramp signal included in the reference signal RAMP1 has a waveform that decreases with a predetermined slope, a timing when the magnitude of the signal input to the comparator 9531 through the selector 953 is the same as that of the ramp signal of the reference signal RAMP1 may occur. In addition, in some embodiments, when the ramp signal included in the reference signal RAMP2 has a waveform that decreases with a predetermined slope, a timing when the magnitude of the signal input to the comparator 9532 through the selector 951 is the same as that of the ramp signal of the reference signal RAMP2 may occur. Levels of signals output from the comparators 953_1 and 953_2 may be shifted in synchronization with the timing when the magnitude of the signal input to the comparator 953_1 and the magnitude of the ramp signal of the reference signal RAMP1 are the same, and the timing when the magnitude of the signal input to the comparator 953_2 and the magnitude of the ramp signal of the reference signal RAMP2 are the same.

The counter 955 includes a first counter 955_1 and a second counter 955_2. The first counter 955_1 may be connected to an output terminal of the comparator 953_1, and the second counter 955_2 may be connected to an output terminal of the comparator 953_2. Each of the counters 955_1 and 955_2 may include an up/down counter or a bit-wise counter.

The CDS circuit 957 includes a first CDS circuit 957_1 and a second CDS circuit 957_2. The first CDS circuit 957_1 may be connected to the output terminal of the counter 955_1 and may perform the correlated double sampling (CDS) method on the output of the pixel signal VS received from the counter 955_1 to generate the image signal. The second CDS circuit 957_2 may be connected to the output terminal of the counter 955_2 and may perform the correlated double sampling (CDS) method on the output of the pixel signal VS received from the counter 955_2 to generate the image signal.

The image sensor 900 illustrated in FIGS. 9 and 10 may operate similarly to the operation of the image sensor described with reference to FIGS. 6 and 7.

A pixel capable of operating in two modes (HCG mode and LCG mode; or HCG mode and LOFIC mode) has been described with reference to FIGS. 2 to 10. Meanwhile, when operating in two modes, there may be a problem that the magnitude of the SNR dip is large as described with reference to FIG. 8. Accordingly, a pixel capable of operating in three modes will be described.

Figure 11A:
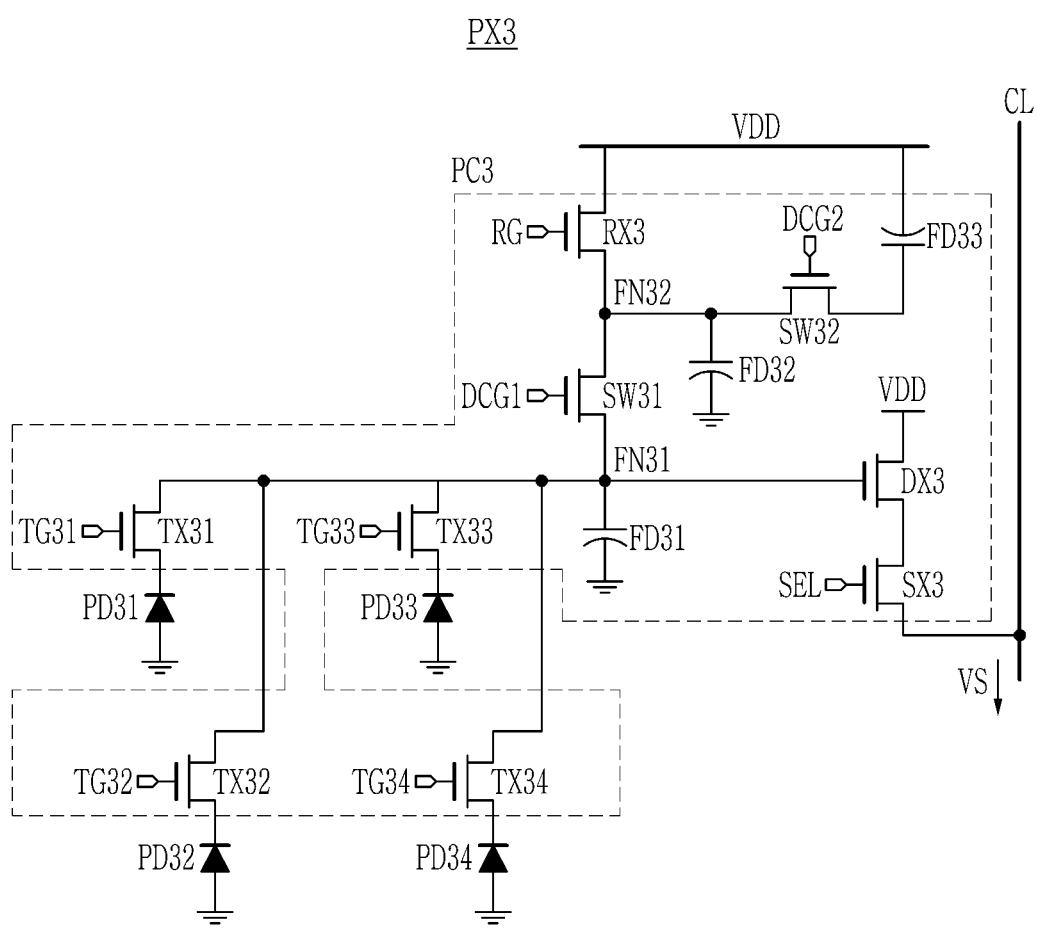
FIGS. 11A and 11B are example circuit diagrams illustrating a pixel according to another embodiment.

FIG. 11A is an example circuit diagram illustrating a pixel according to another embodiment.

A pixel PX3 according to an embodiment may include a pixel circuit that processes charges generated by photoelectric devices PD31, PD32, PD33, and PD34 responding to light to output an electrical signal. In FIG. 11A, one pixel PX3 is illustrated as including four photoelectric devices PD31, PD32, PD33, and PD34, but aspects of the present invention are not limited thereto, and one pixel PX3 may include less or more photoelectric devices. The photoelectric devices PD31, PD32, PD33, and PD34 may detect external light to generate charges. Cathodes of the photoelectric devices PD31, PD32, PD33, and PD34 may be connected to a floating node FN31 through the transfer transistors TX31, TX32, TX33, and TX34, and anodes of the photoelectric devices PD31, PD32, PD33, and PD34 may be grounded.

A pixel circuit PC3 may include the transfer transistors TX31, TX32, TX33, and TX34, a drive transistor DX3, a select transistor SX3, a reset transistor RX3, a first switching transistor SW31, and a second switching transistor SW32. The transistors TX31, TX32, TX33, TX34, SX3, RX3, SW31, and SW32 in the pixel circuit PC3 may operate in response to control signals provided from the row driver 130, for example, the transfer control signals TG31, TG32, TG33, and TG34, the select signal SEL1, the reset control signal RG1, and the gain control signals DCG1 and DCG2.

In some embodiments, the pixel circuit PC3 may include the plurality of floating diffusions FD31, FD32, and FD33. The plurality of floating diffusions FD31, FD32, and FD33 may have a predetermined capacitance and store charges generated by the photoelectric devices PD31, PD32, PD33, and PD34. Although three floating diffusions FD31, FD32, and FD33 are illustrated in FIG. 11A, aspects of the present invention are not limited thereto.

The transfer transistor TX31 may be connected between the photoelectric device PD31 and the first floating node FN31 and may be controlled by the transfer signal TG31. When the transfer transistor TX31 is turned on, the charges generated by the photoelectric device PD31 may be transferred to the first floating diffusion FD31. In addition, the transfer transistor TX32 may be connected between the photoelectric device PD32 and the first floating node FN31 and may be controlled by the transfer signal TG32. When the transfer transistor TX32 is turned on, the charges generated by the photoelectric device PD32 may be transferred to the first floating diffusion FD31. The transfer transistor TX33 may be connected between the photoelectric device PD33 and the first floating node FN31 and may be controlled by the transfer signal TG33. When the transfer transistor TX33 is turned on, the charges generated by the photoelectric device PD33 may be transferred to the first floating diffusion FD31. The transfer transistor TX34 may be connected between the photoelectric device PD34 and the first floating node FN31 and may be controlled by the transfer signal TG34. When the transfer transistor TX34 is turned on, the charges generated by the photoelectric device PD34 may be transferred to the first floating diffusion FD31.

The voltage of the floating node FN31 may be determined according to the charges accumulated in the floating diffusion FD31.

The gate of the drive transistor DX3 is connected to the first floating node FN31. The drive transistor DX3 may operate as a source-follower amplifier for the voltage of the first floating node FN31. The drive transistor DX3 may output the pixel signal VS2 to the column line CL through the select transistor SX3 in response to the voltage of the first floating node FN31.

The select transistor SX3 may be connected between the drive transistor DX3 and the column line CL, and controlled by the select signal SEL. When the select transistor SX3 is turned on, the pixel voltage VS output from the drive transistor DX3 may be output to the readout circuit 150 through the column line CL connected to the select transistor SX3.

The reset transistor RX3 may be connected between a power supply voltage line that supplies the power supply voltage VDD and the second floating node FN32, and controlled by the reset control signal RG. When the reset transistor RX3 is turned on by the reset signal RG, the power supply voltage VDD may be applied to the second floating node FN32 to reset the second floating node FN32. When the first switch transistor SW31 and the second switch transistor SW32 are turned on while the reset transistor RX3 is turned on, both the first floating node FN31 and the second floating node FN32 may be reset.

The first switch transistor SW31 may be connected between the first floating node FN31 and the second floating node FN32 and controlled by the first gain control signal DCG1.

When the first switch transistor SW31 is turned off, the first floating node FN31 has the capacitance of the first floating diffusion FD31. In this case, since the magnitude of the capacitance connected to the first floating node FN31 decreases, the image sensor 100 may generate the image signal in the HCG mode. When operating in the HCG mode, gains of circuits (e.g., the readout circuit 150) for processing the pixel signal VS may be relatively smaller than that of the readout circuit 150 when operating in the LCG mode or the LOFIC mode. Accordingly, the SNR of the image sensor 100 may increase to lower the minimum quantity of light detectable, and the low quantity of light detection performance of the image sensor 100 may be improved.

When the first switch transistor SW31 is turned on, the second floating diffusion FD32 is connected to the first floating node FN31, and the capacitance of the first floating node FN31 increases by the capacitance of the second floating diffusion FD32. In this case, since the magnitude of the capacitance connected to the first floating node FN31 increases, the image sensor 100 may generate the image signal in the LCG mode. When operating in the LCG mode, the quantity of charge that may be processed within the pixel may increase. Accordingly, the high quantity of light detection performance of the image sensor 100 may be improved.

Meanwhile, the pixel circuit PC3 may further include the second switch transistor SW32. The second switch transistor SW32 may be connected between the second floating node FN32 and the third floating diffusion FD33 and controlled by the second gain control signal DCG2.

The third floating diffusion FD33 may include a lateral overflow integration capacitor (LOFIC).

When the second switch transistor SW32 is turned on, the third floating diffusion FD33 is connected to the second floating node FN32. In this case, when the first switch transistor SW31 is also turned on, the overflowing charges among the charges transferred from the photoelectric devices PD31, PD32, PD33, and PD34 to the first floating node FN31 may be shared by the second floating diffusion FD32 and the third floating diffusion FD33. In this case, since the magnitude of the capacitance connected to the first floating node FN31 greatly increases, the image sensor 100 may generate an image signal in the LOFIC conversion gain mode. Similarly, the FWC may increase in the LOFIC conversion gain mode. Accordingly, the high quantity of light detection performance of the image sensor 100 may be further improved. That is, a large quantity of charges overflowing from the photoelectric devices PD31, PD32, PD33, and PD34 may be accumulated without being wasted by the third floating diffusion FD33, so the image sensor 100 detected under a relatively high quantity of light may be generated.

In summary, the pixel PX3 may operate in one of the HCG mode (turn off of SW31 and SW32), the LCG mode (turn on of only SW31), and the LOFIC mode (turn on of SW31 and SW32) according to the turn on and turn off of the first switch transistor SW31 and the second switch transistor SW32.

In some embodiments, as the pixel array 140 operates in the HCG mode, the LCG mode, and the LOFIC mode in one frame period, the image signal processor 180 may receive an HCG image signal according to the HCG mode, an LCG image signal according to the LCG mode, and an LOFIC image signal according to the LOFIC mode from the data buffer 170, and synthesize the HCG image signal, the LCG image signal, and the LOFIC image signal to generate one synthesized image signal having a high dynamic range.

The SNR dip may occur at the boundary between the image signal according to the HCG mode and the image signal according to the LCG mode, and the SNR dip may occur at the boundary between the image according to the LCG mode and the image signal according to the LOFIC mode. As the difference in the capacitance between the first floating diffusion FD31, the second floating diffusion FD32, and the third floating diffusion FD33 increases, the magnitude of the SNR dip occurring within one synthesized image signal may increase.

Figure 11B:
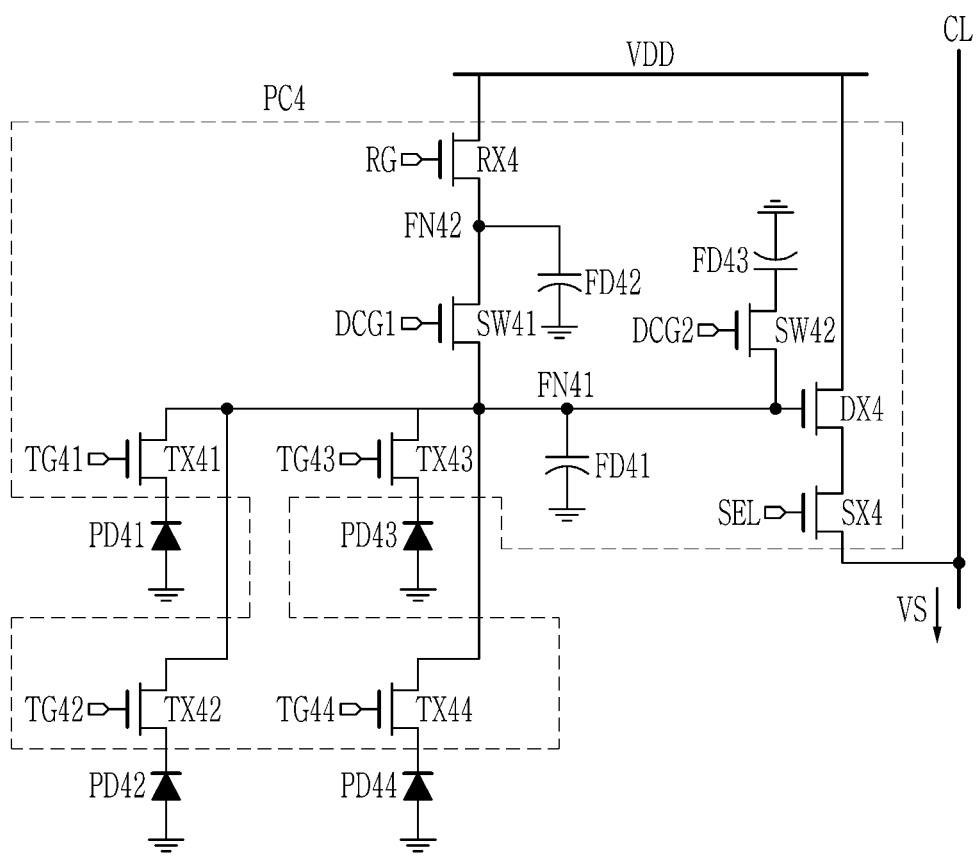

FIG. 11B is an example circuit diagram illustrating a pixel according to another embodiment.

Photoelectric devices PD41, PD42, PD43, and PD44, transfer transistors TX41, TX42, TX43, and TX44, a drive transistor DX4, a select transistor SX4, and a reset transistor RX4 illustrated in FIG. 11B may have the same configuration the photoelectric devices PD31, PD32, PD33, and PD34, the transfer transistors TX31, TX32, TX33, and TX34, the drive transistor DX3, the select transistor SX3, and the reset transistor RX3 illustrated in FIG. 11A, respectively.

Meanwhile, in some embodiments, a pixel circuit PC4 may include the plurality of floating diffusions FD41, FD42, and FD43. The floating diffusions FD41, FD42, and FD43 may have a predetermined capacitance and store charges generated by the photoelectric devices PD41, PD42, PD43, and PD44. Although three floating diffusions FD41, FD42, and FD43 are illustrated in FIG. 11B, aspects of the present invention are not limited thereto.

The first switch transistor SW41 may be connected between the first floating node FN41 and the second floating node FN42 and controlled by the first gain control signal DCG1.

When the second switch transistor SW42 is turned off, the first floating node FN41 has the capacitance of the first floating diffusion FD41. In this case, since the magnitude of the capacitance connected to the first floating node FN41 decreases, the image sensor 100 may generate the image signal in the HCG mode.

When the first switch transistor SW41 is turned on, the second floating diffusion FD42 is connected to the first floating node FN41, and the capacitance of the first floating node FN41 increases by the capacitance of the second floating diffusion FD42. In this case, since the magnitude of the capacitance connected to the first floating node FN41 increases, the image sensor 100 may generate the image signal in the LCG mode.

Meanwhile, the pixel circuit PC4 may further include the second switch transistor SW42. The second switch transistor SW42 may be connected between the first floating node FD41 and the third floating diffusion FD43 and controlled by the second gain control signal DCG2.

The third floating diffusion FD43 may include the LOFIC.

When the second switch transistor SW42 is turned on, the third floating diffusion FD43 is connected to the first floating node FN41. In this case, when the first switch transistor SW41 is also turned on, the overflowing charges among the charges transferred from the photoelectric devices PD41, PD42, PD43, and PD44 to the first floating node FN41 may be shared by the second floating diffusion FD42 and the third floating diffusion FD43. In this case, since the magnitude of the capacitance connected to the first floating node FN41 greatly increases, the image sensor 100 may generate the image signal in the LOFIC conversion gain mode. Similarly, the FWC may increase in the LOFIC conversion gain mode. Accordingly, the high quantity of light detection performance of the image sensor 100 may be further improved. That is, a large quantity of charges overflowing from the photoelectric devices PD41, PD42, PD43, and PD44 may be accumulated without being wasted by the third floating diffusion FD43, so the image sensor 100 detected under a relatively high quantity of light may be generated.

In summary, the pixel PX4 may operate in one of the HCG mode (turn off of SW41 and SW42), the LCG mode (turn on of only SW41), and the LOFIC mode (turn on of SW41 and SW42) according to the turn on and turn off of the first switch transistor SW41 and the second switch transistor SW42.

FIGS. 11A and 11B as described above are circuit diagrams illustrating the photoelectric device and the pixel circuit according to the embodiment. However, the connection relationship between the plurality of floating diffusions included in the pixel according to aspects of the present invention is not limited to the specific structure of the pixel circuit illustrated in FIGS. 11A and 11B, and the pixel circuit may have a structure having an arbitrary connection relationship and including the connected floating diffusion. Hereinafter, it is assumed that the pixel according to aspects of the present invention has the structure illustrated in FIG. 11A for convenience of description.

Figure 12:
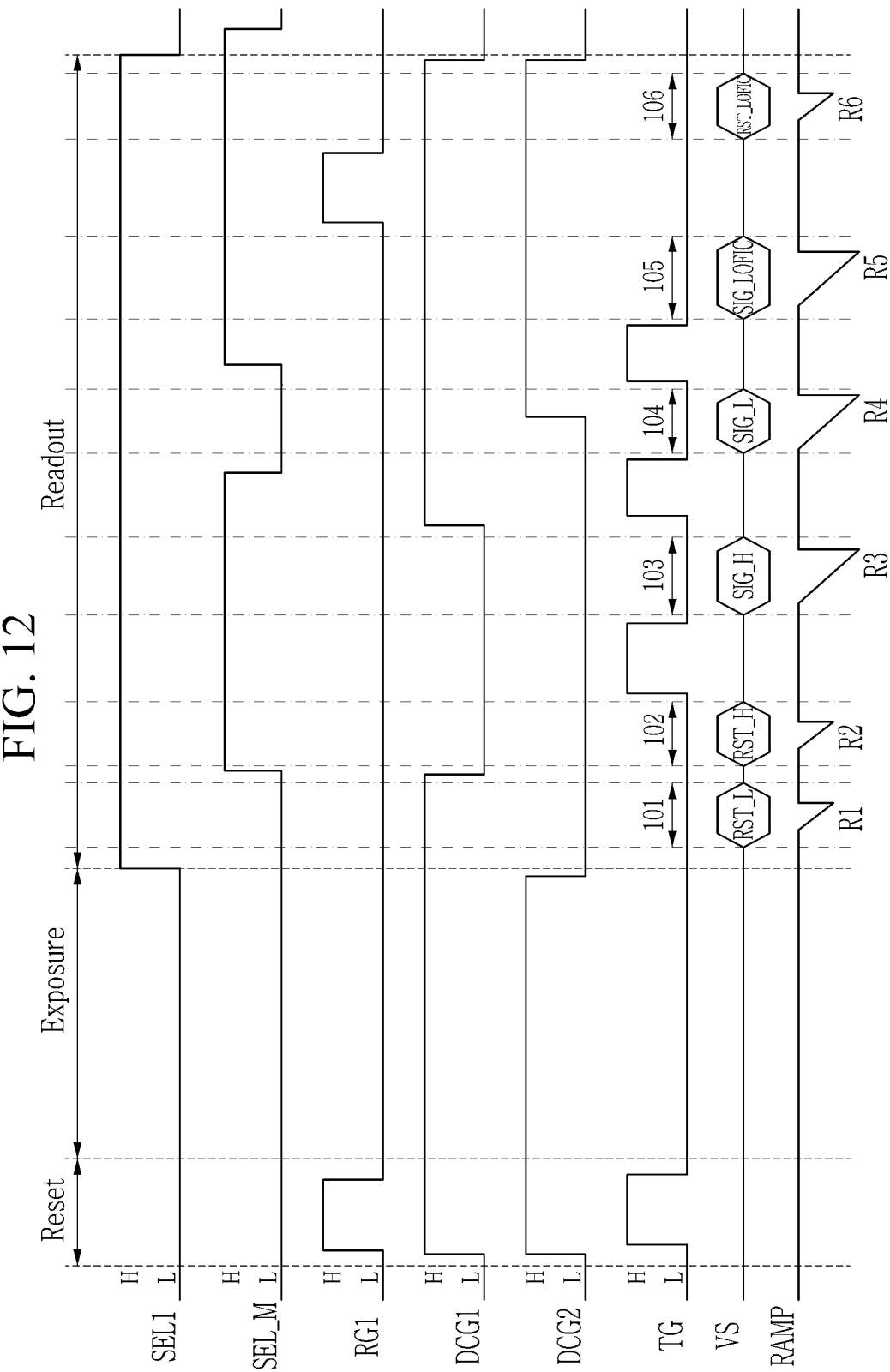
FIG. 12 is an example diagram illustrating an operation timing of an image sensor according to an embodiment.

FIG. 12 is an example diagram illustrating the operation timing of the image sensor according to the embodiment.

FIG. 12 illustrates a scan period for driving a plurality of pixels in a row line unit. One scan period may sequentially include a reset period Reset, an exposure period Exposure, and a readout period Readout.

FIG. 12 is a diagram illustrating a case in which the image sensor 100 operates in a readout method of RST-RST-SIG-SIG-SIG-RST (RRSS-SR).

An operation of the image sensor illustrated in FIG. 12 will be described with reference to FIGS. 3 and 11A described above.

In the reset period Reset, the charges stored in the first floating diffusion FD31, the second floating diffusion FD32, and the third floating diffusion FD33 are reset.

Specifically, the high-level first gain control signal DCG1 is applied to the gate of the first switch transistor SW31 and the second gain control signal DCG2 is applied to the gate of the second switch transistor SW32 to turn on both the first switch transistor SW31 and the second switch transistor SW32. The first floating diffusion FD31, the second floating diffusion FD32, and the third floating diffusion FD33 are connected to the first floating node FN31.

The transfer signal TG31 applied to the transfer transistor TX31, the transfer signal TG32 applied to the transfer transistor TX32, the transfer signal TG33 applied to the transfer transistor TX33, and the transfer signal TG34 applied to the transfer transistor TX34 may all have the same waveform, which is illustrated as the transfer signal TG in FIGS. 12 and 13, 15 and 16, 20 and 21, and 27 to 31.

The high-level transfer signal TG is applied to the gates of the transfer transistors TX31, TX32, TX33, and TX34 to turn on the transfer transistors TX31, TX32, TX33, and TX34.

The charges generated by the photoelectric devices PD31, PD32, PD33, and PD34 may be provided to the first floating diffusion FD31, the second floating diffusion FD32, and the third floating diffusion FD33. Also, the high-level reset signal RG1 is applied to the gate of the reset transistor RX3 to turn on the reset transistor RX3. Then, the power supply voltage VDD is supplied to the first floating node FN31 to reset the first floating diffusion FD31, the second floating diffusion FD32, and the third floating diffusion FD33. In the present embodiment, the reset voltage may be, for example, the power supply voltage VDD. In this case, the select transistor SX3 is turned off.

The exposure period is a period in which the photoelectric devices PD31, PD32, PD33, and PD34 are exposed to light to generate charges. In the exposure period, the reset signal RG1 and the transfer signal TG are shifted from the high level to the low level, so the reset transistor RX3 and the transfer transistors TX31, TX32, TX33, and TX34 are turned off. In addition, since both the first gain control signal DCG1 and the second gain control signal DCG2 maintain a high level, the first floating diffusion FD31, the second floating diffusion FD32, and the third floating diffusion FD33 are all connected to the first floating node FN31 and the second floating node FN32.

The readout period Readout is a period in which the pixel signal VS generated in the pixel PX3 is transferred to the readout circuit 150. Each of the LCG reset signal RST_L, the HCG reset signal RST_H, the HCG signal SIG_H, the LCG signal SIG_L, the LOFIC signal SIG_LOFIC, and the LOFIC reset signal RST_LOFIC may be output as the pixel signal VS.

The conversion gain may be adjusted according to whether the first switch transistor SW31 and the second switch transistor SW32 are driven according to the first gain control signal DCG1 and the second gain control signal DCG2. For example, when the switch transistor SW31 is turned off, the pixel PX3 may operate in the HCG mode in which the pixel signal VS is generated based on the charges stored in the first floating diffusion FD31, when the switch transistor SW31 is turned on and the switch transistor SW32 is turned off, the pixel PX3 may operate in the LCG mode in which the pixel signal VS is generated based on the charges stored in the first floating diffusion FD31 and the second floating diffusion FD32, and when the switch transistor SW31 and the switch transistor SW32 are turned on, the pixel PX3 may operate in the LOFIC mode in which the pixel signal is generated based on the charges stored in the first floating diffusion FD31, the second floating diffusion FD32, and the third floating diffusion FD33.

First, the high-level select signal SEL1 is applied to the gate of the select transistor SX3 to turn on the select transistor SX3. In addition, since the first gain control signal DCG1 is maintained at a high level, the first floating diffusion FD31 and the second floating diffusion FD32 are connected to the first floating node FN31. Accordingly, during the period 101, the voltage of the first floating node FN31 according to the charges stored in the first floating diffusion FD31 and the second floating diffusion FD32 may be output to the column line CL through the drive transistor DX3 as the pixel signal VS, that is, the LCG reset signal RST_L.

Next, when the first gain control signal DCG1 is shifted to a low level, the first switch transistor SW31 is turned off. Accordingly, during the period 102, the voltage of the first floating node FN31 according to the charges stored in the first floating diffusion FD31 may be output to the column line CL through the drive transistor DX3 as the pixel signal VS, that is, the HCG reset signal RST_H.

Thereafter, the high-level transfer signal TG is applied to the gates of the transfer transistors TX31, TX32, TX33, and TX34, so the charges generated by the photoelectric devices PD31, PD32, PD33, and PD34 may be transferred to the first floating diffusion FD31. Accordingly, the quantity of charge stored in the first floating diffusion FD31 may be changed. Accordingly, during the period 103, the voltage of the first floating node FN31 according to the charges stored in the changed first floating diffusion FD31 may be output to the column line CL through the drive transistor DX3 as the pixel signal VS, that is, the HCG signal SIG_H.

In addition, the high-level first gain control signal DCG1 is applied to the first switch transistor SW31, so the first floating diffusion FD31 and the second floating diffusion FD32 are connected to the first floating node FN31. In addition, the high-level transfer signal TG is applied to the gates of the transfer transistors TX31, TX32, TX33, and TX34, so the charges generated by the photoelectric devices PD31, PD32, PD33, and PD34 may be provided to the first floating diffusion FD31 and the second floating diffusion FD32 and the charges stored in the first floating diffusion FD31 and the second floating diffusion FD32 may be changed. Accordingly, during the period 104, the voltage of the first floating node FN31 according to the charges stored in the first floating diffusion FD31 and the second floating diffusion FD32 may be output to the column line CL through the drive transistor DX3 as the pixel signal VS, that is, the LCG signal SIG_L.

Thereafter, the high-level second gain control signal DCG2 is applied to the second switch transistor SW32, so the first floating diffusion FD31, the second floating diffusion FD32, and the third floating diffusion FD33 are connected to the first floating node FN31. In addition, the high-level transfer signal TG is applied to the gates of the transfer transistors TX31, TX32, TX33, and TX34, so the charges generated by the photoelectric devices PD31, PD32, PD33, and PD34 may be transferred to the first floating diffusion FD31, the second floating diffusion FD32, and the third floating diffusion FD33. Accordingly, during the period 105, the voltage of the first floating node FN31 based on the charges stored in the first floating diffusion FD31, the second floating diffusion FD32, and the third floating diffusion FD33 may be output to the column line CL through the drive transistor DX3 as the pixel signal VS, that is, the LOFIC signal SIG_LOFIC.

Next, the high-level reset signal RG1 is applied to the reset transistor RX3, so the first floating diffusion FD31, the second floating diffusion FD32, and the third floating diffusion FD33 are reset by the power supply voltage VDD. Accordingly, during the period 106, the voltage of the first floating node FN31 based on the charges stored in the reset first floating diffusion FD31, second floating diffusion FD32, and third floating diffusion FD33 may be output to the column line CL through the drive transistor DX3 as the pixel signal VS, that is, the LOFIC reset signal RST_LOFIC.

During the period 101, the DEMUX select signal SEL_M is at a low level, and thus, the LCG reset signal RST_L may be output to the first comparator 153_1. During periods 102 and 103, the DEMUX select signal SEL_M is at a high level, and thus, the HCG reset signal RST_H and the HCG signal SIG_H may be output to the second comparator 1532. During the period 104, the DEMUX select signal SEL_M is at a low level, and thus, the LCG signal SIG_L may be output to the first comparator 153_1. During periods 105 and 106, the DEMUX select signal SEL_M is at a high level, and thus, the LOFIC signal SIG_LOFIC and the LOFIC reset signal RST_LOFIC may be output to the second comparator 153_2.

Meanwhile, the reference signal RAMP illustrated in FIG. 12 is a signal provided to the comparator 653 in the readout circuit 150 during the readout period Readout.

The waveform of the reference signal RAMP illustrated in FIG. 12 may be determined according to the type of the pixel signal VS generated during the period illustrated in FIG. 12.

The comparators 153_1 and 1532 may compare the pixel signal VS with the reference signal RAMP synchronously input with the timing when the pixel signal VS is input to each of the comparators 153_1 and 153_2, and output the result to the counters 155_1 and 155_2.

A first ramp signal R1 having a first cycle and a fourth ramp signal R4 having a second cycle greater than the first cycle may be provided to the first comparator 153_1 in synchronization with the comparison target signal. Specifically, the first ramp signal R1 may be provided to the first comparator 153_1 within the period 101, and the fourth ramp signal R4 may be provided to the first comparator 153_1 within the period 104.

The first comparator 153_1 may output a result of comparing the LCG reset signal RST_L input through the selector 151 with the first ramp signal R1 having the first cycle, and output a result of comparing the LCG signal SIG_L input through the selector 151 with the fourth ramp signal R4 having a second cycle greater than the first cycle.

A second ramp signal R2 having a first cycle, a third ramp signal R3 and a fifth ramp signal R5 having a second cycle, and a sixth ramp signal R6 having a first cycle may be sequentially provided to the second comparator 153_2 in synchronization with a comparison target signal. Specifically, the second ramp signal R2 may be provided to the second comparator 153_2 within the period 102, the third ramp signal R3 may be provided to the second comparator 153_2 within the period 103, the fifth ramp signal R5 may be provided to the second comparator 153_2 within the period 105, and the sixth ramp signal R6 may be provided to the second comparator 153_2 within the period 106.

The second comparator 153_2 may output a result of comparing the HCG reset signal RST_H input through the selector 151 with the second ramp signal R2 having the first cycle, output a result of comparing the HCG signal SIG_H input through the selector 151 with the third ramp signal R3 having the second cycle, output a result of comparing the LOFIC signal SIG_LOFIC input through the selector 151 with the fifth ramp signal R5 having the second cycle, and output a result of comparing the LOFIC reset signal RST_LOFIC input through the selector 151 with the sixth ramp signal R6 having the second cycle.

However, embodiments are not limited thereto, and the ramp signal generator 160 may also generate a reference signal RAMP of another waveform including the first ramp signal R1 to the sixth ramp signal R6.

Here, since the degree of change of the LCG reset signal RST_L, the HCG reset signal RST_H, and the LOFIC reset signal RST_LOFIC is relatively small, and the degree of change of the HCG signal SIG_H, the LCG signal SIG_L, and the LOFIC signal SIG_LOFIC is relatively large, the first cycle may be shorter than the second cycle.

Normally, since the analog gain is adjusted to be the same in each mode, the first ramp signal R1 to the sixth ramp signal R6 may all have the same slope. When the analog gain is adjusted, the slopes of the first ramp signal R1 to the sixth ramp signal R6 may be changed.

Figure 13:
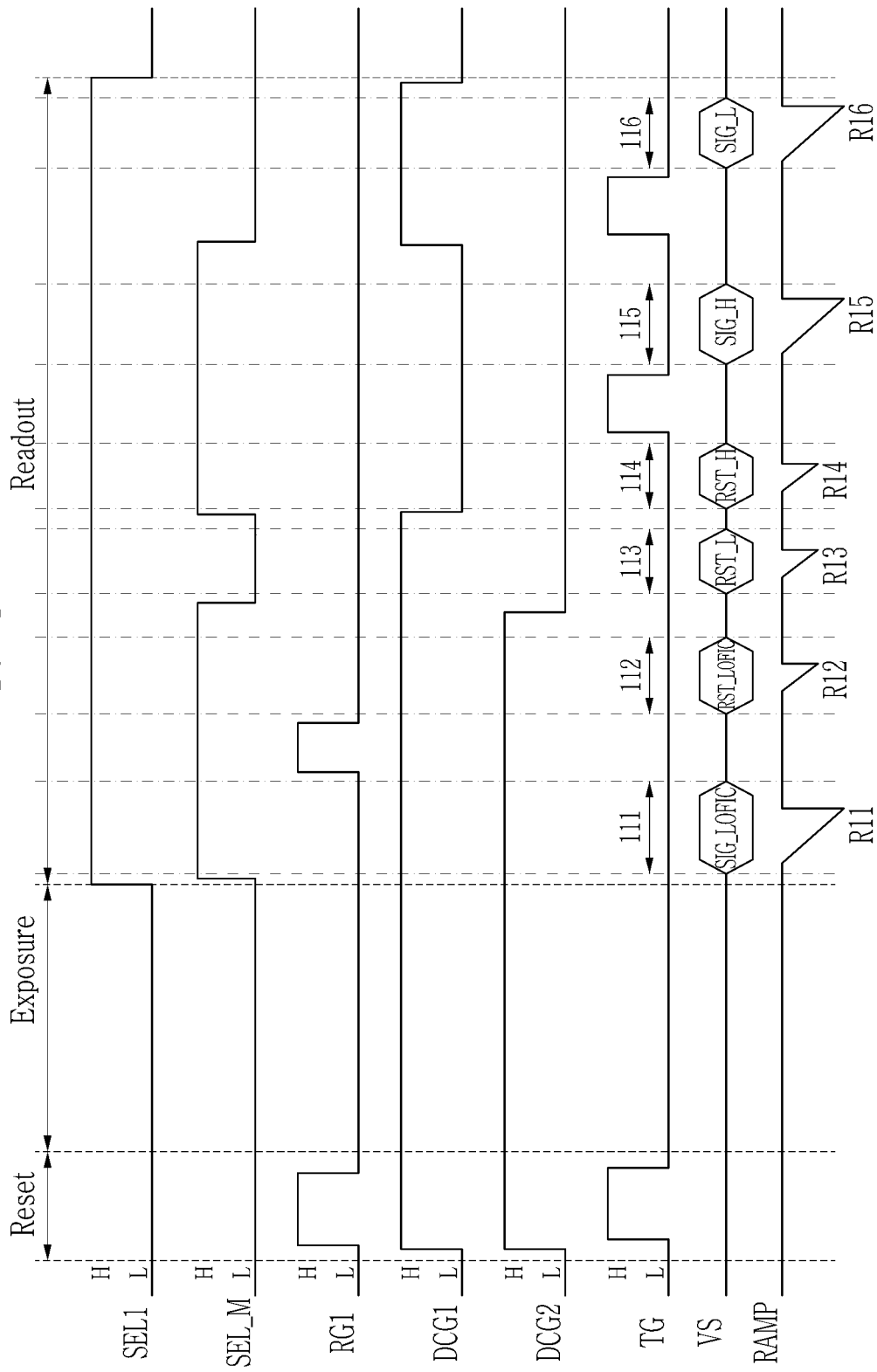
FIG. 13 is an example diagram illustrating another operation timing of an image sensor according to an embodiment.

FIG. 13 is an example diagram illustrating another operation timing of an image sensor according to an embodiment.

FIG. 13 illustrates a scan period for driving a plurality of pixels in a row line unit. One scan period may sequentially include a reset period Reset, an exposure period Exposure, and a readout period Readout.

FIG. 13 is a diagram illustrating a case in which the image sensor 100 operates in a readout method of SIG-RST-RST-RST-SIG-SIG (SR-RRSS).

An operation of the image sensor illustrated in FIG. 13 will be described with reference to FIGS. 3 and 11A described above. First, since the waveforms of the reset signal RG1, the first gain control signal DCG1, the second gain control signal DCG2, and the transfer signal TG in the reset period Reset and the exposure period Exposure of FIG. 13 are similar to the waveforms of the reset signal RG1, the first gain control signal DCG1, the second gain control signal DCG2, and the transfer signal TG in the reset period Reset and the exposure period Exposure of FIG. 12, the description of FIG. 12 may also be applied to FIG. 13. The readout period Readout is a period in which the pixel signal VS generated in the pixel PX3 is transferred to the readout circuit 150.

In the readout period, each of the LOFIC signal SIG_LOFIC, the LOFIC reset signal RST_LOFIC, the LCG reset signal RST_L, the HCG reset signal RST_H, the HCG signal SIG_H, and the LCG signal SIG_L may be output as the pixel signal VS.

First, the high-level select signal SEL1 is applied to the gate of the select transistor SX3 to turn on the select transistor SX3. In addition, since the first gain control signal DCG1 and the second gain control signal DCG2 are maintained at a high level, the first floating diffusion FD31, the second floating diffusion FD32, and the third floating diffusion FD33 are applied to the first floating node FN31. In the exposure period Exposure, the charges overflowing from the photoelectric devices PD31, PD32, PD33, and PD34 may be shared by the first floating diffusion FD31, the second floating diffusion FD32, and the third floating diffusion FD33. Accordingly, during a period 111, the voltage of the first floating node FN31 based on the charges stored in the first floating diffusion FD31, the second floating diffusion FD32, and the third floating diffusion FD33 may be output to the column line CL through the drive transistor DX3 as the pixel signal VS, that is, the LOFIC signal SIG_LOFIC.

Next, the high-level reset signal RG1 is applied to the reset transistor RX3, so the first floating diffusion FD31, the second floating diffusion FD32, and the third floating diffusion FD33 are reset by the power supply voltage. Accordingly, during a period 112, the voltage of the first floating node FN31 based on the charges stored in the reset first floating diffusion FD31, second floating diffusion FD32, and third floating diffusion FD33 may be output to the column line CL through the drive transistor DX3 as the pixel signal VS, that is, the LOFIC reset signal RST_LOFIC.

Thereafter, since the first gain control signal DCG1 is maintained at a high level, the first floating diffusion FD31 and the second floating diffusion FD32 are connected to the first floating node FN31. Accordingly, during a period 113, the voltage of the first floating node FN31 according to the charges stored in the first floating diffusion FD31 and the second floating diffusion FD32 may be output to the column line CL through the drive transistor DX3 as the pixel signal VS, that is, the LCG reset signal RST_L.

Next, when the first gain control signal DCG1 is shifted to a low level, the first switch transistor SW31 is turned off. Accordingly, during a period 114, the voltage of the first floating node FN31 according to the charges stored in the first floating diffusion FD31 may be output to the column line CL through the drive transistor DX3 as the pixel signal VS, that is, the HCG reset signal RST_H.

Next, the high-level transfer signal TG is applied to the gates of the transfer transistors TX31, TX32, TX33, and TX34, so the charges generated by the photoelectric devices PD31, PD32, PD33, and PD34 may be transferred to the first floating diffusion FD31. Accordingly, the quantity of charge stored in the first floating diffusion FD31 may be changed. Accordingly, during a period 115, the voltage of the first floating node FN31 according to the charges stored in the first floating diffusion FD31 changed due to the photoelectric devices PD31, PD32, PD33, and PD34 may be output to the column line CL through the drive transistor DX3 as the pixel signal, that is, the HCG signal SIG_H.

In addition, the high-level first gain control signal DCG1 is applied to the first switch transistor SW31, so the first floating diffusion FD31 and the second floating diffusion FD32 are connected to the first floating node FN31. In addition, the high-level transfer signal TG is applied to the gates of the transfer transistors TX31, TX32, TX33, and TX34, so the charges generated by the photoelectric devices PD31, PD32, PD33, and PD34 may be transferred to the first floating diffusion FD31 and the second floating diffusion FD32. Accordingly, during a period 116, the voltage of the first floating node FN31 according to the charges stored in the first floating diffusion FD31 and the second floating diffusion FD32 may be output to the column line CL through the drive transistor DX3 as the pixel signal, that is, the LCG signal SIG_L. During periods 111 and 112, the DEMUX select signal SEL_M is at a high level, and thus the LOFIC signal SIG_LOFIC and the LOFIC reset signal RST_LOFIC may be output to the second comparator 153_2. During the period 113, the DEMUX select signal SEL_M is at a low level, and thus, the LCG reset signal RST_L may be output to the first comparator 153_1. During the periods 114 and 115, the DEMUX select signal SEL_M is at a high level, and thus, the HCG reset signal RST_H and the HCG signal SIG_H may be output to the second comparator 153_2. During the period 116, the DEMUX select signal SEL_M is at a low level, and thus, the LCG signal SIG_L may be output to the first comparator 153_1.

Meanwhile, the reference signal RAMP illustrated in FIG. 13 is a signal provided to the comparator 653 in the readout circuit 150 during the readout period Readout.

The waveform of the reference signal RAMP may be determined according to the type of the pixel signal VS generated during the period illustrated in FIG. 13.

The comparators 153_1 and 153_2 may compare the pixel signal VS with the reference signal RAMP synchronously input with the timing when the pixel signal VS is input to each of the comparators 153_1 and 153_2, and output the result to the counters 155_1 and 155_2.

A third ramp signal R13 having a first cycle and a sixth ramp signal R16 having a second cycle greater than the first cycle may be sequentially provided to the first comparator 153_1 in synchronization with the comparison target signal. Specifically, the third ramp signal R13 may be provided to the first comparator 153_1 within the period 113, and the sixth ramp signal R16 may be provided to the first comparator 153_1 within the period 116.

In addition, a first ramp signal R11 having a second cycle, a second ramp signal R12 and a fourth ramp signal R14 having a first cycle smaller than the second cycle, and a fifth ramp signal R15 having a second cycle may be sequentially provided to the second comparator 153_2 in synchronization with the comparison target signal. Specifically, the first ramp signal R11 may be provided to the second comparator 153_2 within the period 111, the second ramp signal R12 may be provided to the second comparator 153_2 within the period 112, the fourth ramp signal R14 may be provided to the second comparator 153_2 within the period 114, and the fifth ramp signal R15 may be provided to the second comparator 153_2 within the period 115.

However, embodiments are not limited thereto, and the ramp signal generator 160 may also generate a reference signal RAMP of another waveform including the first ramp signal R11 to the sixth ramp signal R16.

The comparator 153 may compare the pixel signal VS output from the pixel PX3 with the reference signal RAMP synchronously input with the timing when the pixel signal VS is input to the comparator 153, and generate the output according to the comparison result. In this regard, it has been described in detail with reference to FIG. 12, and the corresponding description may be equally applied to the embodiment illustrated in FIG. 13.

Figure 14:
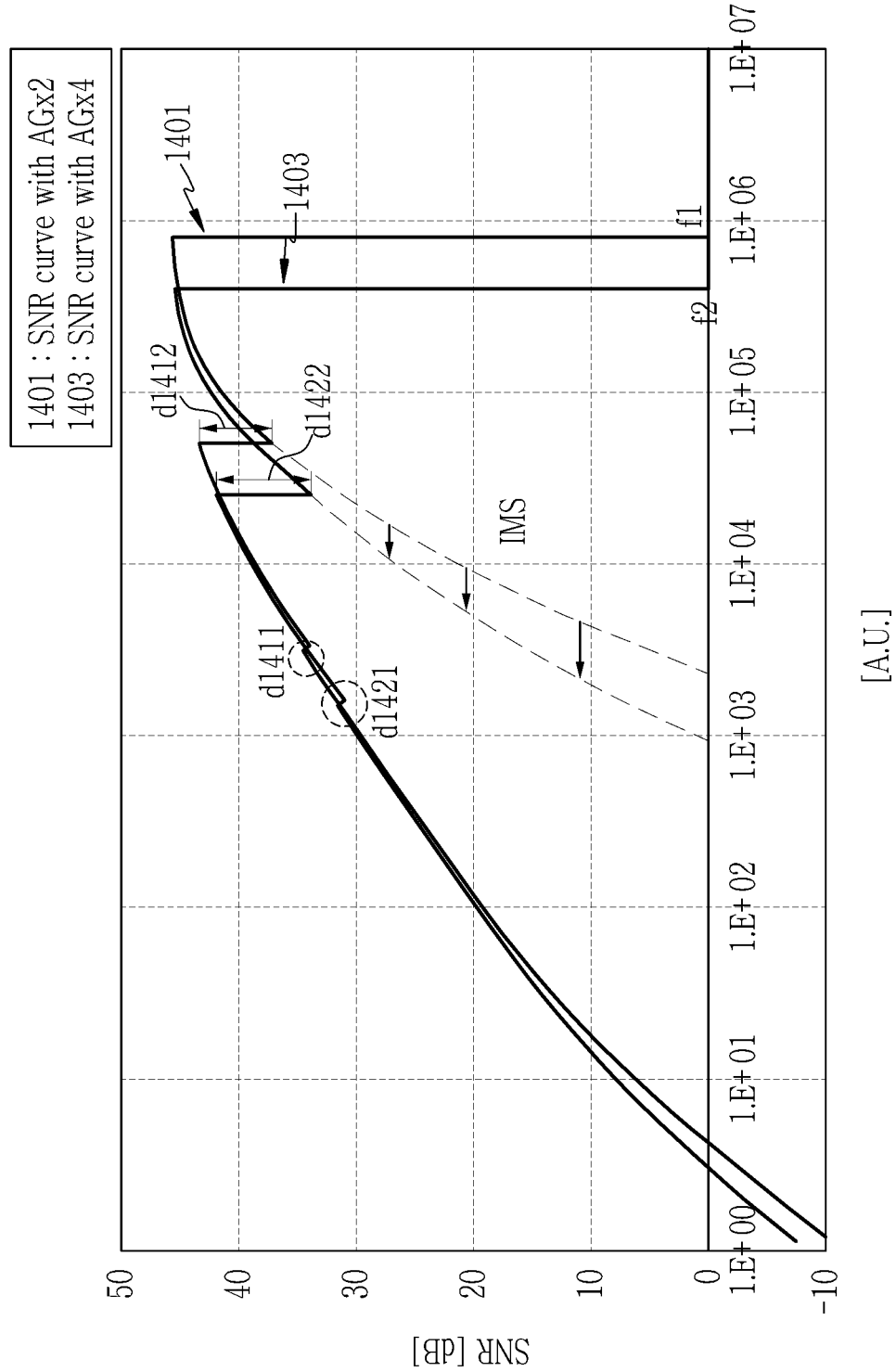
FIG. 14 is an example graph illustrating a signal-to-noise ratio according to embodiments of the present invention.

FIG. 14 is an example graph illustrating a signal-to-noise ratio according to embodiments of the present invention.

In FIG. 14, an x-axis represents the quantity of charges generated by the photoelectric devices PD31, PD32, PD33, and PD34, and a y-axis represents, in units of dB, a signal-to-noise ratio of the signal obtained by causing the image signal processor 180 to synthesize the HCG image signal, the LCG image signal, and the LOFIC image signal.

The first graph 1401 is a graph illustrating the SNR of the synthesized signal output from the image signal processor 180 when the pixel signal VS is readout with an analog gain twice a predetermined analog gain. In this case, as illustrated in the first graph 1401, the FWC may be proportional to a magnitude f1 of maximum incident light that may be detected. In addition, an SNR dip d1411 between the HCG image signal and the LCG image signal and an SNR dip d1412 between the LCG image signal and the LOFIC image signal are illustrated in the first graph 1401.

The second graph 1403 is a graph illustrating the SNR of the synthesized signal output from the image signal processor 180 when the pixel signal VS is readout with an analog gain four times the predetermined analog gain. In this case, as illustrated in the first graph 1403, the FWC may be proportional to a magnitude f2 of maximum incident light that may be detected. In addition, an SNR dip d1421 between the HCG image signal and the LCG image signal and an SNR dip d1422 between the LCG image signal and the LOFIC image signal are illustrated in the second graph 1403.

As illustrated in FIG. 14, when the analog gain increases, the SNR graph may be changed. As the analog gain increases, the dynamic range may decrease. In addition, it can be seen that increasing the analog gain moves the signal-to-noise ratio (SNR) graph of the LOFIC image signal to the left, and thus, the SNR dip may further increase. In particular, with the increase in the analog gain, the increase in the magnitude of the SNR dip between the LCG image signal and the LOFIC image signal increasing from the SNR dip d1412 to the SNR dip d1422 may be larger than the increase in the magnitude of the SNR dip between the HCG image signal and the LCG image signal increasing from the SNR dip d1411 to the SNR dip d1421.

Figure 15:
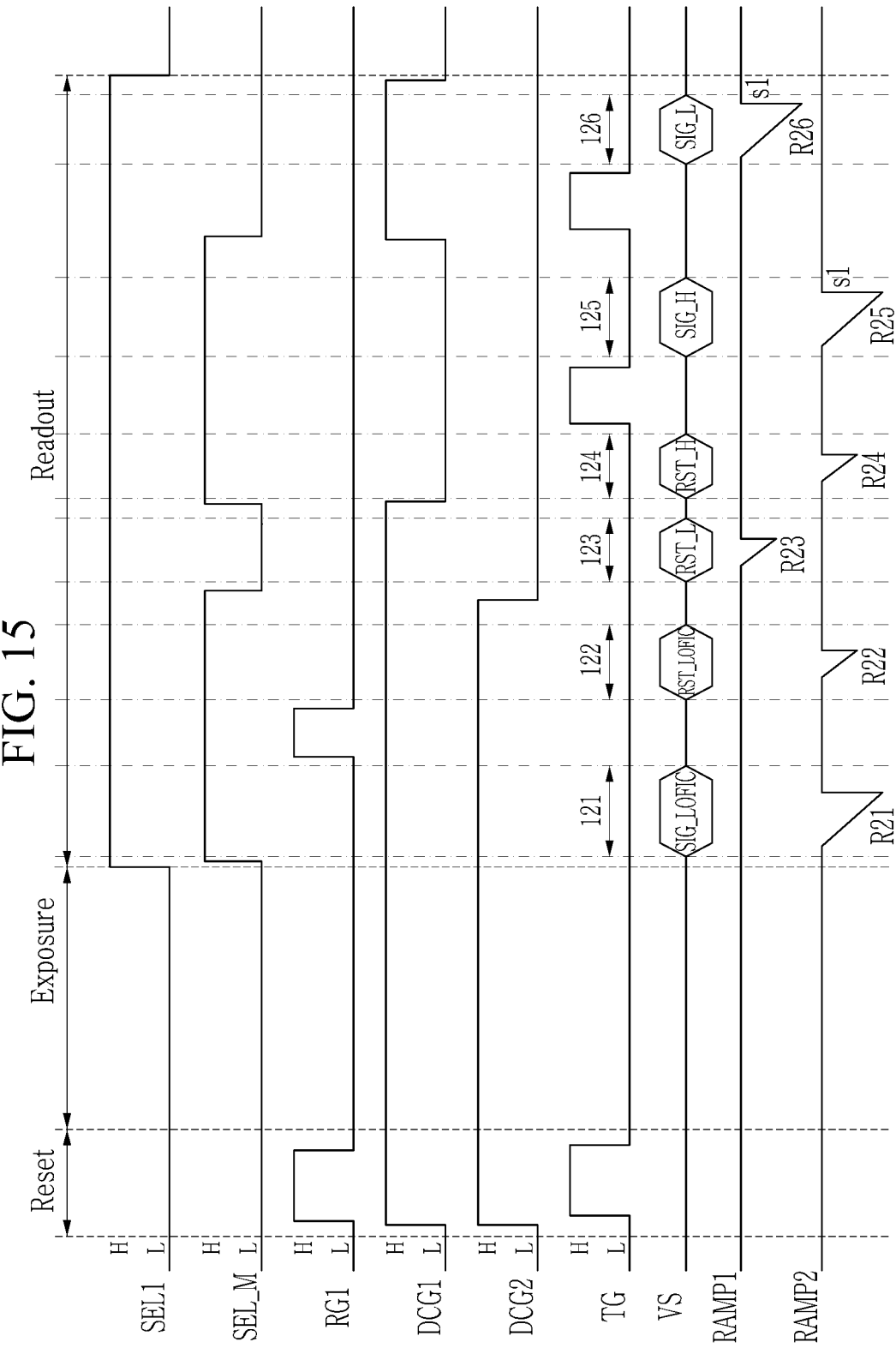
FIGS. 15 and 16 are example diagrams illustrating an operation timing of an image sensor.
Figure 16:
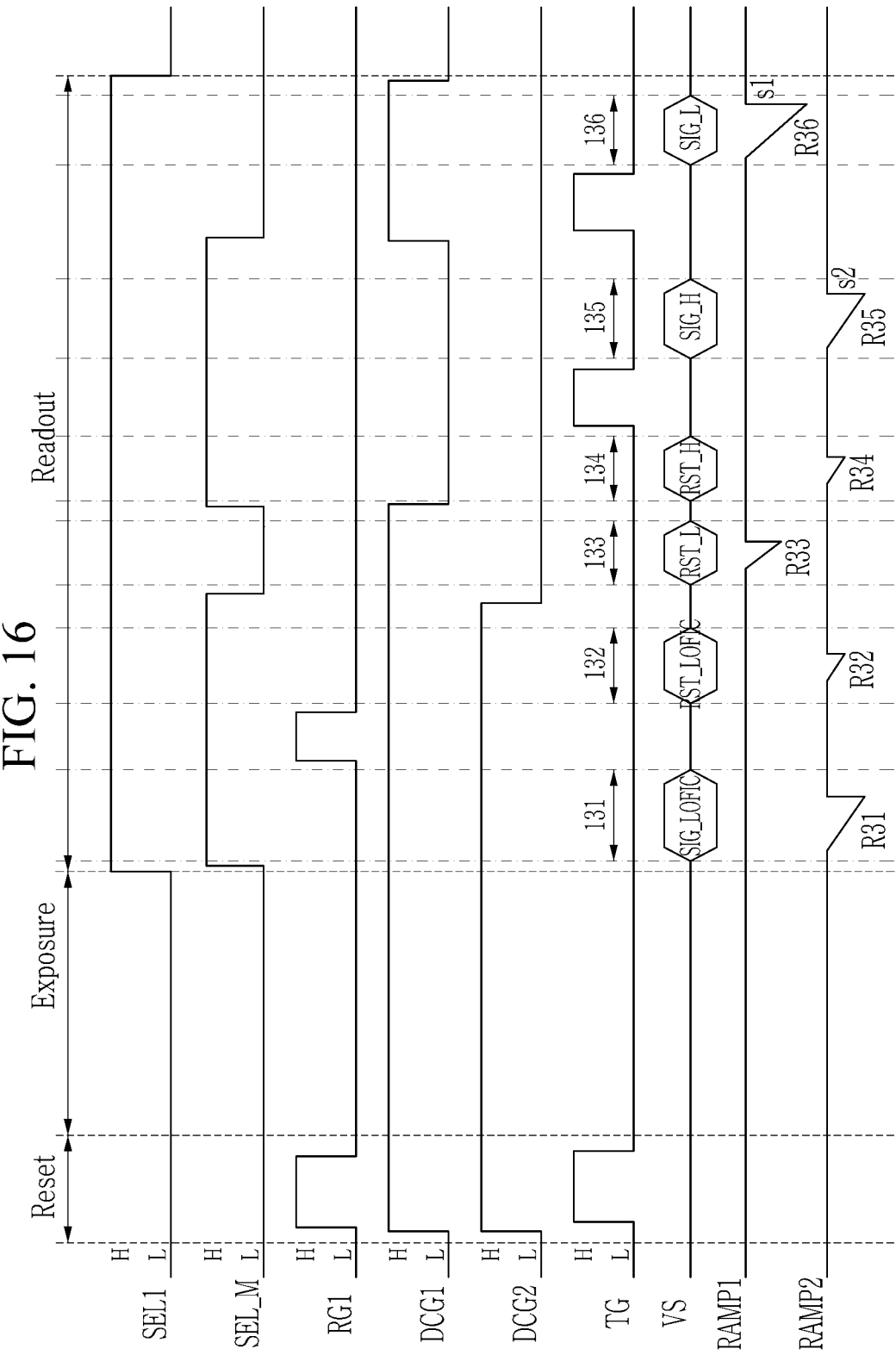

FIGS. 15 and 16 are example diagrams illustrating the operation timing of the image sensor.

An operation of the image sensor illustrated in FIGS. 15 and 16 will be described with reference to FIGS. 6 and 11A.

FIG. 15 illustrates a scan period for driving a plurality of pixels in a row line unit. One scan period may sequentially include a reset period Reset, an exposure period Exposure, and a readout period Readout.

FIG. 15 is a diagram illustrating a case in which the image sensor 600 operates in a readout method of SIG-RST-RST-RST-SIG-SIG (SR-RRSS). First, since the waveforms of the reset signal RG1, the first gain control signal DCG1, the second gain control signal DCG2, and the transfer signal TG in the reset period Reset, the exposure period, and the readout period Readout of FIG. 15 are similar to the waveforms of the reset signal RG1, the first gain control signal DCG1, the second gain control signal DCG2, and the transfer signal TG in the reset period Reset, the exposure period Exposure, and the readout period Readout of FIG. 13, the description of FIG. 13 may also be applied to FIG. 15.

The readout period Readout is a period in which the pixel signal VS generated in the pixel PX is transferred to the readout circuit 650.

During a period 121, the voltage of the first floating node FN31 based on the charges stored in the first floating diffusion FD31, the second floating diffusion FD32, and the third floating diffusion FD33 may be output to the column line CL through the drive transistor DX3 as the pixel signal VS, that is, the LOFIC signal SIG_LOFIC. During a period 122, the pixel signal VS may be output to the column line CL as the LOFIC reset signal RST_LOFIC. During a period 123, the pixel signal VS may be output to the column line CL as the LCG reset signal RST_L. During a period 124, the pixel signal VS may be output to the column line CL as the HCG reset signal RST_H. During a period 125, the voltage of the first floating node FN31 according to the charges stored in the first floating diffusion FD31 changed due to the photoelectric devices PD31, PD32, PD33, and PD34 may be output to the column line CL through the drive transistor DX3 as the pixel signal VS, that is, the HCG signal SIG_H. During a period 126, the voltage of the first floating node FN31 according to the charges stored in the first floating diffusion FD31 and the second floating diffusion FD32 may be output to the column line CL through the drive transistor DX3 as the pixel signal VS, that is, the LCG signal SIG_L.

During periods 121 and 122, the DEMUX select signal SEL_M is at a high level, and thus, the LOFIC signal SIG_LOFIC and the LOFIC reset signal RST_LOFIC may be output to the second comparator 653_2. During a period 123, the DEMUX select signal SEL_M is at a low level, and thus, the LCG reset signal RST_L may be output to the first comparator 6531. During periods 124 and 125, the DEMUX select signal SEL_M is at a high level, and thus, the HCG reset signal RST_H and the HCG signal SIG_H may be output to the second comparator 653_2. Finally, during a period 126, the DEMUX select signal SEL_M is at a low level, and thus, the LCG signal SIG_L may be output to the first comparator 653_1.

The reference signals RAMP1 and RAMP2 illustrated in FIG. 15 are signals provided to the comparator 653 in the readout circuit 650 during the readout period Readout. The shapes of the reference signals RAMP1 and RAMP2 may be due to the shape of the pixel signal VS.

Meanwhile, the first reference signal RAMP1 is a signal provided to the first comparator 6531 during the readout period Readout, and the second reference signal RAMP2 is a signal provided to the second comparator 653_2 during the readout period Readout. The ramp signal generator 660 may generate the first and second reference signals RAMP1 and RAMP2 in response to the ramp enable signal R_EN during the readout period Readout.

A third ramp signal R23 having a first cycle and a sixth ramp signal R26 having a second cycle greater than the first cycle may be sequentially provided to the first comparator 653_1 in synchronization with the comparison target signal. Specifically, the third ramp signal R23 may be provided to the first comparator 653_1 within the period 123, and the sixth ramp signal R26 may be provided to the first comparator 653_1 within the period 126.

In addition, a first ramp signal R21 having a second cycle, a second ramp signal R22 and a fourth ramp signal R24 having a first cycle, and a fifth ramp signal R25 having a second cycle may be sequentially provided to the second comparator 6532 in synchronization with the comparison target signal. Specifically, the first ramp signal R21 may be provided to the second comparator 6532 within the period 121, the second ramp signal R22 may be provided to the second comparator 653_2 within the period 122, the fourth ramp signal R24 may be provided to the second comparator 6532 within the period 124, and the fifth ramp signal R25 may be provided to the second comparator 653_2 within the period 125.

However, embodiments are not limited thereto, and the ramp signal generator 660 may also generate a reference signal of another waveform including the first ramp signal R21 to the sixth ramp signal R26.

Both the first ramp signal R21 to the sixth ramp signal R26 may have the same slope s1.

The first comparator 653_1 may compare the pixel signal VS output from the pixel PX with the first reference signal RAMP1 synchronously input with the timing when the pixel signal VS is input to the first comparator 653_1 and generate the output according to the comparison result. In addition, the second comparator 653_2 may compare the pixel signal VS output from the pixel PX with the second reference signal RAMP2 synchronously input with the timing when the pixel signal VS is input to the comparator 653_2 and generate the output according to the comparison result.

Specifically, FIG. 16 is a diagram illustrating the operation timing of the image sensor when the slopes of the ramp signals in the first reference signal RAMP1 and the slopes of the ramp signals in the second reference signal RAMP2 illustrated in FIG. 15 are different.

Like FIG. 15, during a period 131, the pixel signal VS may be output to the column line CL as the LOFIC signal SIG_LOFIC. During a period 132, the pixel signal VS may be output to the column line CL as the LOFIC reset signal RST_LOFIC. During a period 133, the pixel signal VS may be output to the column line CL as the LCG reset signal RST_L. During a period 134, the pixel signal VS may be output to the column line CL as the HCG reset signal RST_H. During a period 135, the pixel signal VS may be output to the column line CL as the HCG signal SIG_H. During a period 136, the pixel signal VS may be output to the column line CL as the LCG signal SIG_L.

During periods 131 and 132, the DEMUX select signal SEL_M is at a high level, and thus, the LOFIC signal SIG_LOFIC and the LOFIC reset signal RST_LOFIC may be output to the second comparator 653_2. During a period 133, the DEMUX select signal SEL_M is at a low level, and thus, the LCG reset signal RST_L may be output to the first comparator 653_1. During periods 134 and 132, the DEMUX select signal SEL_M is at a high level, and thus, the HCG reset signal RST_H and the HCG signal SIG_H may be output to the second comparator 653_2. Finally, during a period 136, the DEMUX select signal SEL_M is at a low level, and thus, the LCG signal SIG_L may be output to the first comparator 653_1.

The first reference signal RAMP1 is a signal provided to the first comparator 653_1 during the readout period Readout, and the second reference signal RAMP2 is a signal provided to the second comparator 653_2 during the readout period Readout. The ramp signal generator 660 may generate the first and second reference signals RAMP1 and RAMP2 in response to the ramp enable signal R_EN during the readout period Readout. For example, the first reference signal RAMP1 may include the plurality of ramp signals having the first slope s1, and the second reference signal RAMP2 may include the plurality of ramp signals having the second slope s2. When the ramp signal generator 660 adjusts the slope of the ramp signals in the second reference signal RAMP2, the analog gain may be changed in the case where the LOFIC signal SIG_LOFIC, the LOFIC reset signal RST_LOFIC, the HCG reset signal RST_H, and the HCG signal SIG_H are readout.

A third ramp signal R33 having a first cycle and a sixth ramp signal R36 having a second cycle greater than the first cycle may be sequentially provided to the first comparator 653_1 in synchronization with the comparison target signal. Specifically, the third ramp signal R33 may be provided to the first comparator 653_1 within the period 133, and the sixth ramp signal R26 may be provided to the first comparator 653_1 within the period 136.

In addition, a first ramp signal R31 having a second cycle, a second ramp signal R32 and a fourth ramp signal R34 having a first cycle, and a fifth ramp signal R35 having a second cycle may be sequentially provided to the second comparator 6532 in synchronization with the comparison target signal. Specifically, the first ramp signal R31 may be provided to the second comparator 653_2 within the period 131, the second ramp signal R32 may be provided to the second comparator 653_2 within the period 132, the fourth ramp signal R34 may be provided to the second comparator 6532 within the period 134, and the fifth ramp signal R35 may be provided to the second comparator 653_2 within the period 135.

The embodiments are not limited thereto, and each of the LOFIC reset signal RST_LOFIC, the LOFIC signal SIG_LOFIC, the LCG reset signal RST_L, the LCG signal SIG_L, the HCG reset signal RST_H, and the HCG signal SIG_H can be readout with different analog gains through ramp signals having different slopes.

Figure 17:
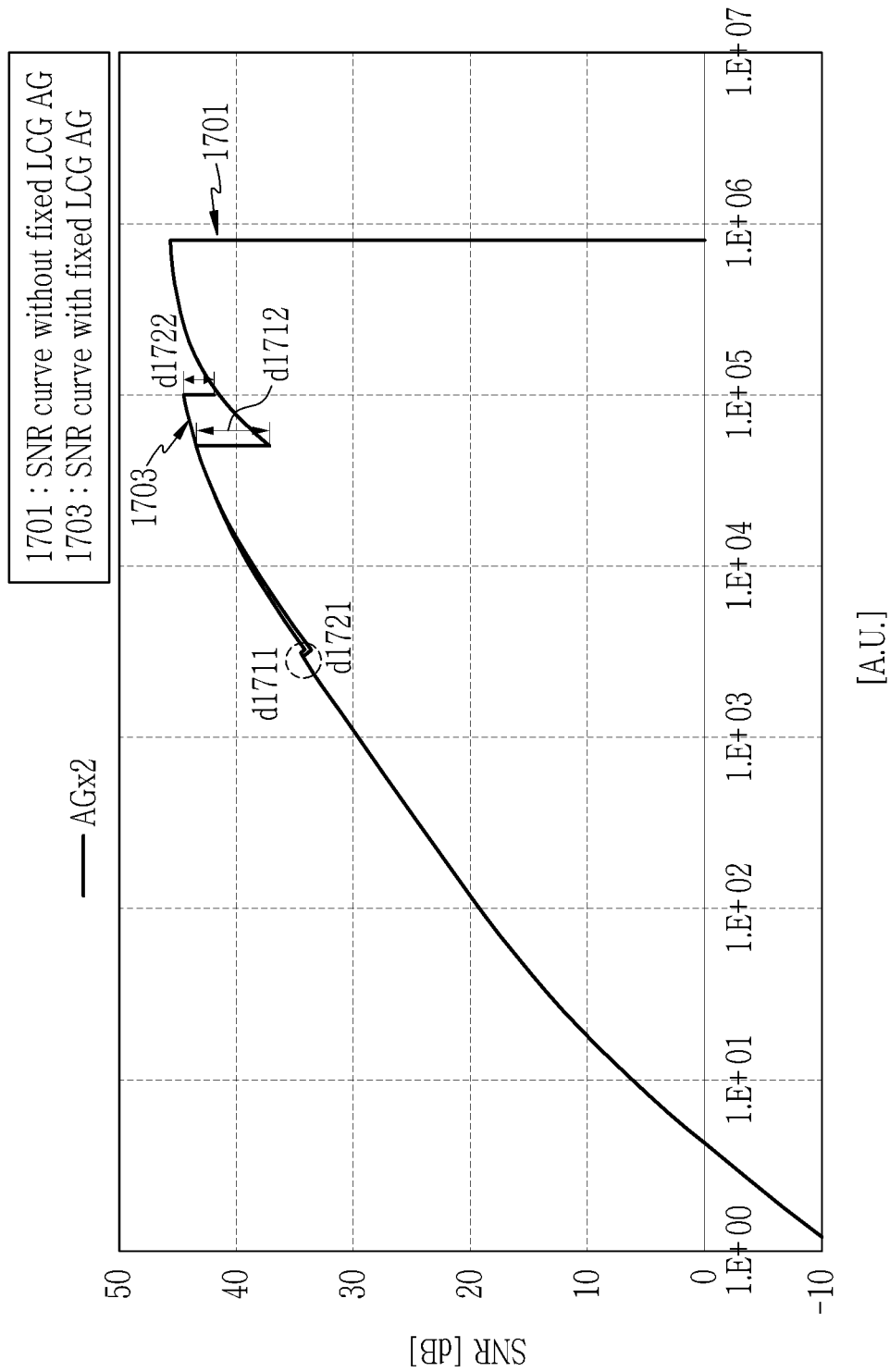
FIGS. 17 and 18 are example graphs illustrating a signal-to-noise ratio according to another embodiment of the present invention.
Figure 18:
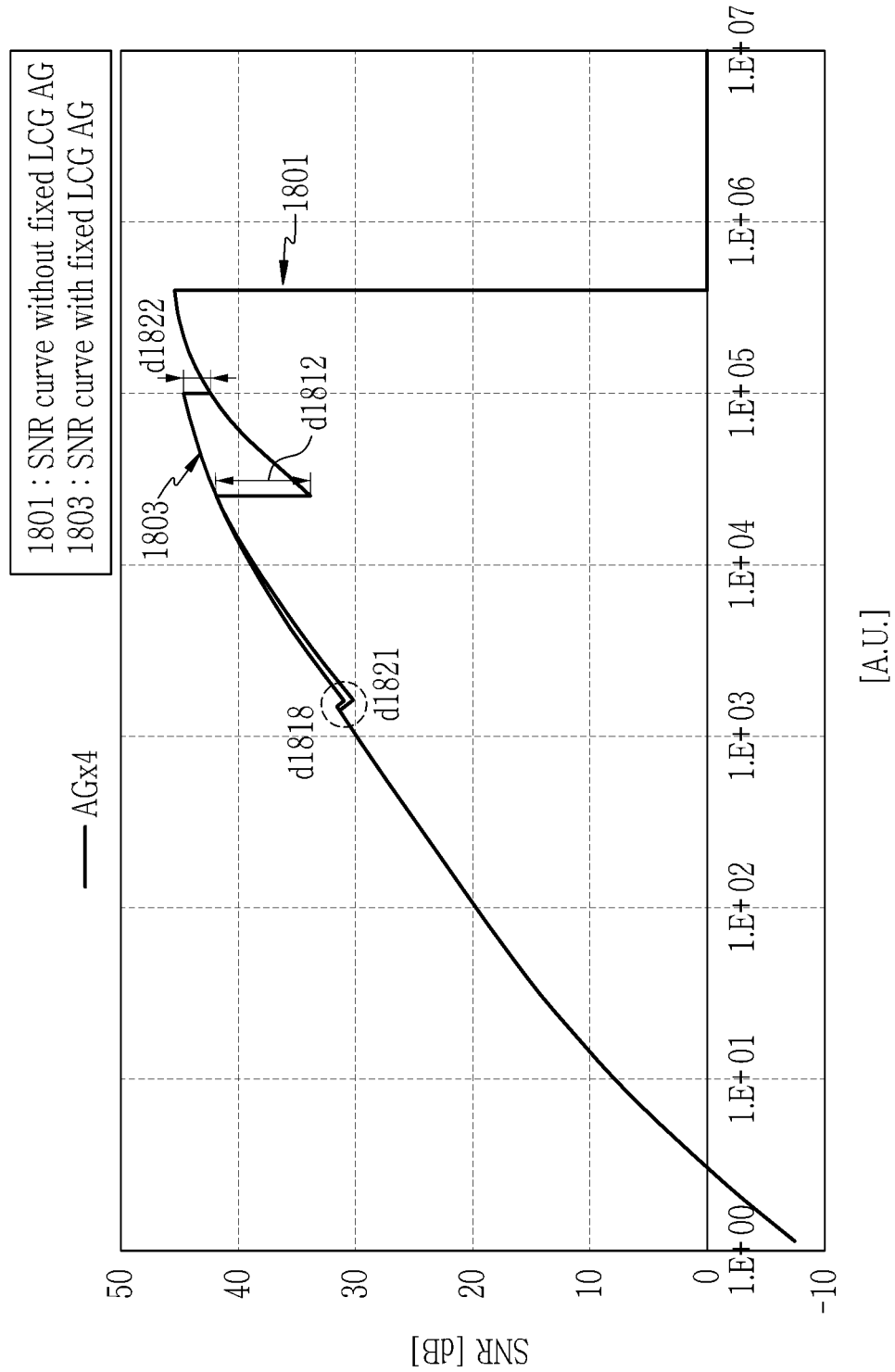

FIGS. 17 and 18 are example graphs illustrating a signal-to-noise ratio according to another embodiment of the present invention. Specifically, FIGS. 17 and 18 illustrate, in units of dB, the signal-to-noise ratio of the signal obtained by synthesizing the HCG image signal, the LCG image signal, and the LOFIC image signal according to the readout circuit 650 illustrated in FIG. 6.

A first graph 1701 is a graph illustrating an SNR of a signal obtained by synthesizing the HCG image signal, the LCG image signal, and the LOFIC image signal when the analog gain of the HCG image signal, the LCG image signal, and the LOFIC image signal is twice the predetermined analog gain. In this case, both the first and second reference signals RAMP1 and RAMP2 have the same slope. An SNR dip d1711 between the HCG image signal and the LCG image signal and an SNR dip d1712 between the LCG image signal and the LOFIC image signal are illustrated in the first graph 1701.

A second graph 1703 is a graph illustrating the SNR of the signal obtained by synthesizing the HCG image signal, the LCG image signal, and the LOFIC image signal when the analog gains of the HCG image signal and the LOFIC image signal are an analog gain twice the predetermined analog gain, and the analog gain of the LCG image signal is the same analog gain as the predetermined analog gain. In this case, the slope of the ramp signal when the HCG image signal and the LOFIC image signal are readout may be ½ times the slope of the ramp signal when the LCG image signal is readout. An SNR dip d1721 between the HCG image signal and the LCG image signal and an SNR dip d1722 between the LCG image signal and the LOFIC image signal are illustrated in the second graph 1703.

As illustrated in FIG. 17, the SNR dip d1722 between the LCG image signal and the LOFIC image signal in the first graph 1703 is smaller than that of the SNR dip d1712 between the LCG image signal and the LOFIC image signal in the first graph 1701. For example, the SNR dip between the LCG image signal and the LOFIC image signal may be smaller when the image signal is acquired without increasing the analog gain of the LCG image signal.

A third graph 1801 is a graph illustrating an SNR of a signal obtained by synthesizing the LCG signal SIG_H, the LCG image signal, and the LOFIC image signal when the analog gain of the HCG image signal, the LCG image signal, and the LOFIC image signal is four times the predetermined analog gain. In this case, both the first and second reference signals RAMP1 and RAMP2 have the same slope. An SNR dip d1811 between the HCG image signal and the LCG image signal and an SNR dip d1812 between the LCG image signal and the LOFIC image signal are illustrated in the third graph 1801.

A fourth graph 1803 is a graph illustrating the SNR of the signal obtained by synthesizing the HCG image signal, the LCG image signal, and the LOFIC image signal when the analog gains of the HCG image signal and the LOFIC image signal are an analog gain four times the predetermined analog gain, and the analog gain of the LCG image signal is the predetermined analog gain. In this case, the slope of the ramp signal when the HCG image signal and the LOFIC image signal are readout may be ¼ times the slope of the ramp signal when the LCG image signal is readout. An SNR dip d1821 between the HCG image signal and the LCG image signal and an SNR dip d1822 between the LCG image signal and the LOFIC image signal are illustrated in the fourth graph 1803.

As illustrated in FIG. 18, the SNR dip d1812 between the LCG image signal and the LOFIC image signal in the third graph 1801 is smaller than that of the SNR dip d1822 between the LCG image signal and the LOFIC image signal in the fourth graph 1803.

Referring to FIGS. 17 and 18, according to an embodiment of the present invention, the analog gain is maintained for the LCG image signal, and it can be seen that, as the analog gain for the HCG image signal and the LOFIC image signal increases, the degree of the SNR dip between the LCG image signal and the LOFIC image signal is further improved.

The embodiments are not limited thereto, and may be applied to the case where the analog gain of the LCG image signal is lower than the analog gain of the HCG image signal and the LOFIC image signal. For example, the ratio of the analog gain of the HCG image signal, the analog gain of the LCG image signal, and the analog gain of the LOFIC image signal is 2:1:2, 4:1:4, 4:2:4, 8:2:8, 16:4:16, etc., but is not limited thereto.

Figure 19:
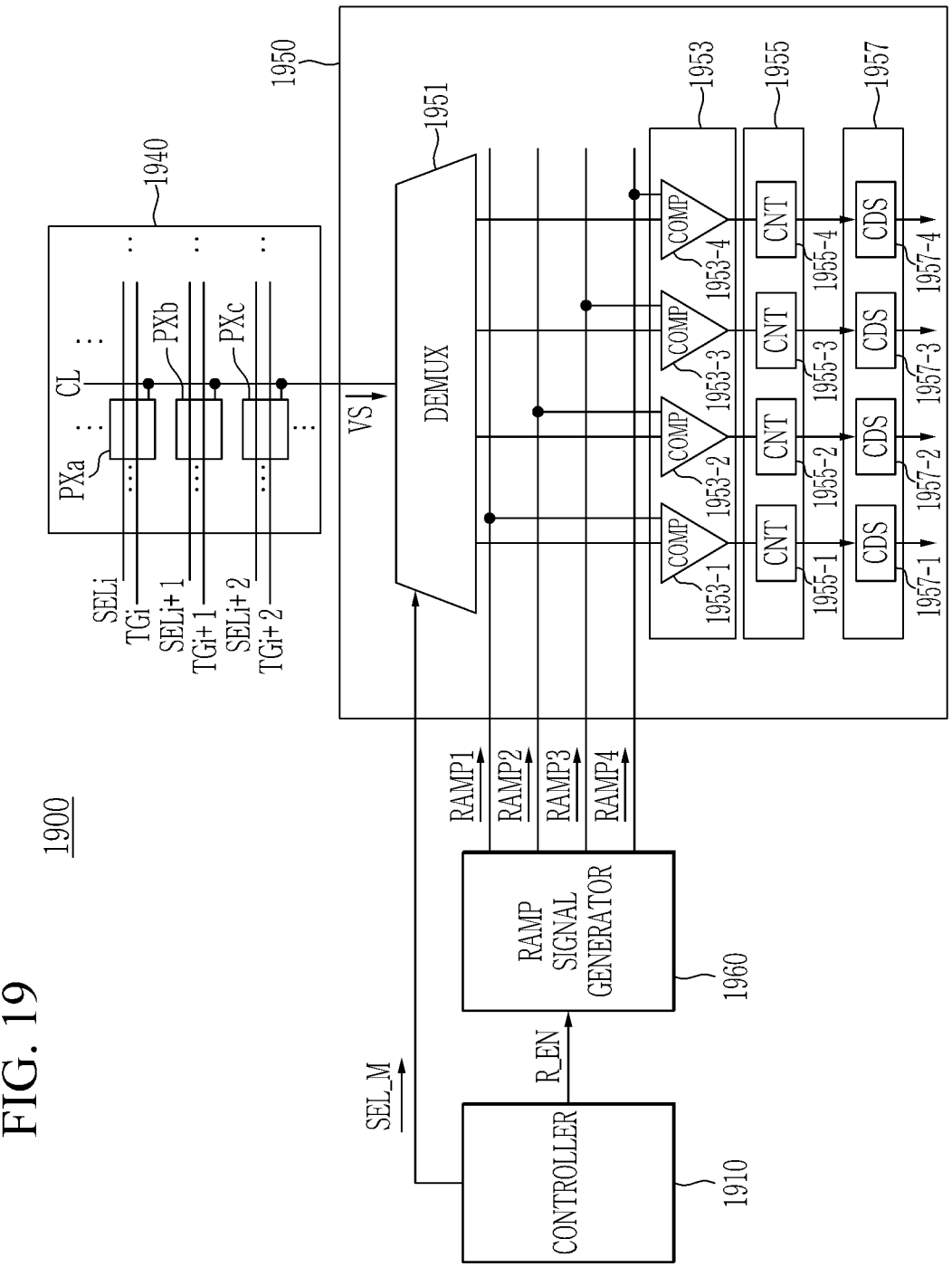
FIG. 19 is an example block diagram illustrating a pixel array and a readout circuit according to another embodiment.

FIG. 19 is an example block diagram illustrating a pixel array and a readout circuit according to another embodiment.

Referring to FIG. 19, an image sensor 1900 according to another embodiment may include a pixel array 1940 and a readout circuit 1950.

The pixel array 1940 may include a plurality of pixels PXs. Each pixel PX may be selected by the transfer signal TG and the select signal SEL1 to output the pixel signal VS. Referring to FIG. 19, the pixel array 1940 may include a plurality of pixels PXa, PXb, and PXc. Each of the plurality of pixels PXa, PXb, and PXc may receive a corresponding transfer signal among transfer signals TGi, TGi+1, and TGi+2 and a corresponding select signal among select signals SELi, SELi+1, and SELi+2. Each of the plurality of pixels PXa, PXb, and PXc may receive the corresponding select signal among the select signals SELi, SELi+1, and SELi+2 to output the pixel signal VS. Here, it is assumed that each of the plurality of pixels PXa, PXb, and PXc includes one sub-pixel.

The readout circuit 1950 may include a selector 1951, a comparator 1953, a counter 1955, and a CDS circuit 1957 connected to each column line CL of the pixel array 1940.

The selector 1951 may be implemented as, for example, a multiplexer, but is not limited thereto. The selector 1951 may correspond to one corresponding column line CL, and may receive the pixel signal VS from the connected column line CL. The selector 1951 may receive the DEMUX select signal SEL_M from the controller 1910 and output the pixel signal VS to the comparator 1953 based on the DEMUX select signal SEL_M. According to an embodiment, the selector 1951 may include four output terminals. The selector 1951 may output the pixel signal VS to any one of the four output terminals based on the DEMUX select signal SEL_M.

The ramp signal generator 1960 may generate the plurality of reference signals RAMP1, RAMP2, RAMP3, and RAMP4 in response to the ramp enable signal R_EN input from the controller 1910. The ramp signals in each of the reference signals may be signals whose voltage level increases or decreases over time.

The comparator 1953 may compare the pixel signal VS with one of the plurality of reference signals RAMP1, RAMP2, RAMP3, and RAMP4.

In an embodiment, the comparator 1953 may include first comparator 1953_1 to fourth comparator 1953_4. One of the two input terminals of the first comparator 1953_1 may be connected to one of the four output terminals of the selector 1951, and the other of the two input terminals may be connected to the ramp signal generator 1960. One of the two input terminals of the first comparator 1953_2 may be connected to one of the four output terminals of the selector 1951, and the other of the two input terminals may be connected to the ramp signal generator 1960. One of the two input terminals of the third comparator 1953_3 may be connected to one of the four output terminals of the selector 1951, and the other of the two input terminals may be connected to the ramp signal generator 1960. One of the two input terminals of the fourth comparator 1953_4 may be connected to one of the four output terminals of the selector 1951, and the other of the two input terminals may be connected to the ramp signal generator 1960.

The counter 1955 may count how long the specific level of the signal output from the corresponding comparator 1953 is maintained. Specifically, the counter 1955 may receive a clock from the timing generator (120 in FIG. 1).

The counter 1955 may count how long the specific level of the signal received from the corresponding comparator 1953 is maintained using a rising edge or a falling edge of the clock signal. In an embodiment, the counter 1955 may include first counter 1955_1 to fourth counter 1955_4. In some embodiments, an output terminal of the first comparator 1953_1 may be connected to the counter 1955_1. An output terminal of the second comparator 1953_2 may be connected to the counter 1955_2. An output terminal of the third comparator 1953_3 may be connected to the counter 1955_3. An output terminal of the fourth comparator 1953_4 may be connected to the counter 1955_4.

In summary, the first comparator 1953_1 may compare the pixel signal VS with the first reference signal RAMP1 synchronously input with the timing when the pixel signal VS is input to the first comparator 1953_1, and output the comparison result to the first counter 1955_1. The second comparator 1953_2 may compare the pixel signal VS with the second reference signal RAMP2 synchronously input with the timing when the pixel signal VS is input to the second comparator 1953_2, and output the comparison result to the second counter 1955_2. The third comparator 19533 may compare the pixel signal VS with the third reference signal RAMP3 synchronously input with the timing when the pixel signal VS is input to the third comparator 19533, and output the comparison result to the third counter 1955_3. The fourth comparator 19534 may compare the pixel signal VS with the fourth reference signal RAMP4 synchronously input with the timing when the pixel signal VS is input to the fourth comparator 1953_4, and output the comparison result to the fourth counter 1955_4.

In some embodiments, the ramp signal included in the reference signal may include a ramp signal whose voltage level increases or decreases over time. In some embodiments, when the ramp signal included in the first reference signal RAMP1 is a signal having a waveform that decreases with a predetermined slope, a timing when the magnitude of the signal input to the comparator 1953_1 through the selector 1951 is the same as that of the ramp signal of the first reference signal RAMP1 may occur. In addition, when the ramp signal included in the second reference signal RAMP2 is a signal having a waveform that decreases with a predetermined slope, a timing when the magnitude of the signal input to the comparator 1953_2 through the selector 1951 is the same as that of the ramp signal of the second reference signal RAMP2 may occur. When the ramp signal included in the third reference signal RAMP3 is a signal having a waveform that decreases with a predetermined slope, a timing when the magnitude of the signal input to the comparator 1953_3 through the selector 1951 is the same as that of the ramp signal of the third reference signal RAMP3 may occur. When the ramp signal included in the fourth reference signal RAMP4 is a signal having a waveform that decreases with a predetermined slope, a timing when the magnitude of the signal input to the comparator 1953_4 through the selector 1951 is the same as that of the ramp signal of the fourth reference signal RAMP4 may occur. Levels of signals output from the comparators 1953_1, 1953_2, 1953_3, and 1953_4 may be shifted in synchronization with the timing when the pixel signal VS and the reference signal coincide.

The CDS circuit 1957 may generate the image signal IMS by performing the correlated double sampling (CDS) method on the counting signal received from the corresponding counter 1955. In some embodiments, the CDS circuit 1957 may include a first CDS circuit 1957_1 to a fourth CDS circuit 1957_4. The CDS circuit 19571 may be connected to the output terminal of the counter 1955_1 and may generate the image signal IMS by performing the CDS method on the counting signal received from the counter 1955_1. The CDS circuit 1957_2 may be connected to the output terminal of the counter 1955_2 and may generate the image signal IMS by performing the CDS method on the counting signal received from the counter 1955_2. The CDS circuit 19573 may be connected to the output terminal of the counter 1955_3 and may generate the image signal IMS by performing the CDS method on the counting signal received from the counter 1955_3. The CDS circuit 1957_4 may be connected to the output terminal of the counter 1955_4 and may generate the image signal IMS by performing the CDS method on the counting signal received from the counter 1955_4.

However, in order to reduce the number of comparator 1953, the counter 1955, and the CDS circuit 1957 required to readout the pixel signal VS, according to the embodiment, the HCG signal SIG_H, the HCG reset signal (RST_H), the LOFIC signal SIG_LOFIC, and the LOFIC reset signal RST_LOFIC may be readout as the same reference signal, and the LCG signal SIG_L and the LCG reset signal RST_L in which the slope of the reference signal does not change even when the analog gain increases may be readout as a separate reference signal.

Figure 20:
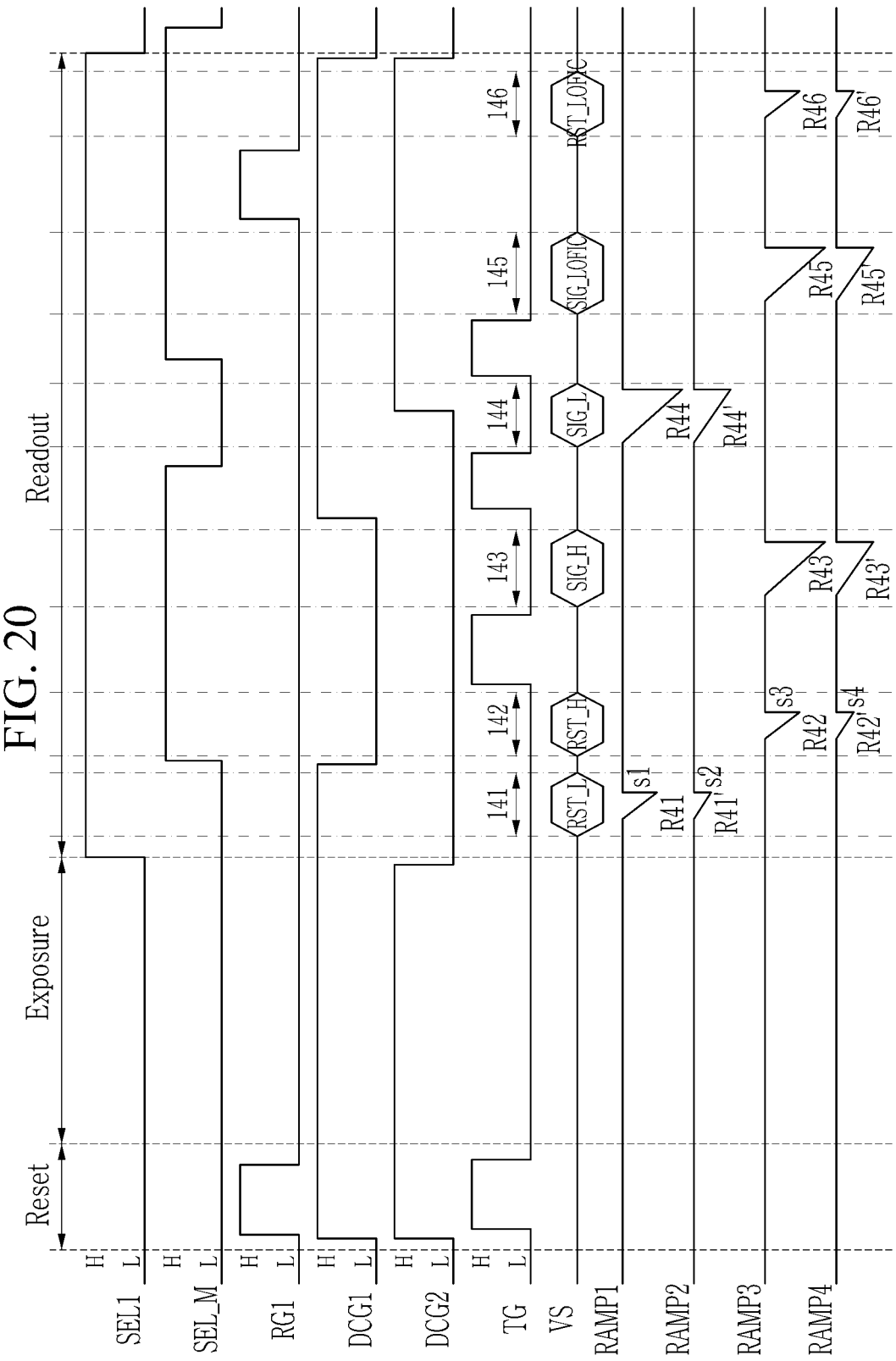
FIGS. 20 and 21 are example diagrams illustrating an operation timing of the image sensor illustrated in FIG. 19.

FIG. 20 is an example diagram illustrating the operation timing of the image sensor illustrated in FIG. 19.

FIG. 20 illustrates a scan period for driving a plurality of pixels in a row line unit. One scan period may sequentially include a reset period Reset, an exposure period Exposure, and a readout period Readout.

FIG. 20 is a diagram illustrating a case in which the image sensor 1900 operates in a readout method of RST-RST-SIG-SIG-SIG-RST (RRSS-SR).

An operation of the image sensor illustrated in FIG. 20 will be described with reference to FIG. 11A described above.

Since the waveforms of the reset signal RG1, the first gain control signal DCG1, the second gain control signal DCG2, and the transfer signal TG in the reset period Reset and the exposure period Exposure of FIG. 20 are similar to the waveforms of the reset signal RG1, the first gain control signal DCG1, the second gain control signal DCG2, and the transfer signal TG of FIG. 12, the description of FIG. 12 may also be applied to FIG. 20. In this case, the readout circuit 1950 may readout the received pixel signal VS using the correlated double sampling (CDS) method. Here, the pixel signal VS may be a signal output from the pixel circuit PX3 through the column line CL within one frame.

During a period 141, the pixel signal VS may be output to the column line CL as the LCG reset signal RST_L. During a period 142, the pixel signal VS may be output to the column line CL as the HCG reset signal RST_H. During a period 143, the pixel signal VS may be output to the column line CL as the HCG signal SIG_H. During a period 144, the pixel signal VS may be output to the column line CL as the LCG signal SIG_L. During a period 145, the pixel signal VS may be output to the column line CL as the LOFIC signal SIG_LOFIC. During a period 146, the pixel signal VS may be output to the column line CL as the LOFIC reset signal RST_LOFIC.

During the period 141, the DEMUX select signal SEL_M is at a low level, and thus, the LCG reset signal RST_L may be output to the first comparator 1953_1 and the second comparator 1953_2. During periods 142 and 143, the DEMUX select signal SEL_M is at a high level, and thus, the HCG reset signal RST_H and the HCG signal SIG_H may be output to the third comparator 1953_3 and the fourth comparator 1953_4. During the period 144, the DEMUX select signal SEL_M is at a low level, and thus, the LCG signal SIG_L may be output to the first comparator 1953_1 and the second comparator 1953_2. During periods 145 and 146, the DEMUX select signal SEL_M is at a high level, and thus, the LOFIC signal SIG_LOFIC and the LOFIC reset signal RST_LOFIC may be output to the third comparator 1953_3 and the fourth comparator 1953_4.

Meanwhile, the ramp signal generator 1960 may generate the first to fourth reference signals RAMP1, RAMP2, RAMP3, and RAMP4 in response to the ramp enable signal R_EN. The reference signals RAMP1, RAMP2, RAMP3, and RAMP4 illustrated in FIG. 20 is a signal provided to the comparator 1953 in the readout circuit 1950 during the readout period Readout.

Specifically, the first reference signal RAMP1 is a signal provided to the first comparator 19531 during the readout period Readout, the second reference signal RAMP2 is a signal provided to the second comparator 1953_2 during the readout period Readout, the third reference signal RAMP3 is a signal provided to the third comparator 19533 during the readout period Readout, and the fourth reference signal RAMP4 is a signal provided to the fourth comparator 1953_4 during the readout period Readout.

The first ramp signal R41 having the first cycle and the fourth ramp signal R44 having the second cycle greater than the first cycle may be sequentially provided to the first comparator 19531 in synchronization with the comparison target signal. Specifically, the first ramp signal R41 may be provided to the first comparator 1953_1 within the period 141, and the fourth ramp signal R44 may be provided to the first comparator 19531 within the period 144.

A first' ramp signal R41' having a third cycle and a fourth' ramp signal R44' having a fourth cycle greater than the third cycle may be sequentially provided to the second comparator 19532 in synchronization with a comparison target signal. Specifically, the first' ramp signal R41' may be provided to the second comparator 1953_2 within the period 141, and the fourth' ramp signal R44' may be provided to the second comparator 1953_2 within the period 144.

The second ramp signal R42 having the first cycle, the third ramp signal R43 and the fifth ramp signal R45 having the second cycle, and the sixth ramp signal R46 having the first cycle may be sequentially provided to the third comparator 1953_3 in synchronization with the comparison target signal. Specifically, the second ramp signal R42 may be provided to the third comparator 1953_3 within the period 142, the third ramp signal R43 may be provided to the third comparator 1953_3 within the period 143, the fifth ramp signal R45 may be provided to the third comparator 19533 within the period 145, and the sixth ramp signal R46 may be provided to the third comparator 1953_3 within the period 146.

A second' ramp signal R42' having a third cycle, a third' ramp signal R43' and a fifth' ramp signal R45' having a fourth cycle, and a sixth' ramp signal R46' having the third cycle may be sequentially provided to the fourth comparator 19534 in synchronization with the comparison target signal. Specifically, the second' ramp signal R42' may be provided to the fourth comparator 1953_4 within the period 142, the third' ramp signal R43' may be provided to the fourth comparator 1953_4 within the period 143, the fifth' ramp signal R45' may be provided to the fourth comparator 1953_4 within the period 145, and the sixth' ramp signal R46' may be provided to the fourth comparator 1953_4 within the period 146.

However, the embodiments are not limited thereto, and the ramp signal generator 1960 may generate the reference signals having different waveforms including the first ramp signal R41 to the sixth ramp signal R46, the first' ramp signal R41' to the sixth' ramp signal R46'.

As illustrated in FIG. 20, the first slope s1 of the ramp signals included in the first reference signal RAMP1 may be different from the second slope s2 of the ramp signals included in the second reference signal RAMP2. The absolute value of the slope of the ramp signal in the second reference signal RAMP2 may be adjusted to be smaller than the absolute value of the slope of the ramp signal in the first reference signal RAMP1. A ratio of the second slope s2 to the first slope s1 may be preset.

Also, the third slope s3 of the ramp signals included in the third reference signal RAMP3 may be different from the fourth slope s4 of the ramp signals included in the fourth reference signal RAMP4. The absolute value of the slope of the ramp signals included in the fourth reference signal RAMP4 may be adjusted to be smaller than that of the slope of the ramp signals included in the third reference signal RAMP3. A ratio of the fourth slope s4 to the third slope s3 may be preset. For example, as illustrated in FIG. 20, the absolute values of the first slope s1 and the third slope s3 may be twice that of the second slope s2 and the fourth slope s4, but the embodiments are not limited thereto.

The first comparator 1953_1 may compare each of the LCG reset signal RST_L and the LCG signal SIG_L with the first reference signal RAMP1 synchronously input with the timing when each signal is input to the first comparator 1953_1, and output the first comparison result. Simultaneously with the operation of the first comparator 1953_1, the second comparator 1953_2 may compare each of the LCG reset signal RST_L and the LCG signal SIG_L with the second reference signal RAMP2 synchronously input with the timing when each signal is input to the second comparator 1953_2, and output the second comparison result.

The third comparator 1953_3 may compare each of the HCG reset signal RST_H, the HCG signal SIG_H, the LCG signal SIG_L, the LOFIC signal SIG_LOFIC, and the LOFIC reset signal RST_LOFIC with the third reference signal RAMP3 synchronously input with the timing when each signal is input to the third comparator 19533, and output the third comparison result. Simultaneously with the operation of the third comparator 1953_3, the fourth comparator 1953_4 may compare each of the HCG reset signal RST_H, the HCG signal SIG_H, the LCG signal SIG_L the LOFIC signal SIG_LOFIC, and the LOFIC reset signal RST_LOFIC with the fourth reference signal RAMP4 synchronously input with the timing when each signal is input to the fourth comparator 1953_4, and output the fourth comparison result.

Figure 21:
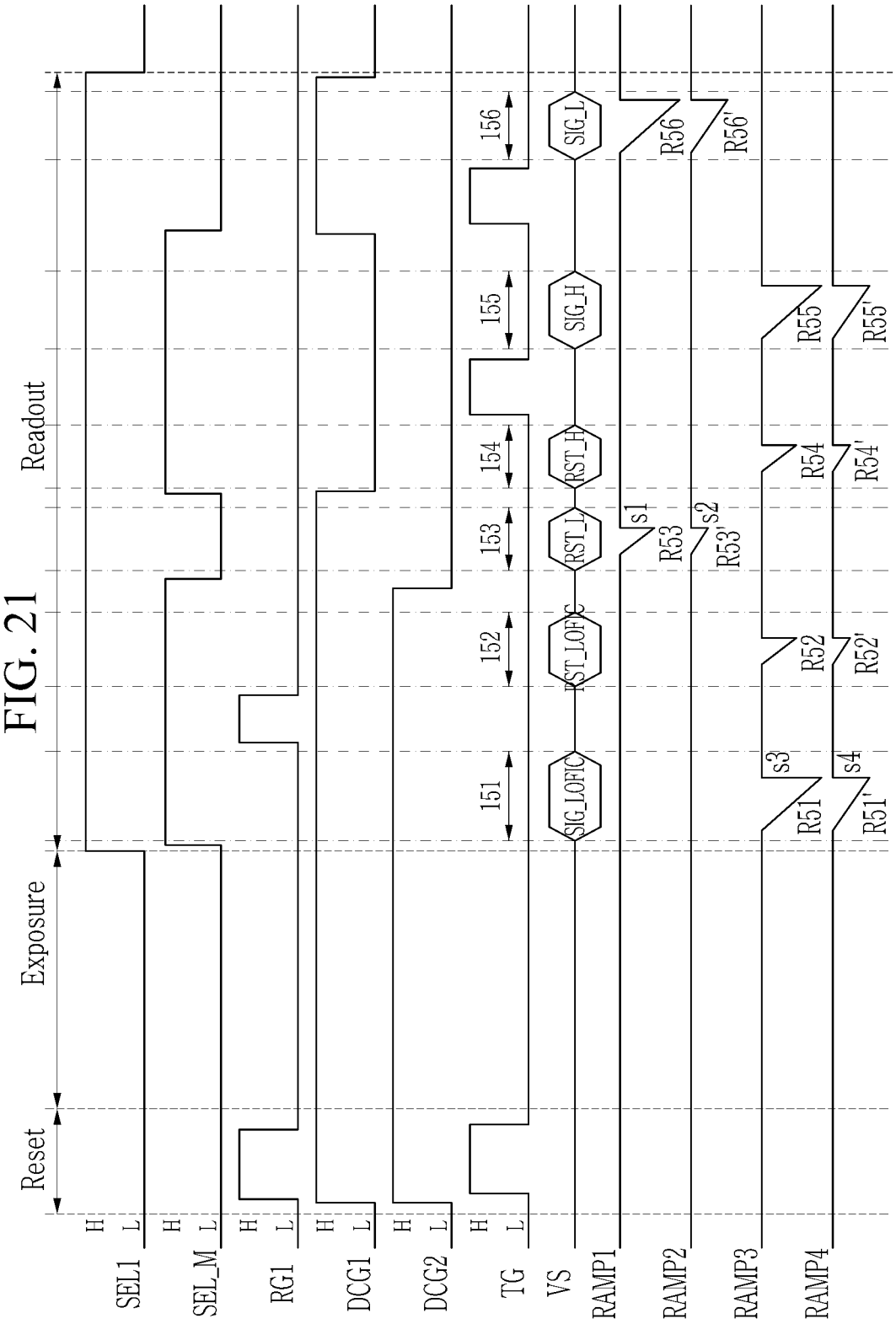

FIG. 21 is an example diagram illustrating another operation timing of the image sensor illustrated in FIG. 19.

FIG. 21 is a diagram illustrating a case in which the image sensor 1900 operates in a readout method of SIG-RST-RST-RST-SIG-SIG (SR-RRSS). In this regard, it will be described with reference to FIG. 11A.

Since the waveforms of the reset signal RG1, the first gain control signal DCG1, the second gain control signal DCG2, and the transfer signal TG in the reset period Reset and the exposure period Exposure of FIG. 21 are similar to the waveforms of the reset signal RG1, the first gain control signal DCG1, the second gain control signal DCG2, and the transfer signal TG of FIG. 13, the description of FIG. 13 may also be applied to FIG. 21. In this case, the readout circuit 1950 may readout the received pixel signal VS using the CDS method. Here, the pixel signal VS may be a signal output from the pixel circuit PX3 through the column line CL within one frame.

During a period 151, the pixel signal VS may be output to the column line CL as the LOFIC signal SIG_LOFIC. During a period 152, the pixel signal VS may be output to the column line CL as the LOFIC reset signal RST_LOFIC. During a period 153, the pixel signal VS may be output to the column line CL as the LCG reset signal RST_L. During a period 154, the pixel signal VS may be output to the column line CL as the HCG reset signal RST_H. During a period 155, the pixel signal VS may be output to the column line CL as the HCG signal SIG_H. During a period 156, the pixel signal VS may be output to the column line CL as the LCG signal SIG_L.

During periods 151 and 152, the DEMUX select signal SEL_M is at a high level, and thus, the LOFIC signal SIG_LOFIC and the LOFIC reset signal RST_LOFIC may be output to the third comparator 1953_3 and the fourth comparator 1953_4. During a period 153, the DEMUX select signal SEL_M is at a low level, and thus, the LCG reset signal RST_L may be output to the first comparator 1953_1 and the second comparator 1953_2. During periods 154 and 155, the DEMUX select signal SEL_M is at a high level, and thus, the HCG reset signal RST_H and the HCG signal SIG_H may be output to the third comparator 1953_3 and the fourth comparator 19534. Finally, during a period 156, the DEMUX select signal SEL_M is at a low level, and thus, the LCG signal SIG_L may be output to the first comparator 1953_1 and the second comparator 1953_2.

Meanwhile, the ramp signal generator 1960 may generate the first to fourth reference signals RAMP1, RAMP2, RAMP3, and RAMP4 in response to the ramp enable signal R_EN.

The first reference signal RAMP1 is a signal provided to the first comparator 1953_1 during the readout period Readout, the second reference signal RAMP2 is a signal provided to the second comparator 1953_2 during the readout period Readout, the third reference signal RAMP3 is a signal provided to the third comparator 1953_3 during the readout period Readout, and the fourth reference signal RAMP4 is a signal provided to the fourth comparator 1953_4 during the readout period Readout.

A third ramp signal R53 having a first cycle and a sixth ramp signal R56 having a second cycle greater than the first cycle may be sequentially provided to the first comparator 19531 in synchronization with the comparison target signal. Specifically, the third ramp signal R53 may be provided to the first comparator 1953_1 within the period 153, and the sixth ramp signal R56 may be provided to the first comparator 19531 within the period 156.

A third' ramp signal R53' having a third cycle and a sixth' ramp signal R56' having a fourth cycle greater than the third cycle may be sequentially provided to the second comparator 19532 in synchronization with a comparison target signal. Specifically, the third' ramp signal R53' may be provided to the second comparator 1953_2 within the period 153, and the sixth' ramp signal R46' may be provided to the second comparator 1953_2 within the period 156.

A first ramp signal R51 having a second cycle, a second ramp signal R52 and a fourth ramp signal R54 having a first cycle, and a fifth ramp signal R55 having a second cycle may be sequentially provided to the third comparator 1953_2 in synchronization with the comparison target signal. Specifically, the first ramp signal R51 may be provided to the third comparator 1953_3 within the period 151, the second ramp signal R52 may be provided to the third comparator 1953_3 within the period 152, the fourth ramp signal R54 may be provided to the third comparator 1953_3 within the period 154, and the fifth ramp signal R55 may be provided to the third comparator 19533 within the period 155.

A first' ramp signal R51' having a fourth cycle, a second' ramp signal R52' and a fourth' ramp signal R54' having a second cycle, and a fifth' ramp signal R55' having a fourth cycle may be sequentially provided to the fourth comparator 19534 in synchronization with the comparison target signal. Specifically, the first' ramp signal R51' may be provided to the fourth comparator 1953_4 within the period 151, the second' ramp signal R52' may be provided to the fourth comparator 1953_4 within the period 152, the fourth' ramp signal R54' may be provided to the fourth comparator 1953_4 within the period 154, and the fifth' ramp signal R55' may be provided to the fourth comparator 1953_4 within the period 155.

However, the embodiments are not limited thereto, and the ramp signal generator 1960 may generate the reference signals having different waveforms including the first ramp signal R51 to the sixth ramp signal R56, the first' ramp signal R51' to the sixth' ramp signal R56'.

The first slope s1 of the ramp signals included in the first reference signal RAMP1 may be different from the second slope s2 of the ramp signals included in the second reference signal RAMP2. The absolute value of the slope of the ramp signals included in the second reference signal RAMP2 may be adjusted to be smaller than the absolute value of the slope of the ramp signals included in the first reference signal RAMP1. A ratio of the second slope s2 to the first slope s1 may be preset.

Also, the third slope s3 of the ramp signals in the third reference signal RAMP3 may be different from the fourth slope s4 of the ramp signals in the fourth reference signal RAMP4. The absolute value of the slope of the ramp signals in the fourth reference signal RAMP4 may be adjusted to be smaller than that of the slope of the ramp signals in the third reference signal RAMP3. A ratio of the fourth slope s4 to the third slope s3 may be preset. For example, as illustrated in FIG. 13, the absolute values of the first slope s1 and the third slope s3 may be twice that of the second slope s2 and the fourth slope s4, but the embodiments are not limited thereto.

The first comparator 1953_1 may compare each of the LCG reset signal RST_L and the LCG signal SIG_L with the first reference signal RAMP1 synchronously input with the timing when each signal is input to the first comparator 1953_1, and output the first comparison result. Simultaneously with the operation of the first comparator 1953_1, the second comparator 1953_2 may compare each of the LCG reset signal RST_L and the LCG signal SIG_L with the second reference signal RAMP2 synchronously input with the timing when each signal is input to the second comparator 1953_2, and output the second comparison result.

The third comparator 1953_3 may compare each of the HCG reset signal RST_H, the HCG signal SIG_H, the LCG signal SIG_L, the LOFIC signal SIG_LOFIC, and the LOFIC reset signal RST_LOFIC with the third reference signal RAMP3 synchronously input with the timing when each signal is input to the third comparator 19533, and output the third comparison result. Simultaneously with the operation of the third comparator 1953_3, the fourth comparator 1953_4 may compare each of the HCG reset signal RST_H, the HCG signal SIG_H, the LCG signal SIG_L, the LOFIC signal SIG_LOFIC, and the LOFIC reset signal RST_LOFIC with the fourth reference signal RAMP4 synchronously input with the timing when each signal is input to the fourth comparator 1953_4, and output the fourth comparison result.

Figure 22:
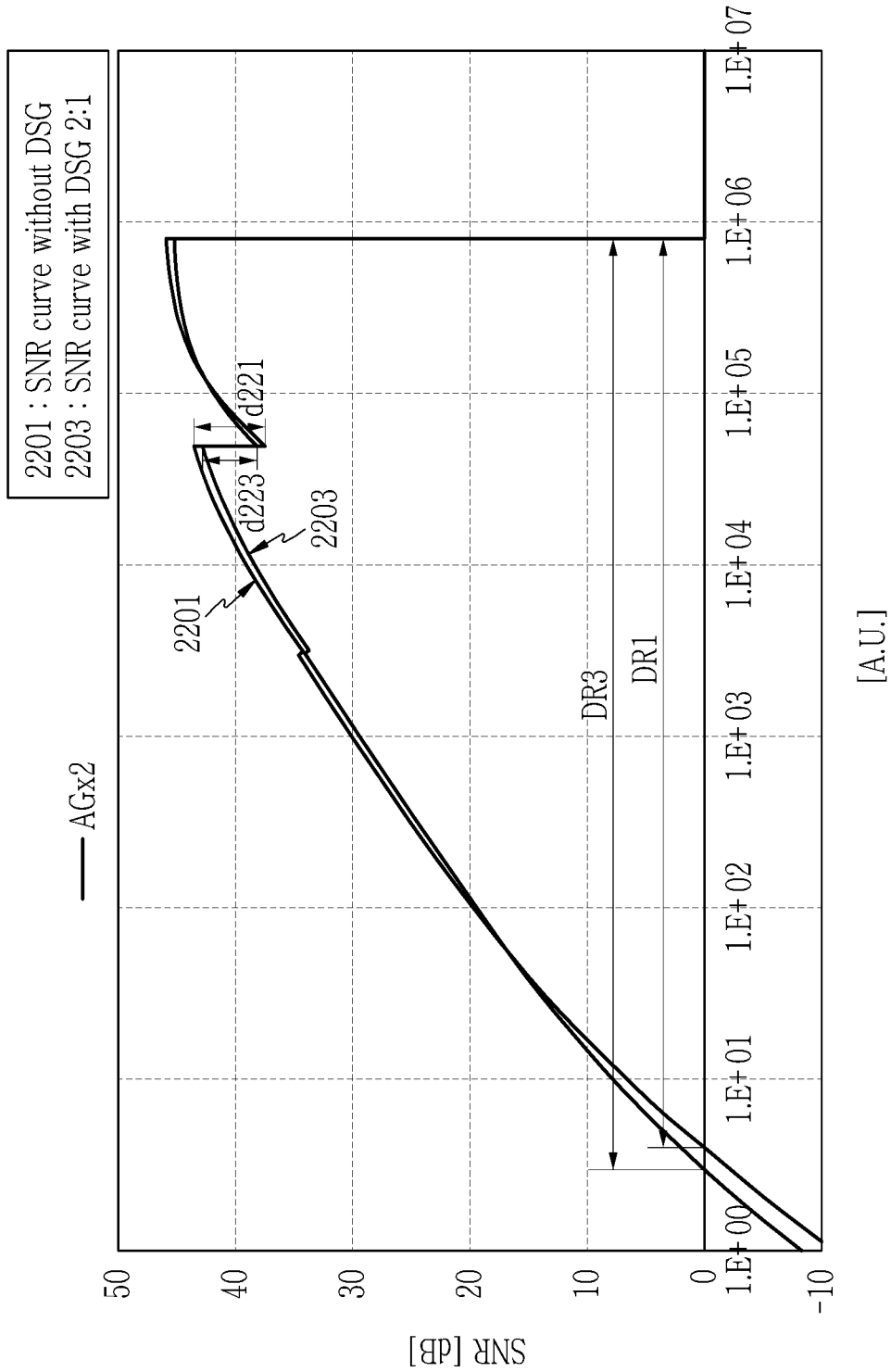
FIGS. 22 and 23 are example graphs illustrating a signal-to-noise ratio according to an embodiment.
Figure 23:
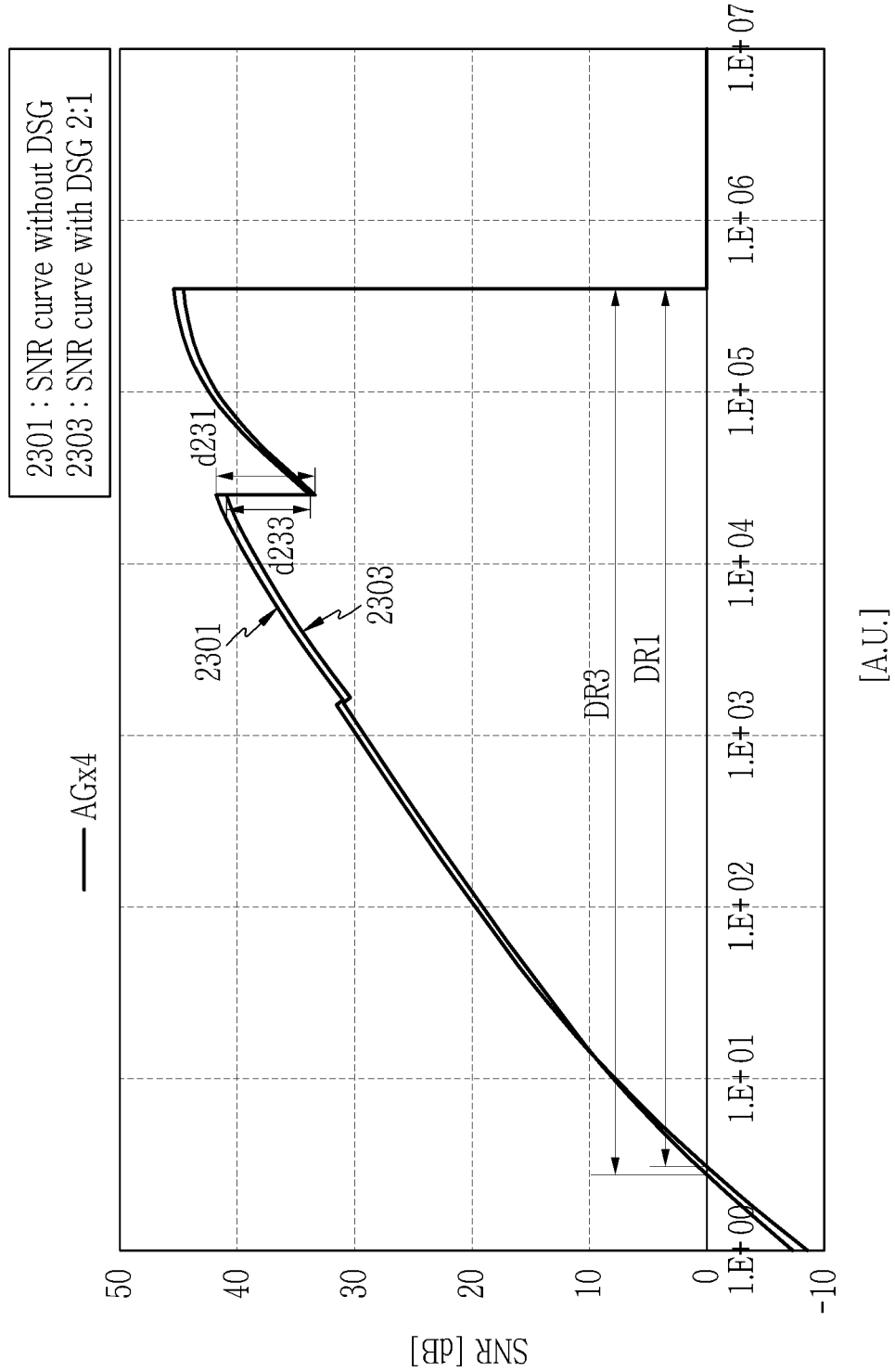

FIGS. 22 and 23 are example graphs illustrating a signal-to-noise ratio according to an embodiment. Specifically, FIGS. 22 and 23 illustrate, in units of dB, the signal-to-noise ratio of the signal obtained by synthesizing the HCG image signal, the LCG image signal, and the LOFIC image signal according to the readout circuit 1950 illustrated in FIG. 19. In this case, it is assumed that the ratio of the absolute value of the slope s1 of the ramp signals in the first reference signal RAMP1 of FIG. 7 and the absolute value of the slope s2 of the ramp signals in the second reference signal RAMP2 is set to 2:1.

FIG. 22 illustrates a first graph 2201 and a second graph 2203 of the SNR of the signal obtained by synthesizing the HCG image signal, the LCG image signal, and the LOFIC image signal, when analog gains of both the first graph 2201 and the second graph 2203 are twice the predetermined analog gain. The first graph 2201 is an SNR graph when the pixel signal VS is readout without applying the DSG method, and the second graph 2203 is an SNR graph when the pixel signal VS is readout while applying the DSG method. That is, the second graph 2203 is a graph illustrating the SNR of the synthesized signal when the pixel signal VS is readout by applying the DSG method with a double analog gain (i.e., 4 times the predetermined analog gain).

As illustrated in FIG. 22, an SNR dip d221 between the LCG image signal and the LOFIC image signal in the first graph 2201 is greater than that of the SNR dip d223 between the LCG image signal and the LOFIC image signal in the second graph 2203. Also, a dynamic range DR3 in the first graph 2203 is wider than a dynamic range DR1 in the first graph 2201.

FIG. 23 illustrates a third graph 2301 and a fourth graph 2303 of the SNR of the signal obtained by synthesizing the HCG image signal, the LCG image signal, and the LOFIC image signal when the analog gains of both the third graph 2301 and the fourth graph 2303 are four times the predetermined analog gain. The third graph 2301 is an SNR graph when the pixel signal VS is readout without applying the DSG method, and the fourth graph 2303 is an SNR graph when the pixel signal VS is readout while applying the DSG method. That is, the fourth graph 2303 is a graph illustrating the SNR of the synthesized signal when the pixel signal VS is readout by applying the DSG method with a double analog gain (i.e., 8 times the predetermined analog gain).

As illustrated in FIG. 23, an SNR dip d231 between the LCG image signal and the LOFIC image signal in the third graph 2301 is greater than that of the SNR dip d223 between the LCG image signal and the LOFIC image signal in the fourth graph 2303.

However, as the analog gain increases, QN decreases, and thus, the SNR graph in the case of a small quantity of light may tend to increase. Based on this, applying DSG when the analog gain is low has a great effect on reducing the SNR dip, but as the analog gain increases, the ratio of QN to the entire noise decreases, and thus, the SNR dip improvement effect that may be obtained by applying the DSG method may also be reduced.

Figure 24:
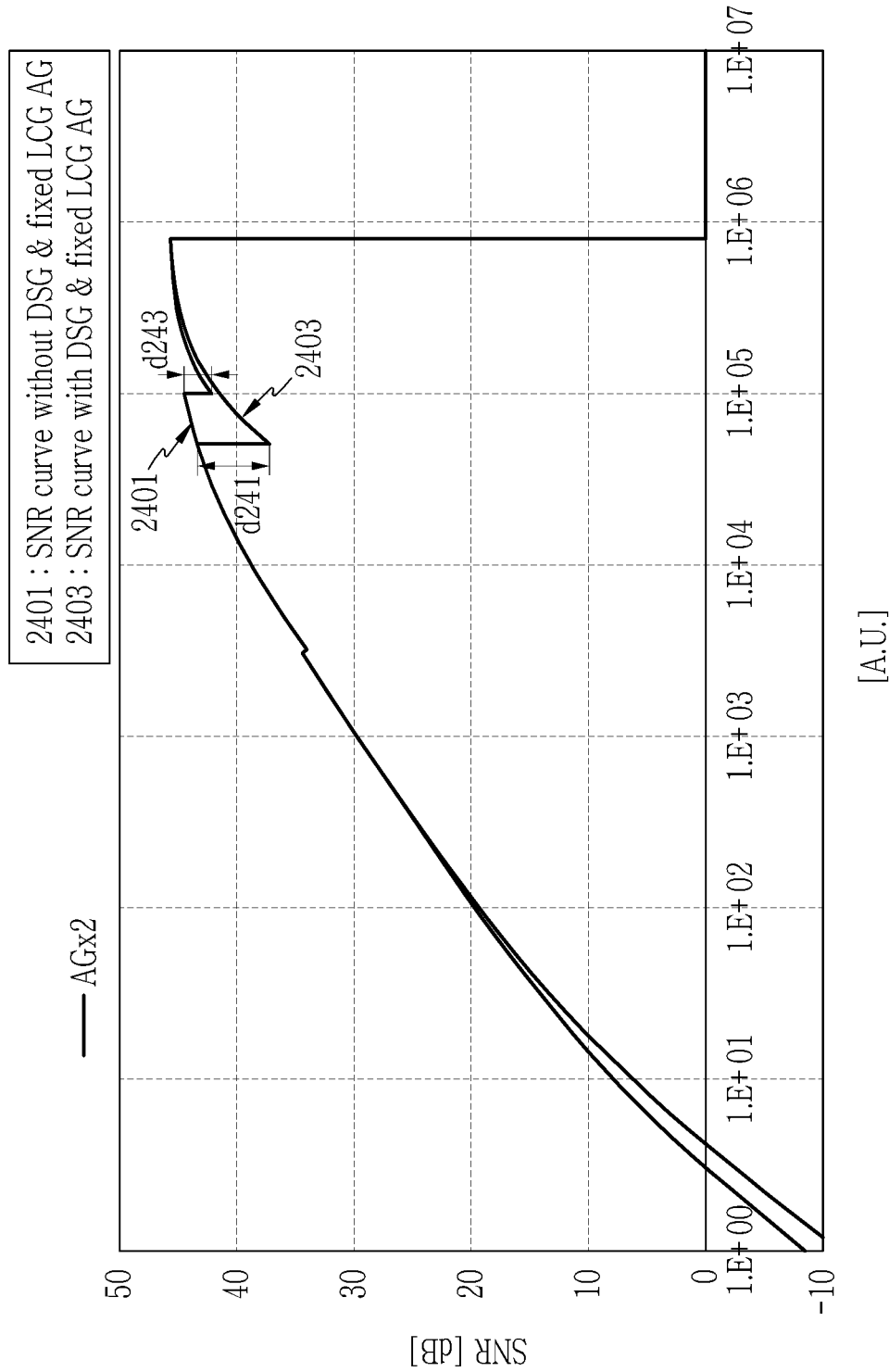
FIGS. 24 and 25 are example graphs illustrating a signal-to-noise ratio according to an embodiment.
Figure 25:
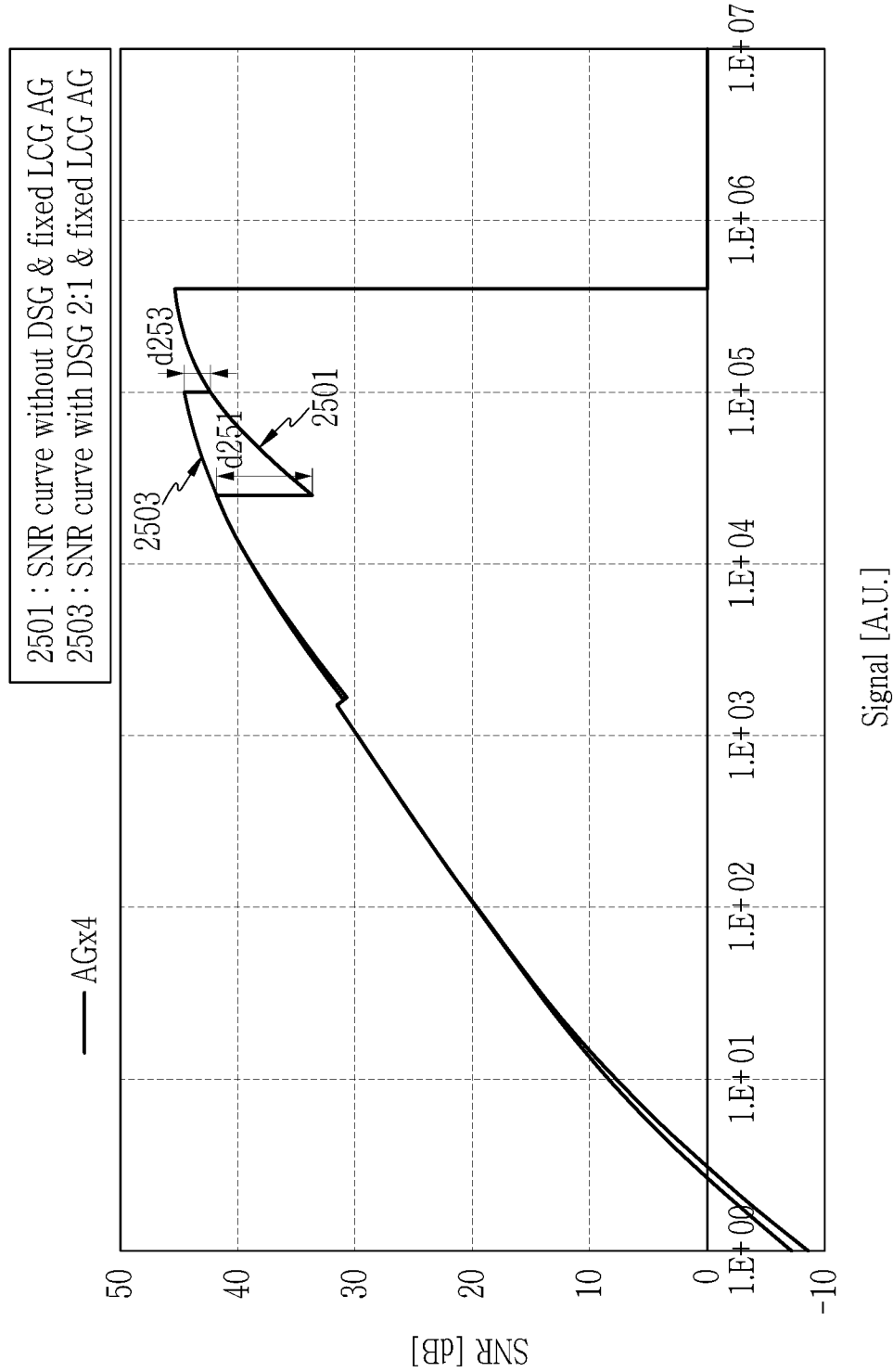

FIGS. 24 and 25 are example graphs illustrating a signal-to-noise ratio according to an embodiment. Specifically, FIGS. 24 and 25 illustrate, in units of dB, the signal-to-noise ratio of the signal obtained by synthesizing the HCG image signal, the LCG image signal, and the LOFIC image signal according to the readout circuit 1950 illustrated in FIG. 19. In this case, it is assumed that the ratio of the absolute value of the slope s1 of the ramp signals in the first reference signal RAMP1 of FIG. 7 and the absolute value of the slope s2 of the ramp signals in the second reference signal RAMP2 is set to 2:1.

FIG. 24 illustrates a first graph 2401 and a second graph 2403, and the first graph 2401 is a graph illustrating the SNR of the signal obtained by synthesizing the HCG image signal, the LCG image signal, and the LOFIC image signal when the analog gains of the HCG image signal, the LCG image signal, and the LOFIC image signal is twice the predetermined analog gain. The second graph 2403 readouts the pixel signal VS by applying the DSG method with the twice analog gain (i.e., four times the predetermined analog gain) of the HCG image signal and the LOFIC image signal, and is a graph illustrating the SNR of the synthesized signal when the pixel signal VS is readout without applying the DSG method on the LCG image signal.

As illustrated in FIG. 24, an SNR dip d241 between the LCG image signal and the LOFIC image signal in the first graph 2401 is greater than that of the SNR dip d243 between the LCG image signal and the LOFIC image signal in the second graph 2403.

FIG. 25 illustrates a first graph 2501 and a second graph 2503, and the first graph 2401 is a graph illustrating the SNR of the signal obtained by synthesizing the HCG image signal, the LCG image signal, and the LOFIC image signal when the analog gains of the HCG image signal, the LCG image signal, and the LOFIC image signal is four times the predetermined analog gain. The second graph 2503 readouts the pixel signal VS by applying the DSG method with the twice analog gain (i.e., eighth times the predetermined analog gain) of the HCG image signal and the LOFIC image signal, and is a graph illustrating the SNR of the synthesized signal when the pixel signal VS is readout without applying the DSG method on the LCG image signal.

Similarly, as illustrated in FIG. 25, an SNR dip d251 between the LCG image signal and the LOFIC image signal in the first graph 2501 is smaller than that of the SNR dip d253 between the LCG image signal and the LOFIC image signal in the second graph 2503.

Figure 26:
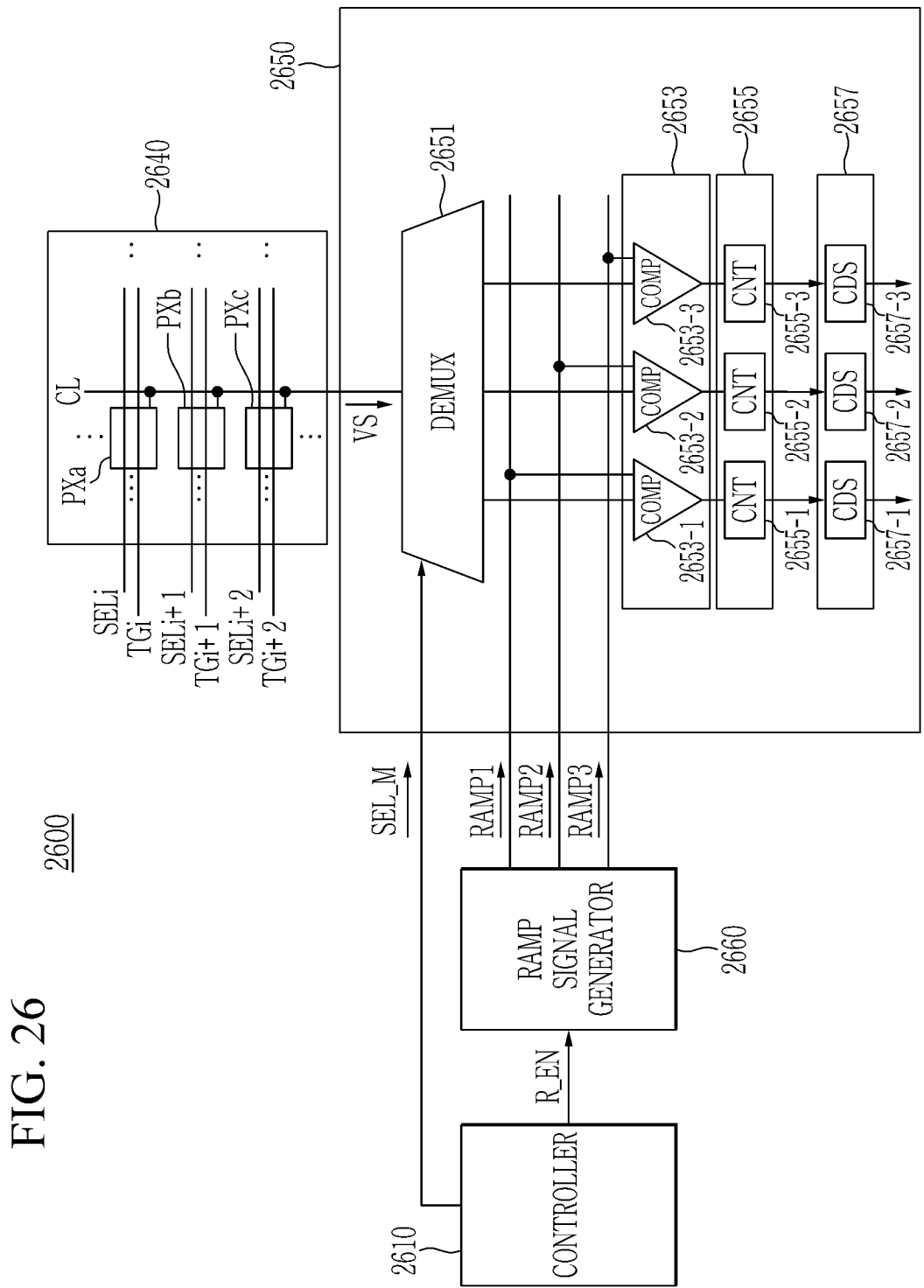
FIG. 26 is an example block diagram illustrating a pixel array and a readout circuit according to another embodiment.

FIG. 26 is an example block diagram illustrating a pixel array and a readout circuit according to another embodiment.

Referring to FIG. 26, an image sensor 2600 according to another embodiment may include a pixel array 2640 and a readout circuit 2650.

The pixel array 2640 may include a plurality of pixels PXs. Each pixel PX may be selected by the transfer signal TG and the select signal SEL1 to output the pixel signal VS.

Referring to FIG. 26, the pixel array 2640 may include a plurality of pixels PXa, PXb, and PXc. Each of the plurality of pixels PXa, PXb, and PXc may receive a corresponding transfer signal among transfer signals TGi, TGi+1, and TGi+2 and a corresponding select signal among select signals SELi, SELi+1, and SELi+2. Each of the plurality of pixels PXa, PXb, and PXc may receive the corresponding select signal among the select signals SELi, SELi+1, and SELi+2 to output the pixel signal VS. Here, it is assumed that each of the plurality of pixels PXa, PXb, and PXc includes one sub-pixel.

The readout circuit 2650 may include a selector 2640, a comparator 2651, a counter 2653, and a CDS circuit 2655 connected to each column line CL of the pixel array 2657.

The selector 2651 may be implemented as, for example, a multiplexer, but is not limited thereto. The selector 2651 may correspond to one corresponding column line CL, and may receive the pixel signal VS from the connected column line CL. The selector 2651 may receive the DEMUX select signal SEL_M from the controller 2610 and output the pixel signal VS to the comparator 2653 based on the DEMUX select signal SEL_M. According to an embodiment, the selector 2651 may include three output terminals. The selector 2651 may output the pixel signal VS to any one of the three output terminals based on the DEMUX select signal SEL_M.

The ramp signal generator 2660 may generate the plurality of reference signals RAMP1, RAMP2, and RAMP3 in response to the ramp enable signal R_EN input from the controller 2610. The ramp signals in each of the reference signals may be signals whose voltage level increases or decreases over time.

The comparator 2653 may compare the pixel signal VS and one of the plurality of reference signals RAMP1, RAMP2, and RAMP3.

In an embodiment, the comparator 2653 may include first comparator 2653_1 to third comparator 2653_3. One of the two input terminals of the first comparator 2653_1 may be connected to one of the three output terminals of the selector 2651, and the other of the two input terminals may be connected to the ramp signal generator 2660. One of the two input terminals of the second comparator 2653_2 may be connected to one of the three output terminals of the selector 2651, and the other of the two input terminals may be connected to the ramp signal generator 2660. One of the two input terminals of the third comparator 2653_3 may be connected to one of the three output terminals of the selector

2651, and the other of the two input terminals may be connected to the ramp signal generator 2660.

The counter 2655 may count how long the specific level of the signal output from the corresponding comparator 2653 is maintained. Specifically, the counter 2655 may receive a clock from the timing generator (120 in FIG. 1). The counter 2655 may count how long the specific level of the signal received from the corresponding comparator 2653 is maintained using a rising edge or a falling edge of the clock signal. In an embodiment, the counter 2655 may include first counter 2655_1 to third counter 2655_3. The counter 2655_1 may be connected to the output terminal of the comparator 2653_1. The counter 2655_2 may be connected to the output terminal of the comparator 2653_2. The counter 26553 may be connected to the output terminal of the comparator 2653_3. The counter 2655 may include an up/down counter or a bit-wise counter.

In summary, the first comparator 2653_1 may compare the pixel signal VS with the first reference signal RAMP1 synchronously input with the timing when the pixel signal VS is input to the first comparator 26531, and output the result to the counter 2655_1. The second comparator 26532 may compare the pixel signal VS with the second reference signal RAMP2 synchronously input with the timing when the pixel signal VS is input to the second comparator 2653_2, and output the result to the counter 2655_2. The third comparator 2653_3 may compare the pixel signal VS with the third reference signal RAMP3 synchronously input with the timing when the pixel signal VS is input to the third comparator 26533, and output the result to the counter 2655_3.

The ramp signal generator 2660 may generate the reference signals RAMP1, RAMP2, and RAMP3 in response to the ramp enable signal R_EN input from the controller 2610. The ramp signals in each of the reference signals RAMP1, RAMP2, and RAMP3 may be signals whose voltage level increases or decreases over time. In some embodiments, when the ramp signal included in the reference signal RAMP1 has a waveform that decreases with a predetermined slope, a timing when the magnitude of the signal input to the comparator 2653_1 through the selector 2651 is the same as that of the ramp signal of the reference signal RAMP1 may occur. In addition, in some embodiments, when the ramp signal included in the reference signal RAMP2 has a waveform that decreases with a predetermined slope, a timing when the magnitude of the signal input to the comparator 2653_2 through the selector 2651 is the same as that of the ramp signal of the reference signal RAMP2 may occur. In some embodiments, when the ramp signal included in the reference signal RAMP3 has a waveform that decreases with a predetermined slope, a timing when the magnitude of the signal input to the comparator 2653_3 through the selector 2651 is the same as that of the ramp signal of the reference signal RAMP3 may occur. The magnitude of the signal input to the comparator 2653_1 and the magnitude of the ramp signal of the reference signal RAMP1 are synchronized at the same timing, the magnitude of the signal input to the comparator 2653_2 and the magnitude of the ramp signal of the reference signal RAMP2 are synchronized at the same timing, and the magnitude of the signal input to the comparator 2653_3 and the magnitude of the ramp signal of the reference signal RAMP3 are synchronized at the same timing, so the levels of the signals output from the comparators 2653_1, 2653_2, and 2653_3 may be shifted.

The CDS circuit 2657 may generate the image signal IMS by performing the correlated double sampling (CDS) method on the counting signal received from the corresponding counter 2655. In some embodiments, the CDS circuit 2657 may include a first CDS circuit 2657_1 to a third CDS circuit 2657_3. The CDS circuit 2657_1 may be connected to the output terminal of the counter 2655_1 and may perform the CDS method on the output of the pixel signal VS received from the counter 2655_1 to generate the image signal IMS. The CDS circuit 2657_2 may be connected to the output terminal of the counter 2655_2 and may perform the CDS method on the output of the pixel signal VS received from the counter 2655_2 to generate the image signal IMS. The CDS circuit 2657_3 may be connected to the output terminal of the counter 2655_3 and may perform the CDS method on the output of the pixel signal VS received from the counter 26553 to generate the image signal IMS.

However, in order to reduce the number of comparator 2653, the counter 2655, and the CDS circuit 2657 required to readout the pixel signal VS, the HCG signal SIG_H, the HCG reset signal (RST_H), the LOFIC signal SIG_LOFIC, and the LOFIC reset signal RST_LOFIC may be readout as one reference signal, and the LCG signal SIG_L and the LCG reset signal RST_L in which the slope of the reference signal does not change even when the analog gain increases may be readout as a separate reference signal.

Figure 27:
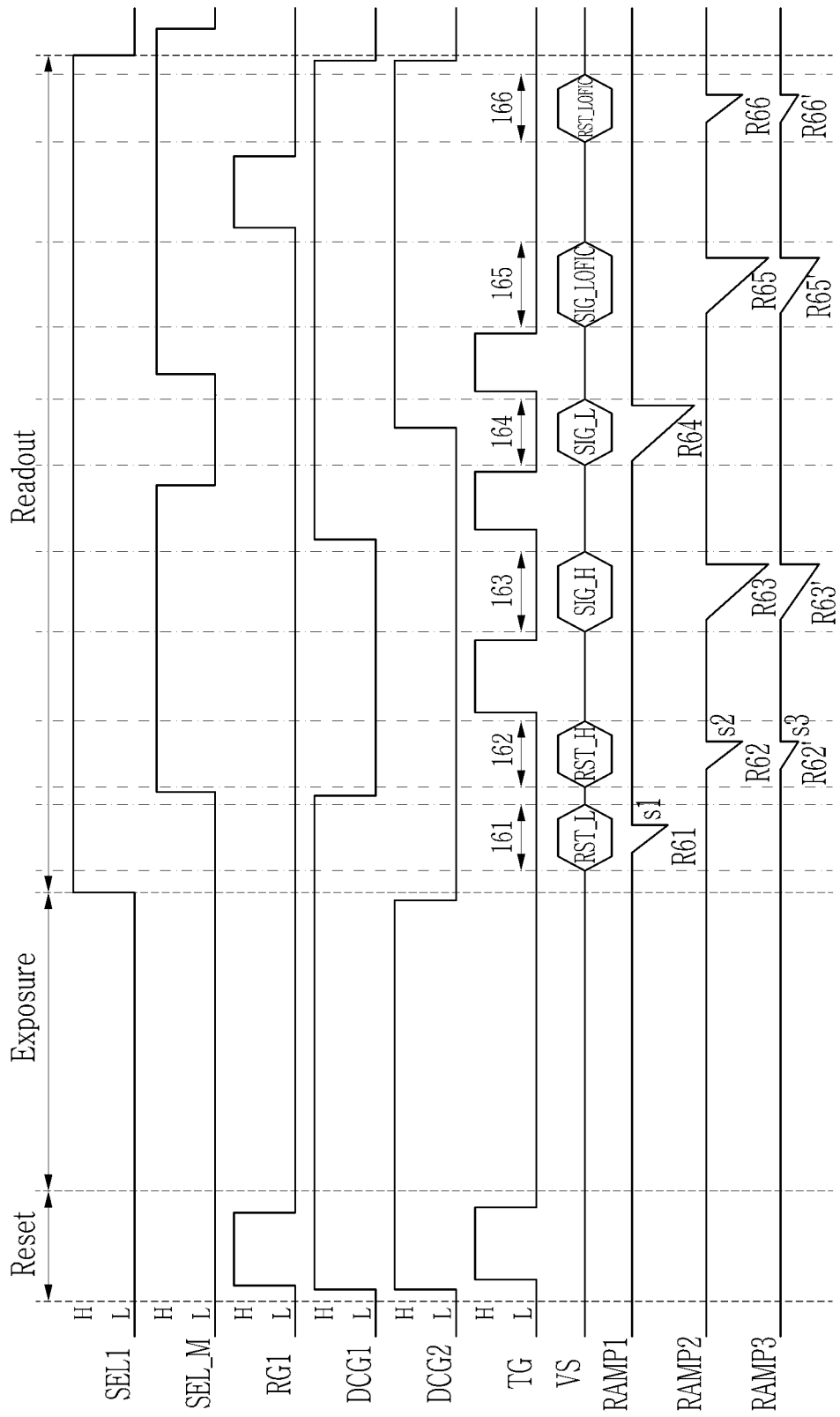
FIGS. 27 and 28 are example diagrams illustrating an operation timing of the image sensor illustrated in FIG. 26.

FIG. 27 is an example diagram illustrating the operation timing of the image sensor illustrated in FIG. 26.

FIG. 27 is a diagram illustrating a case in which the image sensor 2600 operates in a readout method of RST-RST-SIG-SIG-SIG-RST (RRSS-SR).

Since the waveforms of the reset signal RG1, the first gain control signal DCG1, the second gain control signal DCG2, the transfer signal TG, and the DEMUX select signal SEL_M in the reset period Reset and the exposure period Exposure of FIG. 27 are similar to the waveforms of the reset signal RG1, the first gain control signal DCG1, the second gain control signal DCG2, the transfer signal TG, and the DEMUX select signal SEL_M of FIG. 20, the description of FIG. 20 may also be applied to FIG. 27. In this case, the readout circuit 2650 may readout the received pixel signal VS using the correlated double sampling (CDS) method. Here, the pixel signal VS may be a signal output from the pixel circuit PX3 through the column line CL within one frame.

During a period 161, the pixel signal VS may be output to the column line CL as the LCG reset signal RST_L. During a period 162, the pixel signal VS may be output to the column line CL as the HCG reset signal RST_H. During a period 163, the pixel signal VS may be output to the column line CL as the HCG signal SIG_H. During a period 164, the pixel signal VS may be output to the column line CL as the LCG signal SIG_L. During a period 165, the pixel signal VS may be output to the column line CL as the LOFIC signal SIG_LOFIC. During a period 166, the pixel signal VS may be output to the column line CL as the LOFIC reset signal RST_LOFIC.

During the period 161, the DEMUX select signal SEL_M is at a low level, so the LCG reset signal RST_L may be output to the first comparator 1953_1. During the periods 162 and 163, the DEMUX select signal SEL_M is at a high level, and thus, the HCG reset signal RST_H and the HCG signal SIG_H may be output to the second comparator 1953_2 and the third comparator 1953_3. During the period 164, the DEMUX select signal SEL_M is at a low level, so the LCG signal SIG_L may be output to the first comparator 1953_1. During the periods 165 and 166, the DEMUX select signal SEL_M is at a high level, and thus, the LOFIC signal SIG_LOFIC and the LOFIC reset signal RST_LOFIC may be output to the second comparator 1953_2 and the third comparator 1953_3.

Meanwhile, the ramp signal generator 2660 may generate the three reference signals RAMP1, RAMP2, and RAMP3 in response to the ramp enable signal R_EN during the readout period Readout. The reference signals RAMP1, RAMP2, and RAMP3 illustrated in FIG. 27 is a signal provided to the comparator 2653 during the readout period Readout.

Specifically, the first reference signal RAMP1 is a signal provided to the first comparator 26531 during the readout period Readout, the second reference signal RAMP2 is a signal provided to the second comparator 2653_2 during the readout period Readout, and the third reference signal RAMP3 is a signal provided to the third comparator during the readout period.

The first ramp signal R61 having the first cycle and the fourth ramp signal R64 having the second cycle greater than the first cycle may be sequentially provided to the first comparator 26531 in synchronization with the comparison target signal. Specifically, the first ramp signal R61 may be provided to the first comparator 1953_1 within the period 161, and the fourth ramp signal R64 may be provided to the first comparator 1953_1 within the period 164.

A second ramp signal R62 having the first cycle, a third ramp signal R63 and a fifth ramp signal R65 having the second cycle, and a sixth ramp signal R66 having the first cycle may be sequentially provided to the second comparator 26532 in synchronization with a comparison target signal. Specifically, the second ramp signal R62 may be provided to the second comparator 19532 within the period 162, the third ramp signal R63 may be provided to the second comparator 1953_2 within the period 163, the fifth ramp signal R65 may be provided to the second comparator 1953_2 within the period 165, and the sixth ramp signal R66 may be provided to the second comparator 19532 within the period 166.

A second' ramp signal R62' having a third cycle, a third' ramp signal R63' and a fifth' ramp signal R65' having a fourth cycle greater than a third cycle, and a sixth' ramp signal R66' having a third cycle may be sequentially provided to the third comparator 2653_3 in synchronization with the comparison target signal. Specifically, the second' ramp signal R62' may be provided to the third comparator 19533 within the period 162, the third' ramp signal R63' may be provided to the third comparator 1953_3 within the period 163, the fifth' ramp signal R65' may be provided to the third comparator 1953_3 within the period 165, and the sixth' ramp signal R66' may be provided to the third comparator 1953_3 within the period 166.

However, the embodiments are not limited thereto, and the ramp signal generator 2660 may generate the reference signal RAMP having different waveforms including the first ramp signal R61 to the sixth ramp signal R66, the first' ramp signal R61' to the sixth' ramp signal R66'.

As illustrated in FIG. 27, the second slope s2 of the ramp signals included in the second reference signal RAMP2 may be different from the third slope s3 of the ramp signals included in the third reference signal RAMP3. The absolute value of the slope of the ramp signals included in the second reference signal RAMP3 may be adjusted to be smaller than the absolute value of the slope of the ramp signals included in the first reference signal RAMP1 and the second reference signal RAMP2. A ratio of the third slope s3 to the second slope s2 may be preset. For example, as illustrated in FIG. 27, the absolute value of the first slope s1 and the second slope s2 may be twice that of the second slope s2, but the embodiments are not limited thereto.

The first comparator 2653_1 may compare each of the LCG reset signal RST_L and the LCG signal SIG_L with the first reference signal RAMP1 synchronously input with the timing when each signal is input to the first comparator 2653_1, and output the first comparison result. The second comparator 2653_2 may compare each of the HCG reset signal RST_H, the HCG signal SIG_H, the LOFIC signal SIG_LOFIC, and the LOFIC reset signal RST_LOFIC with the second reference signal RAMP2 synchronously input with the timing when each signal is input to the second comparator 2653_2, and output the second comparison result. In addition, the third comparator 26533 may compare each of the HCG reset signal RST_H, the HCG signal SIG_H, the LOFIC signal SIG_LOFIC, and the LOFIC reset signal RST_LOFIC with the third reference signal RAMP3 synchronously input with the timing when each signal is input to the third comparator 26533, and output the third comparison result.

Figure 28:
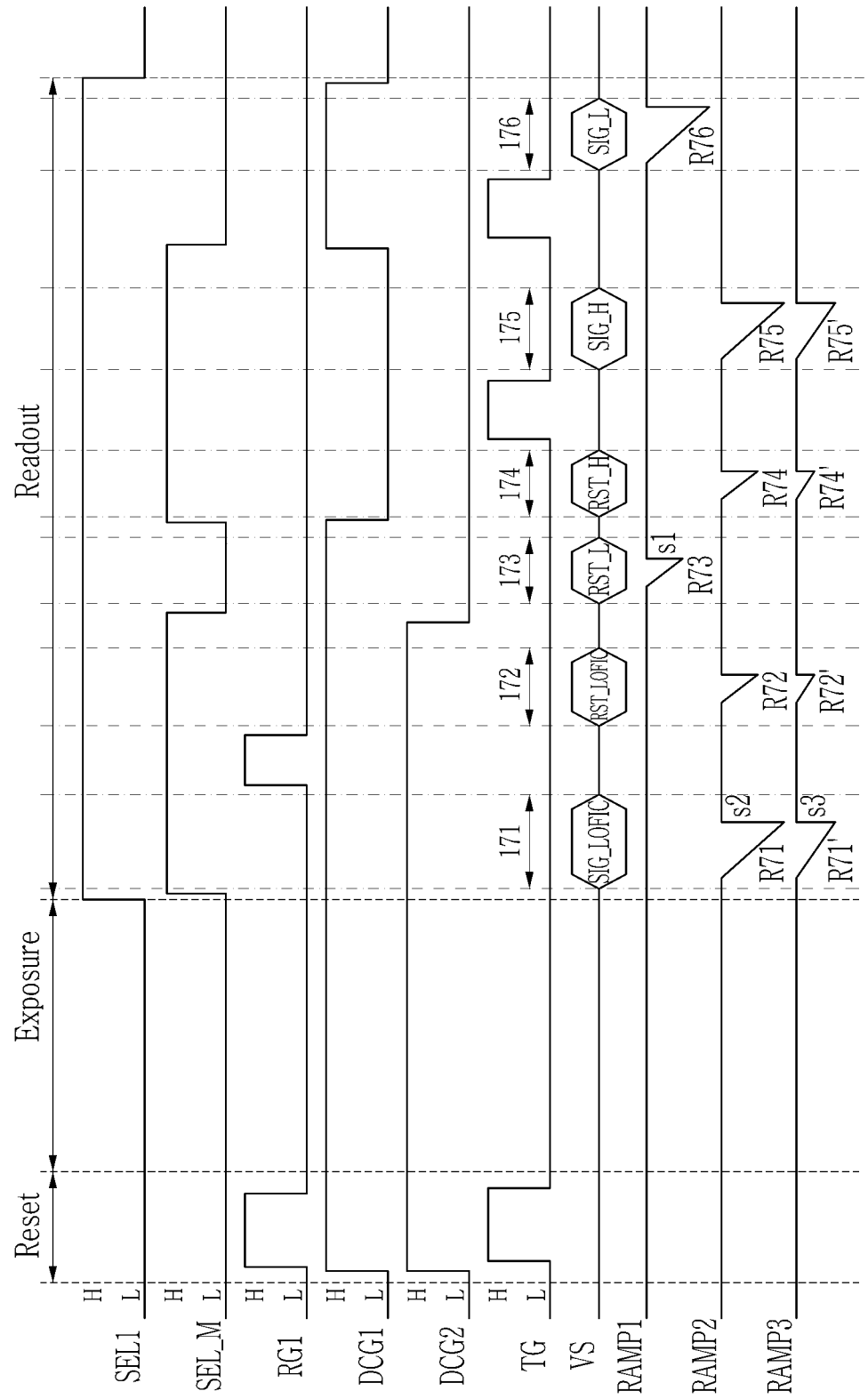

FIG. 28 is an example diagram illustrating another operation timing of the image sensor illustrated in FIG. 26.

FIG. 28 is a diagram illustrating a case in which the image sensor 2600 operates in a readout method of SIG-RST-RST-RST-SIG-SIG (SR-RRSS). Since the waveforms of the reset signal RG1, the first gain control signal DCG1, the second gain control signal DCG2, the transfer signal TG, and the DEMUX select signal SEL_M in the reset period Reset and the exposure period Exposure of FIG. 28 are similar to the waveforms of the reset signal RG1, the first gain control signal DCG1, the second gain control signal DCG2, the transfer signal TG, and the DEMUX select signal SEL_M of FIG. 21, the description of FIG. 21 may also be applied to FIG. 28.

During a period 171, the pixel signal VS may be output to the column line CL as the LOFIC signal SIG_LOFIC. During a period 172, the pixel signal VS may be output to the column line CL as the LOFIC reset signal RST_LOFIC. During a period 173, the pixel signal VS may be output to the column line CL as the LCG reset signal RST_L. During a period 174, the pixel signal VS may be output to the column line CL as the HCG reset signal RST_H. During a period 175, the pixel signal VS may be output to the column line CL as the HCG signal SIG_H. During a period 176, the pixel signal VS may be output to the column line CL as the LCG signal SIG_L.

During the periods 171 and 172, the DEMUX select signal SEL_M is at a high level, and thus, the LOFIC signal SIG_LOFIC and the LOFIC reset signal RST_LOFIC may be output to the second comparator 1953_2 and the third comparator 19533. During the period 173, the DEMUX select signal SEL_M is at a low level, so the LCG reset signal RST_L may be output to the first comparator 19531. During the periods 174 and 175, the DEMUX select signal SEL_M is at a high level, and thus, the HCG reset signal RST_H and the HCG signal SIG_H may be output to the second comparator 1953_2 and the third comparator 1953_3. Finally, during the period 176, the DEMUX select signal SEL_M is at a low level, so the LCG signal SIG_L may be output to the first comparator 1953_1.

Meanwhile, the ramp signal generator 2660 may generate the first to third reference signals RAMP1, RAMP2, and RAMP3 in response to the ramp enable signal R_EN during the readout period Readout. The reference signals RAMP1, RAMP2, and RAMP3 illustrated in FIG. 28 is a signal provided to the comparator 2653 in the readout circuit 2650 during the readout period Readout.

The first reference signal RAMP1 is a signal provided to the first comparator 2653_1 during the readout period Readout, the second reference signal RAMP2 is a signal provided to the second comparator 2653_2 during the readout period Readout, and the third reference signal RAMP3 is a signal provided to the third comparator 26533 during the readout period.

A third ramp signal R73 having a first cycle and a sixth ramp signal R76 having a second cycle greater than the first cycle may be sequentially provided to the first comparator 26531 in synchronization with the comparison target signal. Specifically, the third ramp signal R73 may be provided to the first comparator 1953_1 within the period 173, and the sixth ramp signal R76 may be provided to the first comparator 1953_1 within the period 176.

A first ramp signal R71 having a second cycle, a second ramp signal R72 and a fourth ramp signal R74 having a first cycle, and a fifth ramp signal R75 may be sequentially provided to the second comparator 2653_2 in synchronization with the comparison target signal. Specifically, the first ramp signal R71 may be provided to the second comparator 1953_2 within the period 171, the second ramp signal R72 may be provided to the second comparator 19532 within the period 172, the fourth ramp signal R74 may be provided to the second comparator 1953_2 within the period 174, and the fifth ramp signal R75 may be provided to the second comparator 19532 within the period 175.

In addition, a first' ramp signal R71' having a third cycle, a second' ramp signal R72' and a fourth' ramp signal R74' having a fourth cycle greater than a third cycle, and a fifth' ramp signal R75' having a third cycle may be sequentially provided to the third comparator 2653_3 in synchronization with the comparison target signal. Specifically, the first' ramp signal R71' may be provided to the third comparator 1953_3 within the period 171, the second' ramp signal R72' may be provided to the third comparator 19533 within the period 172, the fourth' ramp signal R74' may be provided to the third comparator 1953_3 within the period 174, and the fifth' ramp signal R75' may be provided to the third comparator 1953_3 within the period 175.

However, the embodiments are not limited thereto, and the ramp signal generator 2660 may generate the reference signal RAMP having different waveforms including the first ramp signal R71 to the sixth ramp signal R76, the first' ramp signal R71' to the sixth' ramp signal R76'.

The first slope s1 of the ramp signals included in the first reference signal RAMP1 may be the same as the second slope s2 of the ramp signals included in the second reference signal RAMP2. However, the second slope s2 of the ramp signals included in the second reference signal RAMP2 may be different from the third slope s3 of the ramp signals included in the third reference signal RAMP3. The absolute value of the slope of the ramp signals included in the third reference signal RAMP3 may be adjusted to be smaller than the absolute value of the slope of the ramp signals included in the first reference signal RAMP1 and the second reference signal RAMP2. A ratio of the third slope s3 to the second slope s2 may be preset. For example, as illustrated in FIG. 28, the absolute value of the first slope s1 and the second slope s2 may be twice that of the second slope s2, but the embodiments are not limited thereto.

The first comparator 2653_1 may compare each of the LCG reset signal RST_L and the LCG signal SIG_L with the first reference signal RAMP1 synchronously input with the timing when each signal is input to the first comparator 2653_1, and output the first comparison result. The second comparator 2653_2 may compare each of the LOFIC signal SIG_LOFIC, the LOFIC reset signal RST_LOFIC, the HCG reset signal RST_H, and the HCG signal SIG_H with the second reference signal RAMP2 synchronously input with the timing when each signal is input to the second comparator 2653_2, and output the second comparison result. Simultaneously with the second comparator 2653_2, the third comparator 26533 may compare each of the LOFIC signal SIG_LOFIC, the LOFIC reset signal RST_LOFIC, the HCG reset signal RST_H, and the HCG signal SIG_H with the third reference signal RAMP3 synchronously input with the timing when each signal is input to the third comparator 26533, and output the third comparison result.

Referring to FIGS. 27 and 28, since the DSG method is not applied to the LCG signal SIG_L and the LCG reset signal RST_L, the ramp signal generator 2660 may readout the LCG signal SIG_L and the LCG reset signal RST_L using one reference signal including a ramp signal having one slope, and since the DSG method is applied to the HCG signal SIG_H, the HCG reset signal RST_H, the LOFIC signal SIG_LOFIC, and the LOFIC reset signal RST_LOFIC, the ramp signal generator 2660 may readout the HCG signal SIG_H, the HCG reset signal RST_H, the LOFIC signal SIG_LOFIC, and the LOFIC reset signal RST_LOFIC using two reference signals including ramp signals having different slopes. At the same time, the ramp signal generator 2660 uses a variable analog gain for the HCG and LOFIC signals, while the ramp signal generator 2660 uses a fixed analog gain when reading out the LCG signal, thereby reducing the SNR dip for the image signal.

Figure 29:
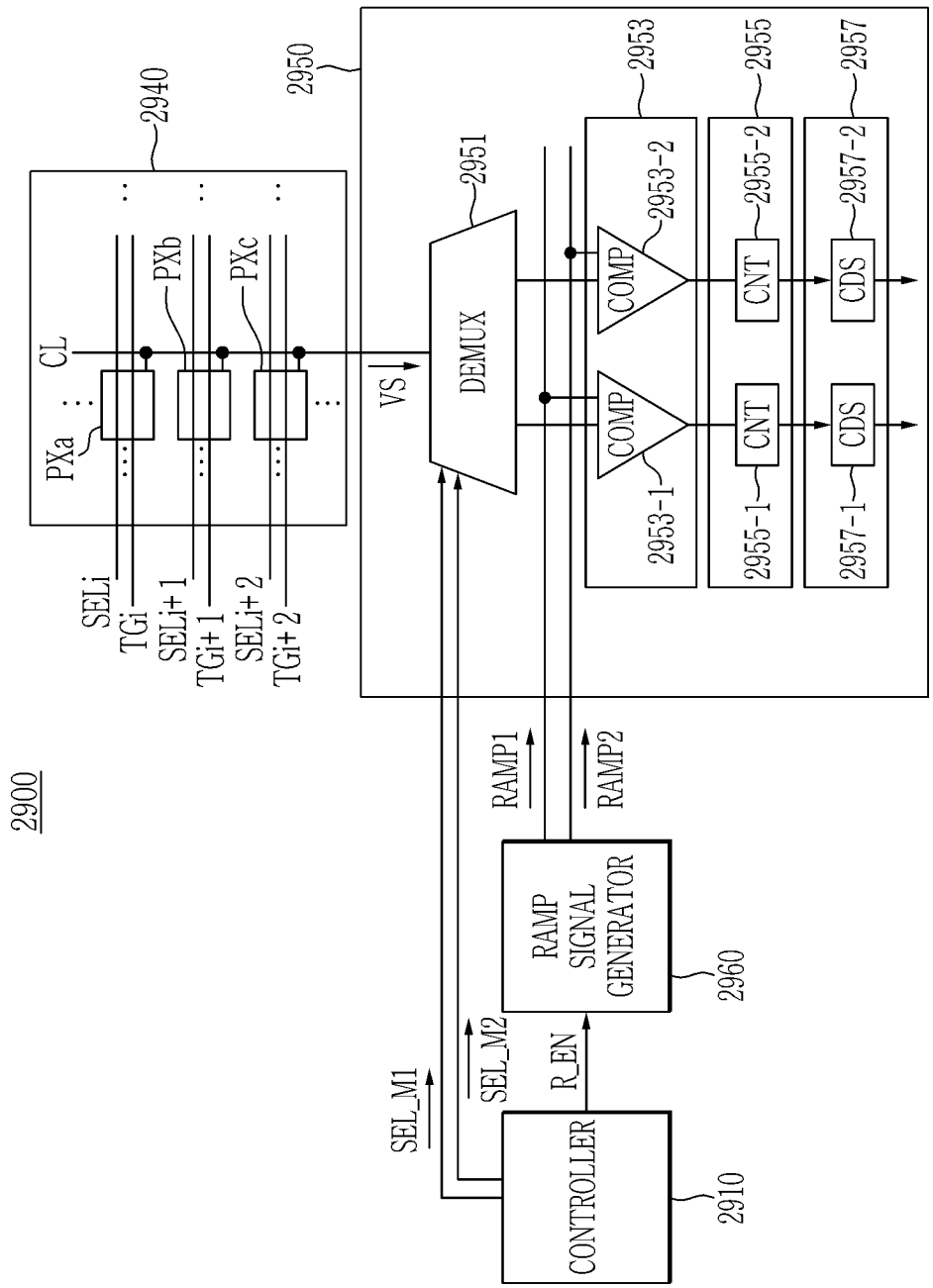
FIG. 29 is an example block diagram illustrating a pixel array and a readout circuit according to another embodiment.

FIG. 29 is an example block diagram illustrating a pixel array and a readout circuit according to another embodiment.

Referring to FIG. 29, the pixel array 2940 may include a plurality of pixels PXa, PXb, and PXc. Each of the plurality of pixels PXa, PXb, and PXc may receive a corresponding transfer signal among transfer signals TGi, TGi+1, and TGi+2 and a corresponding select signal among select signals SELi, SELi+1, and SELi+2. Each of the plurality of pixels PXa, PXb, and PXc may receive the corresponding select signal among the select signals SELi, SELi+1, and SELi+2 to output the pixel signal VS. Here, it is assumed that each of the plurality of pixels PXa, PXb, and PXc includes one sub-pixel.

The readout circuit 2950 may include a selector 2940, a comparator 2951, a counter 2953, and a CDS circuit 2955 connected to each column line CL of the pixel array 2957.

The selector 2951 may be implemented as, for example, a de-multiplexer, but is not limited thereto. The selector 2951 may be connected to one corresponding column line CL, and may receive the pixel signal VS from the connected column line CL. The selector 2951 may receive the DEMUX select signals SEL_M1 and SEL_M2 from the controller 2910 and output the pixel signal VS to the comparator 2953 based on the DEMUX select signals SEL_M1 and SEL_M2. In an embodiment, the selector 2951 may include two output terminals. The selector 2951 may output the pixel signal VS to any one of the two output terminals based on the DEMUX select signals SEL_M and SEL_M2.

The comparator 2953 may compare the pixel signal VS with each of the reference signal RAMP1 and RAMP2 and output the result to the counter 2955. In an embodiment, the comparator 2953 may include a first comparator 2953_1 and a second comparator 2953_2. Each of the first comparator 2953_1 and the second comparator 2953_2 may have two input terminals and one output terminal. One of the two input terminals of the first comparator 2953_1 may be connected to one of the two output terminals of the selector 2951, and the other of the two input terminals may be connected to the ramp signal generator 2960. An output terminal of the first comparator 29531 may be connected to the counter 2955_1. One of the two input terminals of the second comparator 2953_2 may be connected to the other of the two output terminals of the selector 2951, and the other of the two input terminals may be connected to the ramp signal generator 2960. An output terminal of the second comparator 2953_2 may be connected to the counter 2955_2.

The ramp signal generator 2960 may generate the reference signals RAMP1 and RAMP2 in response to the ramp enable signal R_EN input from the controller 2910. In some embodiments, the reference signals RAMP1 and RAMP2 may include a ramp signal whose voltage level increases or decreases over time. In some embodiments, when the ramp signal included in the reference signal RAMP1 is a signal having a waveform that decreases with a predetermined slope, a timing when the magnitude of the signal input to the comparator 2951_1 through the selector 2953 is the same as that of the ramp signal of the reference signal RAMP may occur. In addition, a point in time when the magnitude of the signal input to the comparator 2953_2 through the selector 2951 is equal to that of the ramp signal of the reference signal RAMP2 may occur. Since the magnitude of the signal input to the comparators 2953_1 and 153_2 and the magnitude of the ramp signal of the reference signal RAMP1 are synchronized at the same timing, the level of the signal output from the comparator 29531 may be shifted. In addition, since the magnitude of the signal input to the comparator 2953_2 and the magnitude of the ramp signal of the reference signal RAMP2 are synchronized at the same timing, the level of the signal output from the comparator 29532 may be shifted.

The counter 2955 may count how long the specific level of the signal output from the comparator 2953 is maintained. Specifically, the counter 2955 may receive a clock from the timing generator 2920. The counter 2955 may count how long the specific level of the signal received from the comparator 2953 is maintained using a rising edge or a falling edge of the clock signal. In an embodiment, the counter 2955 may include the first counter 2955_1 and the second counter 2955_2. The counter 2955_1 may be connected to the output terminal of the comparator 2953_1. Also, the counter 2955_2 may be connected to the output terminal of the comparator 2953_2. The counter 2955_1 may count the time a high level corresponding to logic level "1" is output from the comparator 2953_1. The counter 2955_2 may count the time the high level corresponding to the logic level "1" is output from the comparator 2953_2. The counters 2955_1 and 2915_2 may include an up/down counter or a bit-wise counter.

The CDS circuit 2957 may generate the image signal by performing the correlated double sampling (CDS) method on the counting signal received from the counter 2955. In an embodiment, the CDS circuit 2957 may include a CDS circuit 2957_1 and a CDS circuit 2957_2. The CDS circuit 29571 may be connected to the output terminal of the counter 2955_1 to perform the CDS method on a counting signal received from the counter 2955_1. In addition, the CDS circuit 2957_2 may be connected to the output terminal of the counter 2955_2 to perform the CDS method on a counting signal received from the counter 2955_2.

Figure 30:
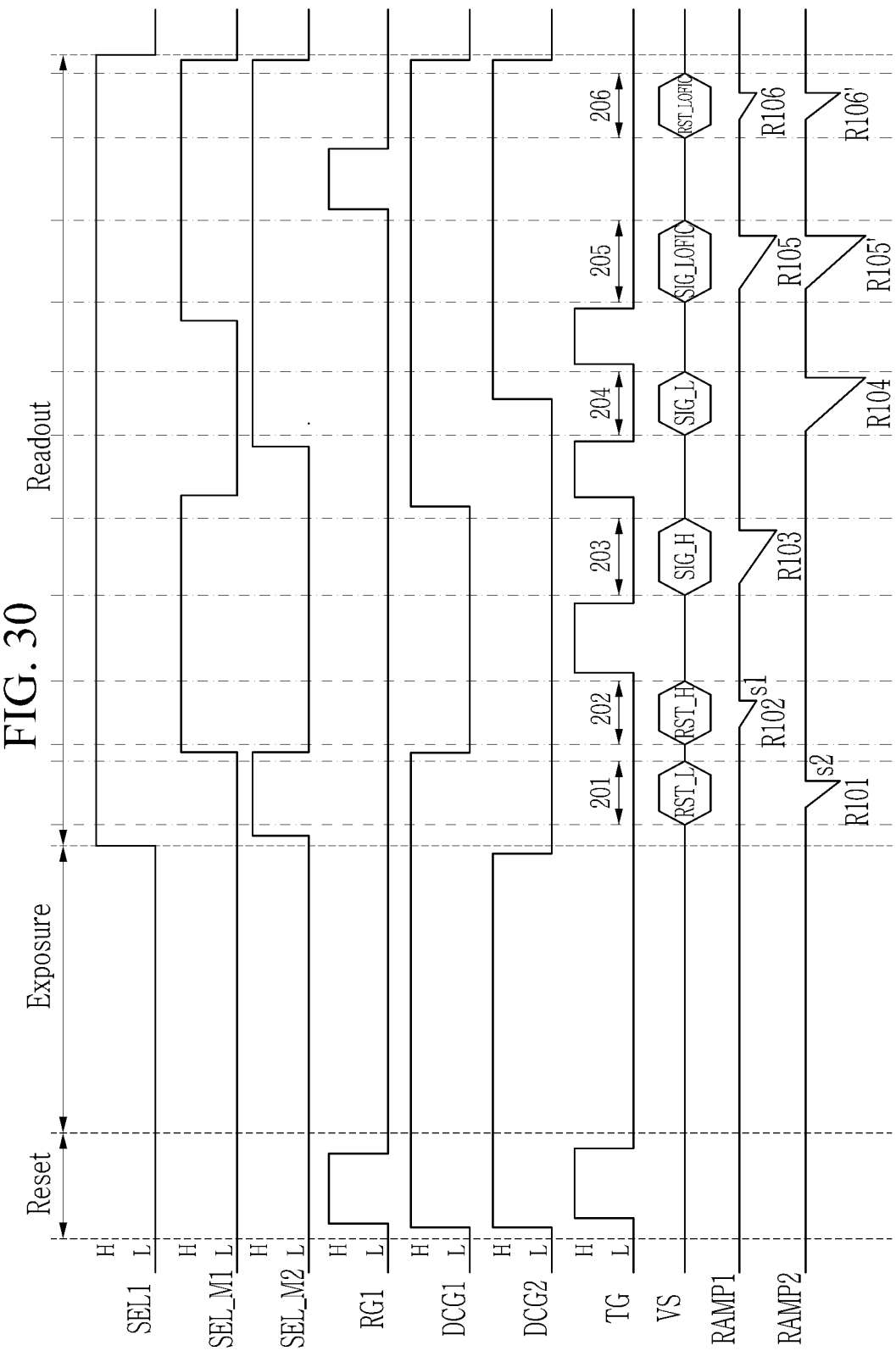
FIG. 30 is an example diagram illustrating an operation timing of the image sensor illustrated in FIG. 29.

FIG. 30 is an example diagram illustrating the operation timing of the image sensor illustrated in FIG. 29.

FIG. 30 is a diagram illustrating a case in which the image sensor 2900 operates in a readout method of RST-RST-SIG-SIG-SIG-RST (RRSS-SR).

Since the waveforms of the reset signal RG1, the first gain control signal DCG1, the second gain control signal DCG2, and the transfer signal TG in the reset period Reset and the exposure period Exposure of FIG. 20 are similar to the waveforms of the reset signal RG1, the first gain control signal DCG1, the second gain control signal DCG2, and the transfer signal TG of FIG. 20, the description of FIG. 12 may also be applied to FIG. 30.

During a period 201, the pixel signal VS may be output to the column line CL as the LCG reset signal RST_L. During a period 202, the pixel signal VS may be output to the column line CL as the HCG reset signal RST_H. During a period 203, the pixel signal VS may be output to the column line CL as the HCG signal SIG_H. During a period 204, the pixel signal VS may be output to the column line CL as the LCG signal SIG_L. During a period 205, the pixel signal VS may be output to the column line CL as the LOFIC signal SIG_LOFIC. During a period 206, the pixel signal VS may be output to the column line CL as the LOFIC reset signal RST_LOFIC.

During the period 201, the DEMUX select signal SEL_M1 is at a low level, and the DEMUX select signal SEL_M2 is at a high level. Accordingly, the LCG reset signal RST_L may be output to the second comparator 2953_2. During the periods 202 and 203, the DEMUX select signal SEL_M1 is at a high level, and the DEMUX select signal SEL_M2 is at a low level. Accordingly, the HCG reset signal RST_H and the HCG signal SIG_H may be output to the first comparator 2953_1. During the period 204, the DEMUX select signal SEL_M1 is at a low level, and the DEMUX select signal SEL_M2 is at a high level. Accordingly, the LCG signal SIG_L may be output to the second comparator 2953_2. During the periods 205 and 206, the DEMUX select signal SEL_M1 and the DEMUX select signal SEL_M2 are at a high level, and thus, the LOFIC signal SIG_LOFIC and the LOFIC reset signal RST_LOFIC may be output to the first comparator 2953_1 and the second comparator 2953_2.

Figure 31:
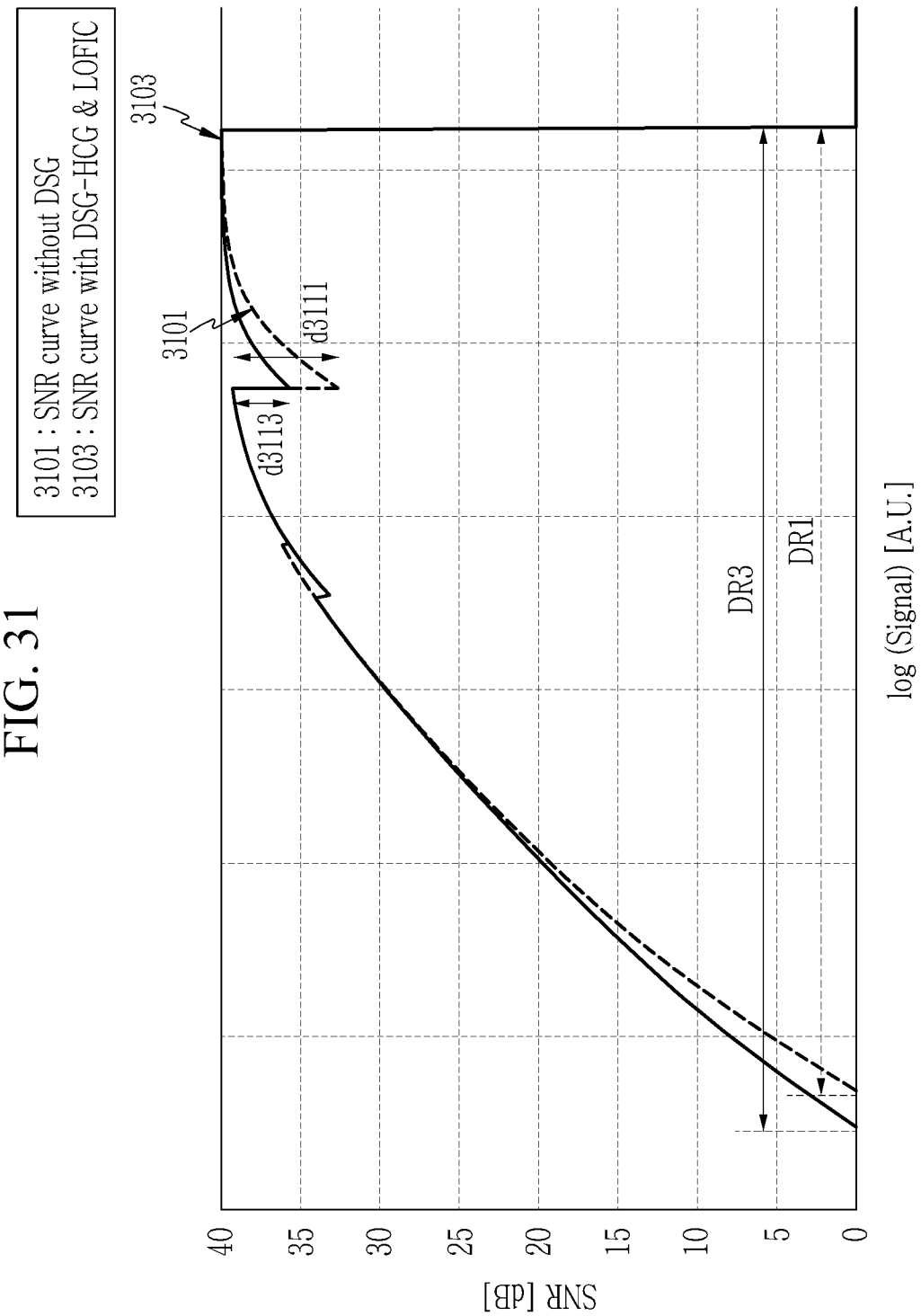
FIG. 31 is an example graph illustrating a signal-to-noise ratio according to an embodiment.

Meanwhile, the ramp signal generator 2960 may generate the two reference signals RAMP1 and RAMP2 in response to the ramp enable signal R_EN during the readout period Readout. The reference signals RAMP1 and RAMP2 illustrated in FIG. 31 is a signal provided to the comparator 2953 in the readout circuit 2950 during the readout period Readout.

The first reference signal RAMP1 is a signal provided to the first comparator 2953_1 during the readout period Readout, and the second reference signal RAMP2 is a signal provided to the second comparator 2953_2 during the readout period Readout. A second ramp signal R102 having a first cycle, a third ramp signal R103 and a fifth ramp signal R105 having the second cycle, and a sixth ramp signal R106 having a first cycle may be sequentially provided to the second comparator 29532 in synchronization with a comparison target signal. Specifically, the second ramp signal R102 may be provided to the first comparator 2953_1 within the period 202, the third ramp signal R103 may be provided to the first comparator 2953_1 within the period 203, the fifth ramp signal R105 may be provided to the first comparator 2953_1 within the period 205, and the sixth ramp signal R106 may be provided to the first comparator 2953_1 within the period 206.

A first ramp signal R101 having a first cycle, a fourth ramp signal R104 and a fifth ramp signal R105 having a second cycle greater than the first cycle, a fifth' ramp signal R105' having a second cycle, and a sixth' ramp signal R106' having a first cycle may be sequentially provided to the second comparator 2953_2 in synchronization with the comparison target signal. Specifically, the first ramp signal R101 may be provided to the second comparator 29532 within the period 201, the fourth ramp signal R104 may be provided to the second comparator 2953_2 within the period 204, the fifth' ramp signal R105' may be provided to the second comparator 29532 within the period 205, and the sixth' ramp signal R106' may be provided to the second comparator 29532 within the period 206. However, the embodiments are not limited thereto, and the ramp signal generator 2960 may generate the reference signal RAMP having different waveforms including the first ramp signal R101 to the sixth ramp signal R106 and the fifth' ramp signal R105' to the sixth' ramp signal R106'.

The first slope s1 of the ramp signals included in the first reference signal RAMP1 may be different from the second slope s2 of the ramp signals included in the second reference signal RAMP2. The absolute value of the slope of the ramp signals included in the second reference signal RAMP2 may be adjusted to be greater than the absolute value of the slope of the ramp signals included in the first reference signal RAMP1. A ratio of the first slope s1 to the second slope s2 may be preset.

For example, as illustrated in FIG. 30, the absolute value of the second slope s2 may be twice that of the second slope s2, but the embodiments are not limited thereto.

The first comparator 2953_1 may compare each of the HCG reset signal RST_H, the HCG signal SIG_H, the LOFIC signal SIG_LOFIC, and the LOFIC reset signal RST_LOFIC with the first reference signal RAMP1 synchronously input with the timing when each signal is input to the first comparator 2953_2, and output the first comparison result. The second comparator 29532 may compare each of the LCG reset signal RST_L, the LCG signal SIG_L, the LOFIC signal SIG_LOFIC, and the LOFIC reset signal RST_LOFIC with the second reference signal RAMP2 synchronously input with the timing when each signal is input to the second comparator 2953_2, and output the second comparison result.

Referring to FIG. 30, since the DSG method is not applied to the LCG signal SIG_L and the LCG reset signal RST_L, the ramp signal generator 2960 readouts the DSG method to the LCG signal SIG_L and the LCG reset signal RST_L using one reference signal including the ramp signal having the predetermined slope s1, since the DSG method is applied to the HCG signal SIG_H and the HCG reset signal RST_H, the ramp signal generator 2960 readouts the HCG signal SIG_H and the HCG reset signal RST_H using the reference signal RAMP2 including the ramp signal having the slope s2 different from a predetermined slope, and since the DSG method is applied to the LOFIC signal SIG_LOFIC and the LOFIC reset signal RST_LOFIC, the ramp signal generator 2960 may readout the LOFIC signal SIG_LOFIC and the LOFIC reset signal RST_LOFIC using the two reference signals RAMP1 and RAMP2 including the ramp signals having different slopes s1 and s2.

FIG. 31 is an example graph illustrating a signal-to-noise ratio according to an embodiment. Specifically, FIG. 31 illustrates, in units of dB, the signal-to-noise ratio of the signal obtained by synthesizing the HCG image signal, the LCG image signal, and the LOFIC image signal according to the readout circuit 650 illustrated in FIG. 29. In this case, it is assumed that the ratio of the absolute value of the slope s1 of the ramp signals in the first reference signal RAMP1 of FIG. 7 and the absolute value of the slope s2 of the ramp signals in the second reference signal RAMP2 is set to 1:2.

FIG. 31 illustrates a first graph 3101 and a second graph 3103, and each graph is a graph illustrating an SNR of a signal obtained by synthesizing an HCG image signal, an LCG image signal, and a LOFIC image signal. The first graph 3101 is an SNR graph when the pixel signal VS is readout without applying the DSG method, and the second graph 3103 is an SNR graph when the pixel signal VS is readout while applying the DSG method. That is, the second graph 3103 is a graph illustrating the SNR of the synthesized signal when the pixel signal VS is readout by applying the DSG method with an analog gain twice the predetermined analog gain.

As illustrated in FIG. 31, an SNR dip d3111 between the LCG image signal and the LOFIC image signal in the first graph 3101 is greater than that of the SNR dip d3113 between the LCG image signal and the LOFIC image signal in the second graph 3103. Also, a dynamic range DR3 in the second graph 3103 is wider than a dynamic range DR1 in the first graph 3101.

Meanwhile, as described above, as the number of photoelectric devices included in one pixel PX increases, the quantity of charges generated by each photoelectric device may increase, and the magnitude of a pixel signal based on the generated charges may increase. In order to prevent an increase in random noise due to a decrease in a conversion gain of a pixel when operating in the HCG mode, a method of reading a pixel signal generated from one pixel through a plurality of column lines may be used.

Figure 32:
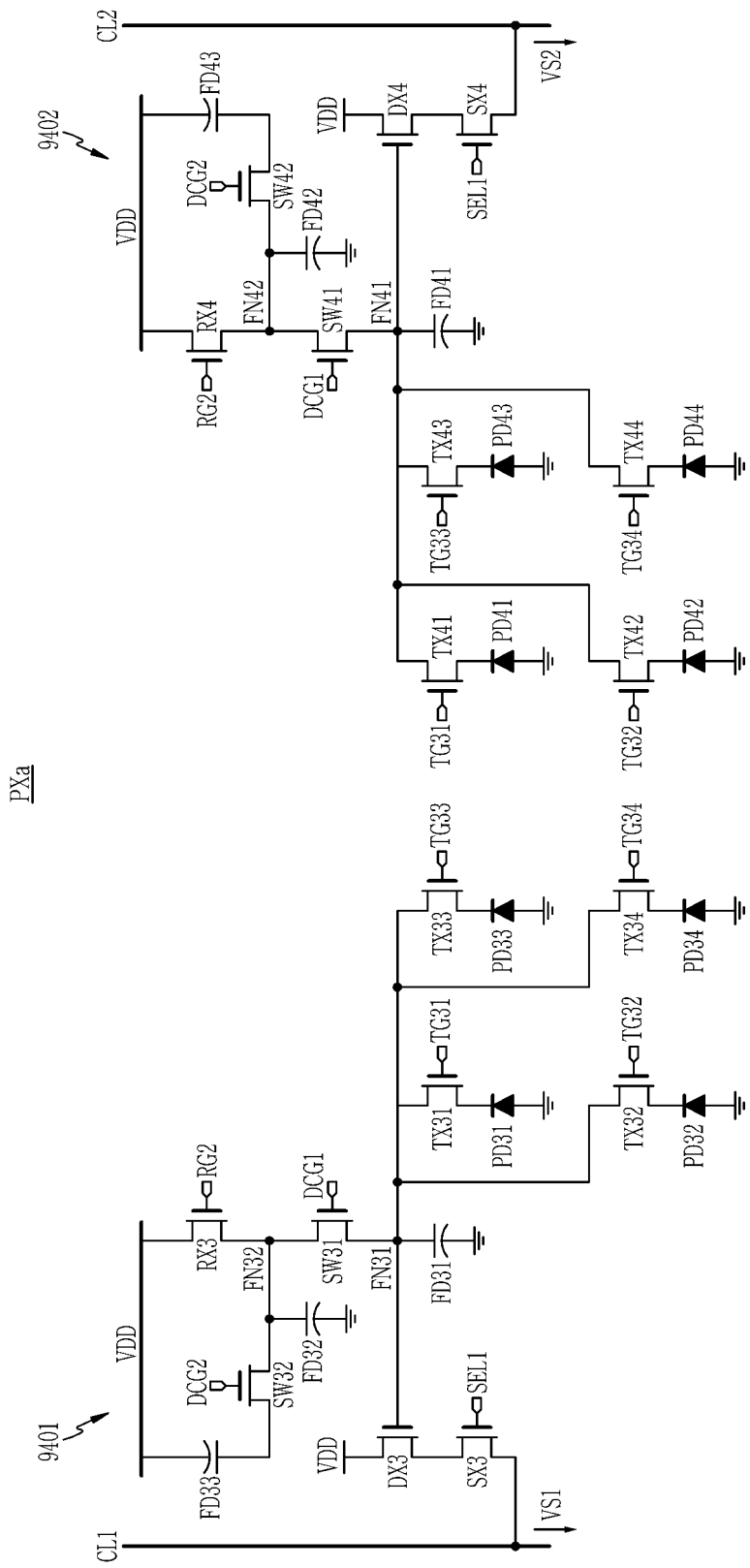
FIG. 32 is an example circuit diagram illustrating one pixel according to an embodiment.

FIG. 32 is an example circuit diagram illustrating one pixel according to an embodiment.

Referring to FIG. 9, an image sensor 900 according to another embodiment may include a pixel array 940 and a readout circuit 950.

As described above, the pixel array 940 may include a plurality of pixels PXa, PXb, and PXc. Each of the plurality of pixels PXa, PXb, and PXc may receive a corresponding transfer signal among transfer signals TGi, TGi+1, TGi+2, TGi+3, TGi+4, and TGi+5 and a corresponding select signal among select signals SELi, SELi+1, and SELi+2. Each of the plurality of pixels PXa, PXb, and PXc may receive the corresponding select signal among the select signals SELi, SELi+1, and SELi+2 to output pixel signals VS1 and VS2. As illustrated in FIG. 32, one pixel PXa may include a plurality of sub-pixels 9401 and 9402. Each of the plurality of sub-pixels 9401 and 9402 may be selected by the transfer signals TGi and TGi+1 and the select signal SELi to output the pixel signals VS1 and VS2.

The pixel PXa according to an embodiment may include a pixel circuit processing charges generated by photoelectric devices PD31, PD32, PD33, PD34, PD41, PD42, PD43, and III PD44 and photoelectric devices PD31, PD32, PD33, PD34, PD41, PD42, PD43, and PD44 that generate charges in response to light, and outputting an electrical signal. In FIG. 32, one pixel PXa is illustrated as including eight photoelectric devices PD31, PD32, PD33, PD34, PD41, PD42, PD43, and PD44, but aspects of the present invention are not limited thereto, and one pixel PX3 may also include a plurality of photoelectric devices.

In some embodiments, the photoelectric devices PD31, PD32, PD33, PD34, PD41, PD42, PD43, and PD44 may detect external light to generate charges. The charges generated by the photoelectric devices PD31, PD32, PD33, and PD34 in the sub-pixel 9401 and the charges generated by the photoelectric devices PD41, PD42, PD43, and PD44 in the sub-pixel 9402 each may be output by being divided into two columns lines CL1 and CL2. Specifically, the charges generated by the photoelectric devices PD31, PD32, PD33, and PD34 may be output to the readout circuit 950 through the column line CL1, and the charges generated by the photoelectric devices PD41, PD42, PD43, and PD44 may be output to the readout circuit 950 through the column line CL2.

Cathodes of the photoelectric devices PD31, PD32, PD33, and PD34 may be connected to a floating node FN31 through the transfer transistors TX31, TX32, TX33, and TX34, and anodes of the photoelectric devices PD31, PD32, PD33, and PD34 may be grounded. Similarly, cathodes of the photoelectric devices PD41, PD42, PD43, and PD44 may be connected to the floating node FN41 through the transfer transistors TX41, TX42, TX43, and TX44, and anodes of the photoelectric devices PD41, PD42, PD43, and PD44 may be grounded.

The pixel circuit PX may include transfer transistors TX31, TX32, TX33, TX34, TX41, TX42, TX43, and TX44, drive transistors DX3 and DX4, select transistors SX3 and SX4, reset transistors RX3 and RX4, and switch transistors SW31, SW32, SW41, and SW42. The transistors TX31, TX32, TX33, TX34, TX41, TX42, TX43, TX44, DX3, DX4, SX3, SX4, SX1, SX2, RX3, RX4, SW31, SW32, SW41, and SW42 in the pixel circuit may operate in response to the control signals provided from the row driver 130, for example, the transfer control signals TG31, TG32, TG33, and TG34, the select signal SEL1, the reset control signal RG1, first gain control signal DCG1, and second gain control signal DCG2.

In some embodiments, the sub-pixel 9401 may include the plurality of floating diffusions FD31, FD32, and FD33. The floating diffusions FD31, FD32, and FD33 may have a predetermined capacitance and store charges generated by the photoelectric devices PD31, PD32, PD33, and PD34. The sub-pixel 9402 may include the plurality of floating diffusions FD41, FD42, and FD43. The floating diffusions FD41, FD42, and FD43 may have a predetermined capacitance and store charges generated by the photoelectric devices PD41, PD42, PD43, and PD44. The floating diffusion FD31 and the floating diffusion FD41 may have the same capacitance, and the floating diffusion FD32 and the floating diffusion FD42 may have the same capacitance. The third floating diffusion FD33 and the floating diffusion FD43 may include a lateral overflow integration capacitor (LOFIC) and may have the same capacitance.

The transfer transistor TX31 may be connected between the photoelectric device PD31 and the floating node FN31, and the transfer transistor TX41 may be connected between the photoelectric device PD41 and the floating node FN41 and controlled by the transfer signal TG31. When the transfer transistor TX31 is turned on, the charges generated by the photoelectric device PD31 may be transferred to the floating diffusion FD31. When the transfer transistor TX41 is turned on, charges generated by the photoelectric device PD41 may be transferred to the floating diffusion FD41.

In addition, the transfer transistor TX32 may be connected between the photoelectric device PD32 and the floating node FN31, and the transfer transistor TX42 may be connected between the photoelectric device PD42 and the floating node FN41 and controlled by the transfer signal TG32. When the transfer transistor TX32 is turned on, the charges generated by the photoelectric device PD32 may be transferred to the floating diffusion FD31. When the transfer transistor TX42 is turned on, the charges generated by the photoelectric device PD42 may be transferred to the floating diffusion FD41.

The transfer transistor TX33 may be connected between the photoelectric device PD33 and the floating node FN31, and the transfer transistor TX43 may be connected between the photoelectric device PD43 and the floating node FN41 and controlled by the transfer signal TG33. When the transfer transistor TX33 is turned on, the charges generated by the photoelectric device PD33 may be transferred to the floating diffusion FD31. When the transfer transistor TX43 is turned on, the charges generated by the photoelectric device PD43 may be transferred to the floating diffusion FD41.

The transfer transistor TX34 may be connected between the photoelectric device PD34 and the floating node FN31, and the transfer transistor TX44 may be connected between the photoelectric device PD44 and the floating node FN41 and controlled by the transfer signal TG34. When the transfer transistor TX34 is turned on, the charges generated by the photoelectric device PD34 may be transferred to the floating diffusion FD31. When the transfer transistor TX44 is turned on, the charges generated by the photoelectric device PD44 may be transferred to the floating diffusion FD41.

The voltage of the floating node FN31 may be determined according to the charges accumulated in the floating diffusion FD31. The gate of the drive transistor DX3 is connected to the floating node FN31. The drive transistor DX3 may operate as a source-follower amplifier for the voltage of the floating node FN31. The drive transistor DX3 may output the pixel signal VS1 to the column line CL1 through the select transistor SX3 in response to the voltage of the floating node FN31.

In addition, the voltage of the floating node FN41 may be determined according to the charges accumulated in the floating diffusion FD41. A gate of the drive transistor DX4 is connected to the floating node FN41. The drive transistor DX4 may operate as a source-follower amplifier for the voltage of the floating node FN41. The drive transistor DX4 may output the pixel signal VS2 to the column line CL2 through the select transistor SX4 in response to the voltage of the floating node FN41.

The select transistor SX3 may be connected between the drive transistor DX3 and the corresponding column line CL1, and the select transistor SX4 may be connected between the drive transistor DX4 and the corresponding column line CL2, so both the select transistor SX3 and the select transistor SX4 may be controlled by the select signal SEL1. That is, the sub-pixel 9401 and the sub-pixel 9402 may be selected simultaneously. When the select transistor SX3 is turned on, the pixel voltage VS1 output from the drive transistor DX3 may be output to the readout circuit 950 through the column line CL connected to the select transistor SX3. In addition, when the select transistor SX4 is turned on, the pixel voltage VS2 output from the drive transistor DX4 may be output to the readout circuit 950 through the column line CL2 connected to the select transistor SX4.

The reset transistors RX3 and RX4 may be connected between a power supply voltage line supplying a power supply voltage VDD and each of the floating nodes FN32 and FN42, and may be controlled by the reset control signal RG2. When the reset transistors RX3 and RX4 are turned on by the reset signal RG2, the power supply voltage VDD may be applied to the floating nodes FN32 and FN42 to reset the floating nodes FN32 and FN42. When the switch transistors SW31 and SW32 are turned on while the reset transistor RX3 is turned on, both the floating node FN31 and the floating node FN32 may be reset to the power supply voltage VDD. In addition, when the switch transistors SW41 and SW42 are turned on while the reset transistor RX4 is turned on, both the floating node FN41 and the floating node FN42 may be reset to the power supply voltage VDD.

The switch transistor SW31 may be connected between the floating node FN31 and the floating node FN32, and the switch transistor SW41 may be connected between the floating node FN41 and the floating node FN42 and controlled by the first gain control signal DCG1. The switch transistor SW32 may be connected between the floating node FN32 and the floating diffusion FN33, and the switch transistor SW42 may be connected between the floating node FN42 and the floating diffusion FD43 and controlled by the second gain control signal DCG2.

When the switch transistor SW31 and the switch transistor SW41 are turned off, the floating node FN31 has a capacitance of the floating diffusion FD31, and the floating node FN41 has a capacitance of the floating diffusion FD41. In this case, since the magnitude of the capacitance connected to the floating node FN31 and the floating node FN41 is small, the pixel PX operates in the HCG mode and may output the same pixel signals VS1 and VS2 through each of the column lines CL1 and CL2.

When the switch transistor SW31 and the switch transistor SW41 are turned on and the switch transistor SW32 and the switch transistor SW42 are turned off, the second floating diffusion FD32 is connected to the first floating node FN31 and the floating diffusion FD42 is connected to the floating node FN41. That is, the capacitance of the first floating node FN31 increases by the capacitance of the second floating diffusion FD32, and the capacitance of the floating node FN41 increases by the capacitance of the second floating diffusion FD42. In this case, the pixel PX may operate in the LCG mode and may output the same pixel signal VS1 and VS2 through each of the column lines CL1 and CL2.

When the switch transistor SW31 and the switch transistor SW41 are turned on and the switch transistor SW32 and the switch transistor SW42 are turned on, the second floating diffusion FD33 is connected to the first floating node FN31 and the floating diffusion FD43 is connected to the floating node FN41. That is, the capacitance of the first floating node FN31 increases by the capacitance of the second floating diffusion FD32 and the third floating diffusion FD33, and the capacitance of the floating node FN41 increases by the capacitance of the second floating diffusion FD42 and the third floating diffusion FD43. In this case, the pixel PX may operate in the LOFIC mode and may output the same pixel signal VS1 and VS2 through each of the column lines CL1 and CL2.

Each of the sub-pixel 9401 and the sub-pixel 9402 may operate in the same manner as the pixel PX3 described with reference to FIG. 11A.

As described above with reference to FIG. 9, thereafter, the selector 951 may average the pixel signals VS1 and VS2 to generate one average value VS, and output the generated average value to the comparators 953_1 and 953_2. The comparator 9531 may compare the pixel signal VS corresponding to the average value of the two pixel signals VS1 and VS2 with the reference signal RAMP synchronously with the timing when the pixel signal VS is input to the first comparator 953_1 and output the result to the counter 955_1. Thereafter, the CDS circuit 957_1 may be connected to the output terminal of the counter 955_1 and may perform the correlated double sampling (CDS) method on the output of the pixel signal VS received from the counter 955_1 to generate the image signal IMS.

Also, the comparator 953_2 may compare the reference signal synchronously input the timing when the pixel signal VS is input to each comparator 953_2, and output the result to the counter 955_2. Thereafter, the CDS circuit 9572 may be connected to the output terminal of the counter 955_2 and may perform the correlated double sampling (CDS) method on the output of the pixel signal VS received from the counter 955_2 to generate the image signal IMS.

Figure 33:
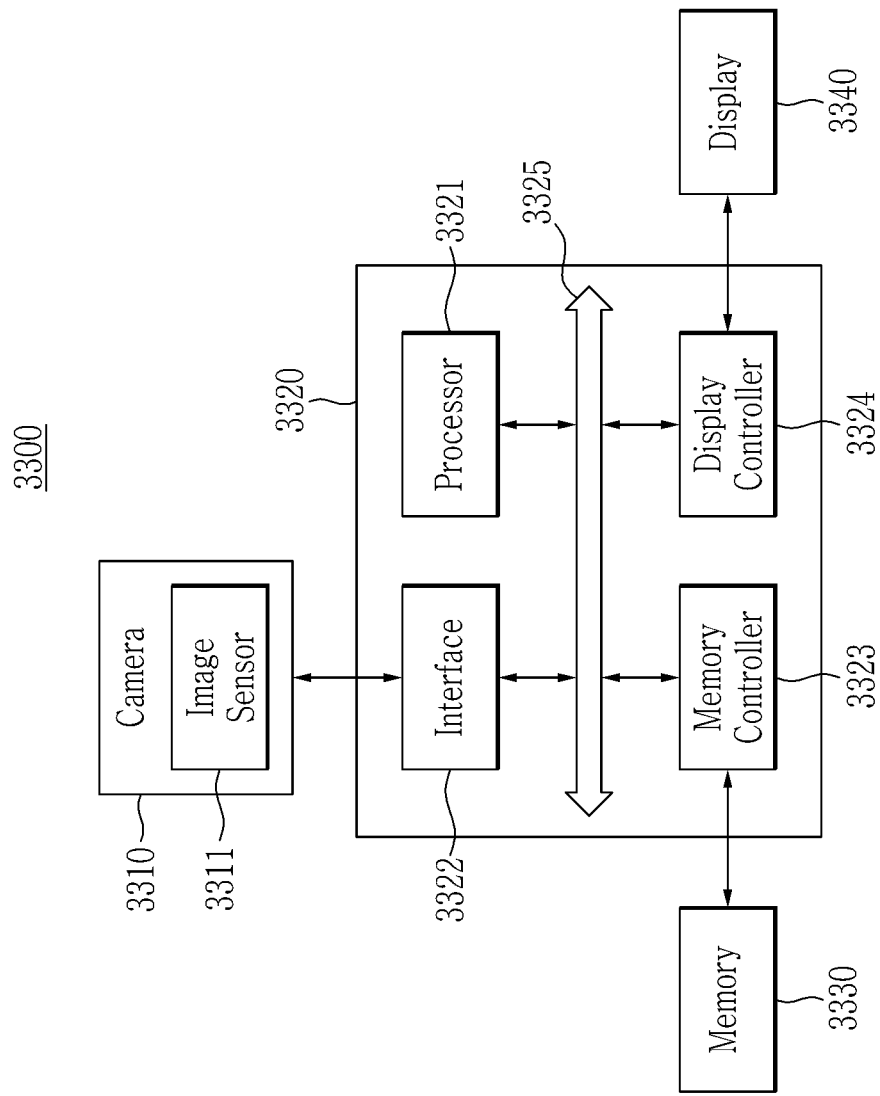
FIG. 33 is an example block diagram of a computer device according to an embodiment.

FIG. 33 is an exemplary block diagram of a computer device according to an embodiment.

Referring to FIG. 33, a computing device 3300 may include a camera 3310, a controller 3320, a memory 3330, and a display 3340.

The camera 3310 may include an image sensor 3311. The image sensor 3311 may be implemented as the image sensor described with reference to FIGS. 1 to 32. The camera 3310 may generate an image signal using the image sensor 3311, perform image signal processing on the image signal, and output the processed image signal to the controller 3320.

The controller 3320 may include a processor 3321. The processor 3321 controls an overall operation of each component of the computing device 3300. The processor 3321 may be implemented as at least one of various processing units such as a central processing unit (CPU), an application processor (AP), and a graphic processing unit (GPU). In some embodiments, the controller 3320 may be implemented as an integrated circuit or a system on chip (SoC).

In some embodiments, as illustrated in FIG. 33, the controller 3320 may further include an interface 3334, a memory controller 3323, a display controller 3324, and a bus 3325. In some embodiments, at least some of the interface 3334, the memory controller 3323, the display controller 3324, and the bus 3325 may be provided to the outside of the controller 3320. In some embodiments, the controller 3320 may further include an image signal processor.

The interface 3322 may transmit an image signal received from the image sensor 3311 to the memory controller 3323 or the display controller 3324 through the bus 3325.

The memory 3330 may store various data and commands. The memory controller 3323 may control transfer of data or commands to and from the memory 3330.

The display controller 3324 may transmit data to be displayed on the display 3340 to the display 3340 under the control of the processor 3321, and the display 3340 may display a screen according to the received data. In some embodiments, the display 3340 may further include a touch screen. The touch screen may transmit a user input for controlling the operation of the computing device 3300 to the controller 3320. The user input may be generated when a user touches the touch screen.

The bus 3325 may provide a communication function between components of the controller 3320. The bus 3325 may include at least one type of bus depending on the communication protocol between the components.

Although the embodiments of the present invention have been described in detail hereinabove, the scope of the present disclosure is not limited thereto. Those of ordinary skill in the technical field to which the present disclosure belongs will be able to understand that the present disclosure may be implemented in other specific forms without changing the technical idea or essential characteristics of the present disclosure. Therefore, it should be understood that the embodiments as described above are illustrative in all respects and not restrictive.

While the disclosure has been detailed in connection with what is presently considered to be practical embodiments, it is to be understood that aspects of the invention are not limited to the disclosed embodiments. On the contrary, it will be understood that various modifications and equivalent arrangements may be made without departing from the spirit and scope of the appended claims.

What is claimed is:

1. An image sensor, comprising:
a pixel including a first floating diffusion and a second floating diffusion including a lateral overflow integration capacitor (LOFIC), generating a first pixel signal based on a quantity of charge of the first floating diffusion, and generating a second pixel signal based on the quantity of charge of the first floating diffusion and a quantity of charge of the second floating diffusion;
a column line connected to the pixel and transmitting the first pixel signal or the second pixel signal;
a ramp signal generator generating a first reference signal and a second reference signal; and
a readout circuit connected to the column line and generating an image signal based on a plurality of comparison results including a first comparison result obtained by comparing the first pixel signal with the first reference signal, a second comparison result obtained by comparing the second pixel signal with the first reference signal, and a third comparison result obtained by comparing the second pixel signal with the second reference signal.

2. The image sensor of claim 1, wherein:
the first reference signal includes a plurality of ramp signals having a first slope,
the second reference signal includes a plurality of ramp signals having a second slope different from the first slope, and
the plurality of comparison results further include a fourth comparison result obtained by comparing the first pixel signal and the second reference signal.

3. The image sensor of claim 1, wherein:
the pixel further includes a third floating diffusion, the second pixel signal is generated further based on a quantity of charge of the third floating diffusion, and
the pixel further generates a third pixel signal based on the quantity of charge of the first floating diffusion and the quantity of charge of the third floating diffusion.

4. The image sensor of claim 3, wherein:
the first reference signal includes a plurality of ramp signals having a first slope,
the second reference signal includes a plurality of ramp signals having a second slope different from the first slope, and
the plurality of comparison results further include a fourth comparison result obtained by comparing the third pixel signal and the second reference signal.

5. The image sensor of claim 4, further comprising:
a first comparator receiving the first pixel signal, the second pixel signal, and the first reference signal and outputting the first comparison result and the second comparison result; and
a second comparator receiving the second pixel signal, the third pixel signal, and the second reference signal, and outputting the third comparison result and the fourth comparison result.

6. The image sensor of claim 3, wherein:
the first reference signal includes a plurality of ramp signals having a first slope,
the second reference signal includes a plurality of ramp signals having a second slope different from the first slope, and
the plurality of comparison results further include a fourth comparison result obtained by comparing the first pixel signal and the second reference signal.

7. The image sensor of claim 6, wherein:
the ramp signal generator further generates a third reference signal having a third slope, and
the plurality of comparison results further include a fifth comparison result obtained by comparing the third pixel signal and the third reference signal.

8. The image sensor of claim 7, wherein:
the ramp signal generator maintains the third slope when an analog gain increases for the image sensor.

9. The image sensor of claim 7, wherein:
the readout circuit includes
a first comparator receiving the first pixel signal, the second pixel signal, and the first reference signal and outputting the second comparison result and the fourth comparison result, a second comparator receiving the first pixel signal, the second pixel signal, and the second reference signal and outputting the third comparison result and the fourth comparison result, and a third comparator receiving the third pixel signal and the third reference signal, and outputting the fifth comparison result.

10. The image sensor of claim 9, wherein:
the ramp signal generator further generates a fourth reference signal having a fourth slope different from the third slope, and
the plurality of comparison results further include a sixth comparison result obtained by comparing the third pixel signal and the fourth reference signal.

11. The image sensor of claim 10, wherein:
the ramp signal generator maintains the fourth slope when an analog gain increases for the image sensor.

12. The image sensor of claim 10, wherein:
the readout circuit further includes
a fourth comparator receiving the third pixel signal and the fourth reference signal and outputting the sixth comparison result.

13. The image sensor of claim 3, wherein:
the pixel includes the first floating diffusion, the second floating diffusion, and the third floating diffusion as a first sub-pixel and
a fourth floating diffusion having the same capacitance as the first floating diffusion, a fifth floating diffusion having the same capacitance as the second floating diffusion, and a sixth floating diffusion having the same capacitance as the third floating diffusion as second sub-pixels, and
generates a fourth pixel signal based on a quantity of charge of the fourth floating diffusion, generates a fifth pixel signal based on the quantity of charge of the fourth floating diffusion and a quantity of charge of the fifth floating diffusion, and generates a sixth pixel signal based on the quantity of charge of the fourth floating diffusion, the quantity of charge of the fifth floating diffusion, and a quantity of charge of the sixth floating diffusion, and
the column line includes a first column line connected to the first sub-pixel and a second column line connected to the second sub-pixel,
the readout circuit generates the first comparison result by comparing an average value of the first pixel signal and the fourth pixel signal with the first reference signal when comparing the first pixel signal with the first reference signal, generates the second comparison result obtained by comparing an average value of the second pixel signal and the fifth pixel signal with the first reference signal when comparing the second pixel signal with the first reference signal, generates the third comparison result obtained by comparing an average value of the second pixel signal and the fifth pixel signal with the second reference signal when comparing the second pixel signal with the second reference signal, and generates the fourth comparison result obtained by comparing an average value of the third pixel signal and the sixth pixel signal with the second reference signal when comparing the second pixel signal with the second reference signal.

14. An image sensor, comprising:
a photoelectric device;
a transfer transistor connected between a first node and the photoelectric device;
a first floating diffusion connected to the first node;
a first switch transistor connected between the first node and a second node;
a second floating diffusion connected to the second node;
a second switch transistor connected between a power supply voltage line and the second node;
a drive transistor generating a pixel signal in response to a voltage of the first node and outputting the pixel signal to a column line;
a readout circuit connected to the column line, and comparing the pixel signal with a first reference signal including a ramp signal having a first slope among a plurality of reference signals and comparing the pixel signal with a second reference signal including a ramp signal having a second slope different from the first slope among the plurality of reference signals to generate an image signal; and
a ramp signal generator generating a plurality of reference signals including a plurality of ramp signals and transmitting the plurality of reference signals to the readout circuit.

15. The image sensor of claim 14, wherein:
the pixel signal includes a first pixel signal generated by a drive transistor while the first switch transistor is turned off and a second pixel signal generated by the drive transistor while the first switch transistor is turned on and the second switch transistor is turned off.

16. The image sensor of claim 15, further comprising:
a third switch transistor connected between the first node and a third node; and
a third floating diffusion connected to the third node,
wherein the pixel signal further includes a third pixel signal generated by the drive transistor while the first switch transistor and the third switch transistor are turned on.

17. The image sensor of claim 15, further comprising:
a third floating diffusion connected in series with the second switch transistor,
wherein the pixel signal further includes a third pixel signal generated by the drive transistor while the first switch transistor and the second switch transistor are turned on.

18. The image sensor of claim 17, wherein:
the readout circuit compares the first pixel signal and the third pixel signal with the first reference signal and compares the second pixel signal and the third pixel signal with the second reference signal to generate the image signal.

19. The image sensor of claim 17, wherein:
the plurality of reference signals further include a third reference signal including a ramp signal having a third slope generated by the ramp signal generator in synchronization with the third pixel signal, and
the readout circuit compares the first pixel signal and the second pixel signal with the first reference signal, compares the first pixel signal and the second pixel signal with the second reference signal, and compares the third pixel signal with the third reference signal to generate the image signal.

20. The image sensor of claim 19, wherein:
the ramp signal generator maintains a slope of a ramp signal in the third reference signal when an analog gain increases for the image sensor.

21. The image sensor of claim 19, wherein:
the plurality of reference signals further include a fourth reference signal including a ramp signal having a fourth slope generated by the ramp signal generator in synchronization with the third pixel signal, and
the readout circuit further includes a fourth comparator comparing the third pixel signal with the fourth reference signal.

22. The image sensor of claim 21, wherein:
the ramp signal generator maintains a slope of a ramp signal in the fourth reference signal when an analog gain increases for the image sensor.

23. A method performed by an image sensor, comprising:
generating a first pixel signal based on the quantity of charge of a first floating diffusion and a second pixel signal based on the quantity of charge of the first floating diffusion and a quantity of charge of the second floating diffusion in a pixel including the first floating diffusion and the second floating diffusion;
generating a first reference signal including a ramp signal having a first slope and a second reference signal including a ramp signal having a second slope different from the first slope; and
generating an image signal based on a plurality of comparison results including a first comparison result obtained by comparing the first pixel signal with the first reference signal, a second comparison result obtained by comparing the second pixel signal and the first reference signal, and a third comparison result obtained by the second pixel signal with the second reference signal.

* * * * *